(12) United States Patent
Watanabe

(10) Patent No.: US 7,196,123 B2
(45) Date of Patent: Mar. 27, 2007

(54) POLYESTER BLOCK COPOLYMER COMPOSITION AND PROCESS FOR THE PREPARATION THEREOF

(76) Inventor: Jun Watanabe, 13-5, Kuba 4-Chome, Ohtake-shi, Hiroshima-ken 739-0651 (JP)

( * ) Notice: Subject to any disclaimer, the term of this patent is extended or adjusted under 35 U.S.C. 154(b) by 119 days.

(21) Appl. No.: 10/426,771

(22) Filed: Apr. 30, 2003

(65) Prior Publication Data

US 2004/0010092 A1  Jan. 15, 2004

Related U.S. Application Data

(62) Division of application No. 09/806,728, filed on Apr. 24, 2001, now Pat. No. 6,593,434.

(30) Foreign Application Priority Data

| Aug. 5, 1999 | (JP) | ............................ 11-223055 |
| Sep. 10, 1999 | (JP) | ............................ 11-257669 |
| Jun. 2, 2000 | (JP) | ............................ 2000-166787 |
| Jun. 21, 2000 | (JP) | ............................ 2000-187020 |

(51) Int. Cl.
| C08G 63/08 | (2006.01) |
| C08G 63/183 | (2006.01) |
| C08K 5/092 | (2006.01) |
| C08L 67/03 | (2006.01) |
| C08L 67/04 | (2006.01) |

(52) U.S. Cl. ............. 523/456; 524/189; 524/604; 524/605; 525/437; 525/438; 525/450

(58) Field of Classification Search ............. 525/437, 525/438, 450
See application file for complete search history.

(56) References Cited

U.S. PATENT DOCUMENTS 4,500,686 A * 2/1985 Kobayashi et al. ......... 525/408
4,578,452 A * 3/1986 Kleeberg et al. ............. 528/297
5,378,736 A * 1/1995 Fujiwa et al. ............... 522/170

FOREIGN PATENT DOCUMENTS

| JP | 53123441 A | * | 10/1978 |
| JP | 58091758 A | * | 5/1983 |
| JP | 59-152951 | | 8/1984 |
| JP | 59-152951 A | * | 8/1984 |
| JP | 59152951 A | * | 8/1984 |
| JP | 60-031525 | | 2/1985 |
| JP | 60170660 A | * | 9/1985 |
| JP | 62288655 A | * | 12/1987 |
| JP | 01163259 A | * | 6/1989 |
| JP | 1-185315 A | * | 7/1989 |
| JP | 04178453 A | * | 6/1992 |
| JP | 04-264156 | | 9/1992 |
| JP | 07331046 A | * | 12/1995 |
| JP | 11153226 A | * | 6/1999 |

OTHER PUBLICATIONS

CAPLUS accession No. 1975:460440 for Japanese Patent No. 49-38716, Ito et al., Oct. 19, 1974, abstract.*
Chemical abstracts registry No. 151465-23-5 for Celloxide 2081, 1967.*

* cited by examiner

*Primary Examiner*—Robert Sellers

(57) ABSTRACT

The invention provides a polyester block copolymer composition (R) obtained by thermally-processing a polyester block copolymer composition (Q) obtained by melt-mixing 100 parts by weight of a polyester block copolymer (P) with 0.1–5 parts by weight of an epoxy compound (C) having one or more epoxy groups under an inert gas atmosphere and not less than 102° C. in a solid phase, and further, at a temperature lower than a melting point of the polyester block copolymer composition (R) obtained.

5 Claims, 1 Drawing Sheet

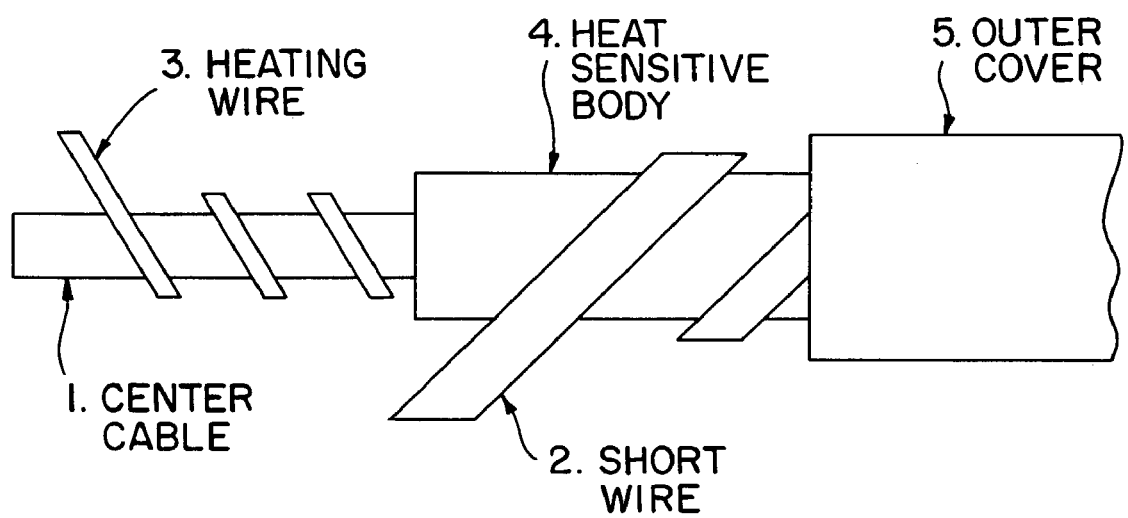

POLYESTER BLOCK COPOLYMER COMPOSITION AND PROCESS FOR THE PREPARATION THEREOF

This application is a divisional application of Ser. No. 09/806,728 filed Apr. 24, 2001, now U.S. Pat. No. 6,593,434.

BACKGROUND OF THE INVENTION

The present invention No. I relates to an efficient method for the preparation of a polyester block copolymer which is excellent in heat resistance and hydrolysis resistance, in which lactones are addition-polymerized onto a crystalline aromatic polyester.

The present invention No. II relates to a method for the preparation of a polyester block copolymer which is excellent in heat resistance and hydrolysis resistance, and which has a higher molecular weight, in which the polyester block copolymer obtained in the present invention No. I is further allowed to react in a solid state.

The present invention No. III relates to a polyester block copolymer composition which is excellent in heat resistance and hydrolysis resistance, color hue, and melt viscosity stability, and a method for the preparation thereof.

The present invention No. IV relates to a polyester block copolymer composition which is excellent in heat resistance under a contact with a metal and a polyvinyl chloride (PVC), and relates to a heat-sensitive body for a heater cable in which polyester block copolymer-based resin is employed.

The present invention Nos. V and VI relate to a polyester block copolymer composition which is excellent in a blow-moldability and heat resistance.

The present invention No. VII relates to a polyester block copolymer composition composed of a crystalline aromatic polyester and lactones, and relates to a method for the preparation thereof, and which is excellent in a blow-moldability and heat resistance.

BACKGROUND TECHNOLOGY

Prior arts in relation to the present invention Nos. I and II are as follows.

Many polyester block copolymers possesses a mechanical property such as flexibility, and widely enlarge uses such as parts for cars and electric and electronic parts as a thermoplastic elastomer which is excellent in heat resistance and chemical resistance, which contains a crystalline aromatic polyester unit such as a polybutylene terephthalate unit as a hard segment, and in which crystallinity is lowered by combination of a long chain diol with an aromatic dicarboxylic acid in spite of an aliphatic polyether such as a poly(alkyleneoxide) glycol, and/or an aliphatic polyester such as a polylactone and/or a polyester, and an aromatic polyester.

Hitherto, as a technology for giving flexibility to a crystalline aromatic polyester, JP-B-73004116 Official Gazette states a method for obtaining a block copolymer having a elasticity by reaction of a crystalline aromatic polyester with lactones. The method stated herein is a first method which shows that a block copolymer can be obtained by an addition reaction of lactones, however, there is nothing described in relation to an importance of residual unreacted lactone monomers after the above-described reaction and a technical effect, and there is also nothing described in relation to a melting point in the block copolymer obtained.

On the other hand, JP-B-77049037 Official Gazette describes a method for polymerizing lactones under the presence of a crystalline aromatic polyester which is in a solid phase. By descriptions, it is shown that a method in which a reaction is conducted in a melting state has a problem of a remarkable decline in a melting point of the crystalline aromatic polyester, and it can be solved by conducting a reaction under a solid condition.

However, it includes a problem that since it is a reaction at a low temperature, there is required a long time of period in the reaction, and since productivity is worse, and it lacks practicability.

Further, JP-B-96009661, JP-B-93023289, JP-B-93023290, JP-B-95033434, JP-B-94033435, JP-A-05043666, and JP-A-05043667 Official Gazettes all describe a method for allowing to continuously react a crystalline aromatic polyester with lactones, and some of the Gazettes include descriptions including a step for removing unreacted lactones. Removal of the unreacted lactone described herein has an effect for reducing a monomer smell in the polyester block copolymer and, moreover, by conducting a continuous removal operation, it has an effect for further reducing concentration of the unreacted lactones in the polyester block copolymer.

Still further, some of the above-described prior arts describe that there is included a step for conducting a polycondensation reaction in a solid state, and the polycondensation reaction in a solid state has an effect for increasing a solution viscosity of a polyester block copolymer (P1).

However, all of the prior arts only describe that a thermal property such as a melting point of a resin obtained are decided by raw materials to be employed, reaction temperature, reaction time of period, and conditions for removing unreacted lactones, and all the prior arts do not describe a technical concept and a specific method for intentionally improving the thermal property by increasing the amount of the lactones to be introduced and by remaining the amount of the unreacted lactones.

In JP-A-02252729 and JP-A-04072325 Official Gazettes, there is described a method for elevating a melting point of a block copolymer obtained. The JP-A-02252729 Official Gazette describes a method in which there are dissolved a crystalline aromatic polyester and lactones at a lower temperature, and those have an effect for reducing decomposition reaction by heating, however, there is small an effect for preventing a decline of a melting point, further, occasionally, a reaction time of period unpreferably becomes long. Further, the JP-A-04072325 Official Gazette describes that the lactones is partially added in advance in a highly-polymerized state, and elevation of a melting point can be effectively actualized. However, in spite of an inherent low cost in the lactones, the method partially highly-polymerized in advance includes a problem of a fair adverse affection to total profitability.

JP-A-61287922 Official Gazette describes that in a method for the preparation of an elastic polyester by allowing to react a crystalline aromatic polyester with lactones, the method for the preparation of an elastic polyester characterized in that an addition polymerization is conducted by continuously feeding a melted crystalline polyester and lactones into a reaction vessel, and then, those are allowed to react with each other in a solid state.

However, even in the method, there are not shown a technical concept and a specific method, etc., that thermal properties are intentionally elevated by increasing the amount of the lactones and by remaining the amount of unreacted lactones.

As described hereinabove, those have been still insufficient as a method for the preparation of a polyester block copolymer having a high melting point and a high molecular weight.

Prior arts in relation to the present invention No. III are as follows.

However, in relation to the polyester block copolymer composed of a hard segment and a soft segment described in the prior arts for the present invention No. I, an industrially-produced polymer is not sufficient in heat resistance and hydrolysis resistance, and, in the case that it is applied to a melting molding method such as a blow molding and extrusion molding in which a high melt viscosity is required, there has been caused a problem that moldability is worse.

Accordingly, as a method for elevating a heat resistance and hydrolysis resistance in a polyester block copolymer, there have been proposed a variety of methods until now. Further, there are proposed methods simultaneously elevating a melt viscosity in the many proposes. For example, JP-B-77030999 and the above-described JP-B-77049037 Official Gazettes propose a method for increasing a melt viscosity by a solid phase polymerization. However, in the method for increasing a melt viscosity proposed herein, there is required a very long time of period for heating and, further, hydrolysis resistance is not improved at all.

JP-B-91077826 Official Gazette proposes a method for melt-mixing a monofunctional epoxy compound with a bifunctional epoxy compound. By the method, although heat resistance and hydrolysis resistance are elevated, the hydrolysis resistance is not sufficient, an elevation of a melt viscosity is also insufficient.

In order to allow to become sufficient the hydrolysis resistance of the polyester elastomer obtained by the method, it is required that an excessive amount of the epoxy compounds are added, resulting in that a melting point lowers, and viscosity change is large in reheating, and it is problematic in molding stability in the case of conducting a more precise molding process.

JP-B-92021703, JP-B-89052441, and JP-B-86042930 Official Gazettes describe the further addition of a metal salt of a carboxylic acid as an accelerator in a reaction.

However, melt viscosity in resins obtained herein is not still sufficient and, it is anxious that such the addition of the metal salts unpreferably affects to hydrolysis resistance, and it preferably causes to lower a color hue. On the other hand, as a method for improving a melt viscosity stability, JP-B-88031491 Official Gazette proposes a method of addition of an epoxy compound and carboxylic acids. In the method, since there are added the carboxylic acids which change hydrolysis resistance to worse, there must be added a large amount of the epoxy compounds in order to obtain a sufficient hydrolysis resistance, resulting in that there are caused a cost increase and crystallinity lowers.

Prior arts in relation to the present invention No. IV are as follows.

In recent years, there have been employed composite materials of synthetic resins with metals and PVC in many fields including electric cables. The composite materials are molded by an extrusion molding method or a fusing method, and employed in a variety of uses.

As a use of such the materials, there is a heater cable for an electric blanket and an electric carpet in which heat resistance is required.

Structure of the heater cable, as shown in FIG. 1, is composed of a center wire 1, a short wire 2, a heating wire 3, a heat-sensitive body 4, and an outer cover 5. The heat-sensitive body 4 has a function as a fuse.

This functions in order to cut a heater circuit by fusing the heat-sensitive body 4 which fuses at a narrow temperature range when temperature abnormally elevates, and there have been mainly employed a nylon 12 and a nylon 11 until now. Further, a heat-resistible polyester is employed as the center wire 1, PVC is employed as the outer cover 5, and copper and a copper alloy are employed as the short wire 2 and the heater wire 3.

The heater wire composed of the composite materials are often exposed to heat cycles in view of functions thereof and, if the heat-sensitive body 4 is poor in heat resistance, even though exotherm from the heater wire 3 is in a normal range, the heater circuit is occasionally cut or, contrarily, a fusing function does not occasionally work even in the case of abnormal temperature elevation, resulting in that fire accident is occasionally caused.

Heretofore, there have been mainly employed resins such as the nylon 12 and the nylon 11 as the heat-sensitive body 4.

As the resins, although there is employed a resin which is excellent in heat resistance and does not contain an additive, or a resin composition in which a hindered phenol-based stabilizer is mixed to prevent heat deterioration, those include many problems.

Prior arts in relation to the present invention Nos. V, VI, and VII are as follows.

As a method for preparing a polyester block copolymer by allowing to react an aromatic polyester with lactones, there have been known a method (JP-A-48004116 Official Gazette) by allowing to react a crystalline aromatic polyester with a lactone, a method (JP-A-48004115 Official Gazette) by allowing to react a crystalline aromatic polyester with a lactone and to chain-extend by allowing to react an initial copolymer with a multifunctional acylating agent, and a method (the above-described JP-B-77049037 Official Gazette) for polymerizing the lactones in a solid phase under the presence of a crystalline aromatic polyester.

Although the polyester block copolymers obtained by the methods have excellent rubbery elasticity and excellent weatherability, the copolymers are insufficient in heat resistance, and include a drawback that viscosity, extension, and strength remarkably lower by exposing to a high temperature for a long time of period.

Further, the copolymers do not have a strain-hardening property which is an important property in blow-molding, and there cannot be obtained a molded article having uniform thickness.

Therefore, in order to improve heat resistance and moldability of the above-described polyester-type block copolymers, there have been proposed a method (JP-A-58162654 Official Gazette) in which a mono or more functional epoxy compound is mixed, a method (JP-A-59152947 Official Gazette) in which there are formulated a mono or more functional epoxy compound and a metal salt of an aliphatic carboxylic acid, and a method (JP-A-59155458 Official Gazette) in which there are formulated a mono or more functional epoxy compound and an ethylene-carboxylic acid copolymer. However, melt viscosity is relatively low in the compositions obtained in the methods.

There have been problems that because it is difficult to obtain a mutual relationship between a dependence of a melt viscosity upon extension speed and a mixing amount of the metal salt of an aliphatic carboxylic acid, and quality cannot be stabilized, and heat resistance lowers, etc.

Recently, as a method for solving all the problems, although there has been proposed a method (JP-A-07331046 Official Gazette) in which there are formulated two or more functional epoxy compounds and an imidazole compound, a dependence of a melt viscosity upon extension speed (It is called a strain-hardening property, that is, it is a characteristic of viscosity increase with an increase of an extending speed. Accordingly, a larger hardening property prevents an excessive extension of an extended portion in blow molding owing to a larger viscosity, and an unextended portion is extended owing to a lower viscosity, as a result, uniform thickness is obtained.) is still insufficient. and there cannot be obtained a molded article having uniform thickness in blow molding and, further, there has been a problem that discoloration is remarkable.

DISCLOSURE OF THE INVENTION

Purpose of the present invention No. I is to provide a method for the preparation of a polyester block copolymer from a crystalline aromatic polyester and, specifically, to provide a method for the preparation of a polyester block copolymer which has a low crystallinity and a high melting viscosity and which is excellent in heat resistance, processability, and hydrolysis resistance.

The present inventors, as a result of an investigation of a method for the preparation of a polyester block copolymer which is excellent in heat resistance, processability, hydrolysis resistance, and a high melt viscosity, found out that in the method for the preparation of a polyester block copolymer (P1) by allowing to react a crystalline aromatic polyester (A1) with lactones, thermal characteristics of the polyester block copolymer (P1) can be improved by controlling an introducing amount of lactones (B) with respect to the above-described crystalline aromatic polyester (A1) and an amount of unreacted lactones remained in the polyester block copolymer (P1), and the present invention No. I has been completed.

Purpose of the present invention No. II is to provide a method for the preparation of a high molecular weight polyester block copolymer from a crystalline aromatic polyester and, specifically, to provide a method for the preparation of a polyester block copolymer which is low in crystallinity, and which is excellent in heat resistance, processability, hydrolysis resistance, and which has a high melt viscosity and a higher molecular weight.

The present inventors, as a result of an investigation of a method for the preparation of a polyester block copolymer in which crystallinity is lowered in a crystalline aromatic polyester, and which is excellent in heat resistance, processability, hydrolysis resistance, and which has a high melt viscosity, found out that in the method for the preparation of a polyester block copolymer (P1) by allowing to react the crystalline aromatic polyester with lactones, thermal characteristics of the polyester block copolymer (P1) can be improved by controlling an introducing amount of unreacted lactones remained in the polyester block copolymer (P1) obtained by the reaction and a polyester block copolymer (P'1) obtained through a reaction in a solid phase can be more highly-polymerized, and the present invention No. II has been completed.

Purpose of the present invention No. III is to provide a polyester block copolymer composition and a method for the preparation thereof, which is excellent in heat resistance, hydrolysis resistance and color hue, and which has a high melt viscosity and melt viscosity stability, and which is appropriate in molding processing.

The present inventors, as a result of an intensive investigation for obtaining a resin composition which is excellent in heat resistance and hydrolysis resistance and a polyester block-based copolymer which has a high melt viscosity and a melt viscosity stability and which is appropriate in molding processability, have found that the above-described problems can be solved by heating under a specified condition after mixing a mono or more functional epoxy compound with the polyester block copolymer, and the present invention No. III has been completed.

Purpose of the present invention No. IV is to solve a problem that thermal deterioration is accelerated and heat resistance becomes insufficient by a combined action of a produced copper ion with a covered PVC or hydrochloric acid isolated from the covered PVC because the above-described heater cable is exposed to heat cycles and temperature elevates to approximately 100° C. or so, and the heat-sensitive body such as a nylon 12 and nylon 11 is brought into contact with copper or a copper alloy which is a short wire or a heating wire, and those are brought into contact with a PVC cover at a clearance between wound short wires.

The present inventors, as a result of an intensive investigation for solving the problems in the prior arts, have found out that a polyester block copolymer composition is not apt to be suffered by a combined thermal deterioration even under a circumstance in which it is brought into contact with a metal such as copper and copper alloy and PVC, the composition is excellent in heat resistance and hydrolysis resistance, the composition is obtained by allowing to react a polyester copolymer with an epoxy compound after mixing a polyester block copolymer with a specified epoxy compound and a metal complex and heating and kneading, and the present invention No. IV has been completed.

Purpose of the present invention Nos. V, VI, and VII is to provide a polyester block copolymer composition which has an excellent moldability, excellent heat resistance, and rubbery elasticity, and which can be applied to a variety of molding such as blow molding without any problems.

The present inventors, as a result of an intensive investigation, have found out that a polyester block copolymer composition can solve the above-described problems by an elevated strain-hardening property, and the present invention Nos. V and VI have been completed. The polyester block copolymer composition is obtained by mixing a polyester block copolymer with an epoxy compound, and then, heating and kneading. The polyester block copolymer is obtained by copolymerizing through adding a multifunctional compound having three or more carboxylic groups or hydroxyl groups while allowing to react a crystalline aromatic polyester with lactones.

The present inventors have found out that a polyester block copolymer composition can solve the above-described problems by an elevated strain-hardening property, and the present invention No. VII have been completed. The polyester block copolymer composition is obtained by adding an epoxy compound to a polyester block copolymer and heating in a solid phase. The polyester block copolymer is obtained by adding a specified amount of an aliphatic or aromatic multifunctional compound having a specified multifunctional group while allowing to react a crystalline aromatic polyester with lactones.

That is, the present invention No. 1 relates to a method for the preparation of a polyester block copolymer (P1) characterized in that in the method for the preparation of 100% by weight of the polyester block copolymer (P1) by allowing to react A% by weight of a crystalline aromatic polyester (A1) with B% by weight of lactones (B) (proviso that A+B=100), not less than (B+0.5)% by weight of lactones (B) are introduced into A% by weight of a crystalline aromatic polyester (A1), and not less than 0.5% by weight of unreacted lactones are remained with respect to 100% by weight of the polyester block copolymer (P1) after preparation of the copolymer.

The present invention No. 2 relates to a method for the preparation of a polyester block copolymer (P1) as described in the present invention No. 1, in which not less than (B+2.5)% by weight of the lactones (B) are introduced and not less than 2.5% by weight of unreacted lactones are remained with respect to 100% by weight of the polyester block copolymer (P1) after preparation of the copolymer.

The present invention No. 3 relates to a method for the preparation of a polyester block copolymer (P1) as described in the present invention No. 1 or 2, in which reaction proportion (A)/(B) of the crystalline aromatic polyester (A1) with respect to the lactones (B) is 95/5–20/80.

The present invention No. 4 relates to a method for the preparation of a polyester block copolymer (P1) as described in any one of the present invention Nos. 1–3, in which the unreacted lactones are removed from the polyester block copolymer (P1) after reaction.

The present invention No. 5 relates to a method for the preparation of a polyester block copolymer (P1) as described in any one of the present invention Nos. 1–4, in which the unreacted lactones are continuously removed.

The present invention No. 6 relates to a method for the preparation of a polyester block copolymer (P1) as described in any one of the present invention Nos. 1–5, in which the crystalline aromatic polyester (A1) and the lactones (B) are continuously supplied into a reaction vessel and allowed to addition-polymerize, and the polyester block copolymer (P1) is continuously taken out.

The present invention No. 7 relates to a method for the preparation of a polyester block copolymer (P1) as described in any one of the present invention Nos. 1–6, in which the crystalline aromatic polyester (A1) is a polybutylene terephthalate.

The present invention No. 8 relates to a method for the preparation of a polyester block copolymer (P1) as described in any one of the present invention Nos. 1–7, in which the lactones (B) are caprolactone.

The present invention No. 9 relates to a method for the preparation of a polyester block copolymer (P'1) having a high molecular weight characterized in that after having prepared the polyester block copolymer (P1) as described in any one of the present invention Nos. 1–8, it is further allowed to react in a solid phase.

The present invention No. 10 relates to a method for the preparation of a polyester block copolymer (P'1) having a high molecular weight as described in the present invention No 9, in which reaction in a solid phase is continuously conducted.

The present invention No. 11 relates to a polyester block copolymer composition (R) obtained by thermally-processing a polyester block copolymer composition (Q) obtained by melt-mixing 100 parts by weight of a polyester block copolymer (P) with 0.1–5 parts by weight of an epoxy compound (C) having one or more epoxy groups under an inert gas atmosphere and not less than 120° C. in a solid phase, and further, at a temperature lower than a melting point of the polyester block copolymer composition (R) obtained.

The present invention No. 12 relates to a polyester block copolymer composition (R) as described in the present invention No. 11, characterized in that the polyester block copolymer (P) is a polyester block copolymer (P1) obtained by allowing to react a crystalline aromatic polyester (A1) with lactones (B).

The present invention No. 13 relates to a polyester block copolymer composition (R) as described in the present invention No. 11, characterized in that the polyester block copolymer (P) is a polyester block copolymer (P2) obtained by a polycondensation and/or ring-opening polymerization of monomer components constructing a crystalline aromatic polyester (A1); monomer components constructing a low crystalline polyester (A4); an aliphatic polyether (A2); and/or polylactone (A3).

The present invention No. 14 relates to a polyester block copolymer composition (R) as described in any one of the present invention Nos. 11–13, characterized in that the epoxy compound (C) is an epoxy compound (C2) having two or more epoxy groups.

The present invention No. 15 relates to a polyester block copolymer composition (R) as described in any one of the present invention Nos. 11–14 which is obtained by thermally-processing the polyester block copolymer composition (Q) at not less than 150° C. and, moreover, at a temperature of 100- to 5° C.-lower than a melting point of the polyester block copolymer composition (R).

The present invention No. 16 relates to a polyester block copolymer composition (R) as described in any one of the present invention Nos. 11–15 which is obtained by further thermally-processing the polyester block copolymer composition (Q) after preheating at a temperature less than a melting point of the polyester block copolymer composition (R) and, moreover, at a temperature of not more than 150° C.

The present invention No. 17 relates to a polyester block copolymer composition (R) as described in any one of the present invention Nos. 11–16 in which there are formulated at least one kind of compounds selected from the group consisting of a hindered phenol-based compound, a sulphur-based compound, a phosphorus-based compound, a phenyl amine-based compound, and a hindered amine-based compound.

The present invention No. 18 relates to a polyester block copolymer composition (R) as described in any one of the present invention Nos. 11–17, in which an acid value is not more than 0.5 mgKOH/g in the polyester block copolymer composition (R) and, moreover, a melting point (Tm(R)) of the composition (R) is not less than a 10° C.-lower temperature than a melting point (Tm(P)) of the polyester block copolymer (P) which is a raw material.

$$Tm(P)-10° C. \leq Tm(R)$$

The present invention No. 19 relates to a polyester block copolymer composition (R) as described in any one of the present invention Nos. 11–18, in which a melt viscosity stability (MI(T, P, t+10)/(MI(T, P, t)) is 0.5–2.0 in the polyester block copolymer composition (R).

In the formula, the melt index (MI(T, P, t)) value is a value measured at a heating temperature (T), loading (P), and heating time of period (t) based on a method described in JIS K7210. Herein, T is a temperature higher than a 5° C.-higher temperature than a melting point of the composition (R) and, it is a minimum temperature of experimental temperatures described in Table 1 of the JIS K7210, and P is a value selected as ranging in 1–30 g/10 minutes in the MI value. The MI(T, P, t+10) is a value in which the heating time of period is t+10 minutes in conditions of the T and P.

The present invention No. 20 relates to a method for the preparation of a polyester block copolymer composition (R)

characterized in that there is thermally-treated a polyester block copolymer composition (Q) in which 100 parts by weight of a polyester block copolymer (P) is thermally mixed with 0.1–5 parts by weight of an epoxy compound (C) having at least one epoxy groups under an inert gas atmosphere and at not less than 120° C. in a solid phase and a temperature less than a melting point of the obtained polyester block copolymer composition (R).

The present invention No. 21 relates to a polyester block copolymer composition which comprises thermally-mixing 100 parts by weight of a polyester block copolymer (P1) obtained by a reaction of a crystalline aromatic polyester (A1) and lactones (B) with 0.5–5.0 parts by weight of a mono or more functional epoxy compound (C) and 0.01–3.0 parts by weight of a complex-formable agent for a metal (G).

The present invention No. 22 relates to a polyester block copolymer composition as described in the present invention No. 21, characterized in that the crystalline aromatic polyester (A1) is a polyester of an aromatic dicarboxylic acid which is an essential acid component (a) and an aliphatic dicarboxylic acid and/or a cycloaliphatic dicarboxylic acid which are optionally added with an aliphatic diol, an aromatic diol, and/or a cycloaliphatic diol which are a diol component (b).

The present invention No. 23 relates to a polyester block copolymer composition as described in the present invention No. 21, in which the crystalline aromatic polyester (A1) contains not less than 50% by weight of total of butylene terephthalate and ethylene terephthalate units.

The present invention No. 24 relates to a polyester block copolymer composition as described in any one of the present invention Nos. 21–23, in which a copolymerization proportion (A1/B) of the crystalline aromatic polyester (A1) with the lactones (B) is 97/3–50/50 by weight.

The present invention No. 25 relates to a polyester block copolymer composition as described in any one of the present invention Nos. 21–24, in which the epoxy compound (C) is a glycidyl type epoxy compound, a compound shown by any one of general formulae (I)–(V) described below, and a mixture thereof.

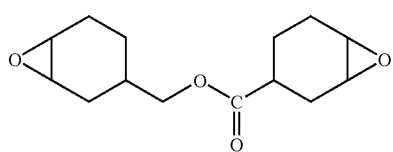 (I)

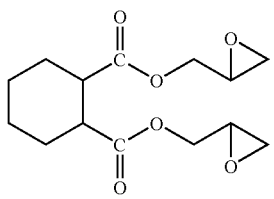 (II)

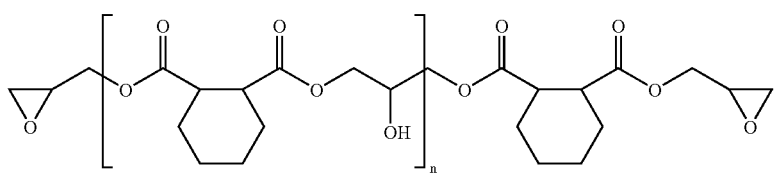 (III)

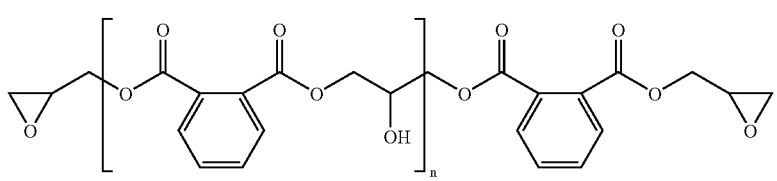 (IV)

(V)

(in the formulae, R1, R2, R3 are an alkyl group and, at least one of those are a methyl group, and total thereof is 8 pieces. Further, "n" is 0–5.)

The present invention No. 26 relates to a polyester block copolymer composition as described in any one of the present invention Nos. 21–25, in which the complex-formable agent for a metal (G) is at least one kind selected from the group consisting of an oxalic acid derivative, a salicylic acid derivative, and a hydrazide derivative.

The present invention No. 27 relates to a heat-sensitive body for a heater cable composed of a polyester block copolymer composition as described in any one of the present invention Nos. 21–26.

The present invention No. 28 relates to a polyester block copolymer composition which comprises, in obtaining the polyester block copolymer composition by allowing to react the crystalline aromatic polyester (A1) with the lactones (B), adding and thermally-kneading 0.5–5.0 parts by weight of an epoxy compound (C) having one or more pieces of epoxy groups (including at least 0.2 part by weight of two or more functional epoxy compound) and 0–2.0 parts by weight of a carbodiimide compound (E) to 100 parts. by weight of a polyester block copolymer (P3) obtained by allowing to react 0.1–100% by mol at least three pieces of at least one kind of a multifunctional compound (D) having at least three pieces of carboxylic group (i), hydroxyl group (ii), and/or an ester-formable group therefrom (iii) with 100% by mol of a crystalline aromatic polyester (A1).

The present invention No. 29 relates to a polyester block copolymer composition which comprises, in obtaining the polyester block copolymer composition by allowing to react the crystalline aromatic polyester (A1) with the lactones (B), adding and thermally-kneading 0.1–5.0 parts by weight of at least one kind of an epoxy compound (C) having one or more pieces of epoxy groups and 0–2.0 parts by weight of a carbodiimide compound (E) to 100 parts by weight of a polyester block copolymer (P3) obtained by allowing to react 0.1–200% by mol of at least one of a multifunctional compound (D) having at least three pieces of carboxylic group (i), hydroxyl group (ii), and/or an ester-formable group therefrom (iii) with 100% by mol of a crystalline aromatic polyester (A1).

The present invention No. 30 relates to a polyester block copolymer composition as described in the present invention No. 28 or 29, in which the crystalline aromatic polyester (A1) is a polyester of an aromatic dicarboxylic acid which is an essential acid component (a) and an aliphatic dicarboxylic acid and/or a cycloaliphatic dicarboxylic acid which are optionally added with an aliphatic diol, an aromatic diol, and/or a cycloaliphatic diol which are a diol component (b).

The present invention No. 31 relates to a a polyester block copolymer composition as described in any one of the present invention Nos. 28–30, in which the crystalline aromatic polyester (A1) contains not less than 50% by weight of total of butylene terephthalate and/or ethylene terephthalate units.

The present invention No. 32 relates to a polyester block copolymer composition as described in any one of the present invention Nos. 28–30, in which a copolymerization proportion of the crystalline aromatic polyester (A1) with the lactones (B) is the same proportion as described in the present invention No. 24.

The present invention No. 33 relates to a polyester block copolymer composition as described in any one of the present invention Nos. 29–32, in which at least one kind of the multifunctional compound (D) contains carboxylic group (i) or an ester-formable group therefrom.

The present invention No. 34 relates to a polyester block copolymer composition as described in any one of the present invention Nos. 28–33, in which the epoxy compound (C) is the same compound as described in the present invention No. 25.

The present invention No. 35 relates to a polyester block copolymer composition as described in any one of the present invention Nos. 28–34, which is employed for blow molding.

The present invention No. 36 relates to a polyester block copolymer composition (R) which comprises, in obtaining the polyester block copolymer composition by allowing to react the crystalline aromatic polyester (A1) with the lactones (B), heating a polyester block copolymer composition (Q) in a solid phase, and the composition (Q) is obtained by formulating and melt-mixing 0.1–5.0 parts by weight of an epoxy compound (C) having one or more pieces of epoxy groups with 100 parts by weight of a polyester block copolymer (P) obtained by allowing to react 0.1–200% by mol of at least one kind of a multifunctional compound (D) having at least three pieces of carboxylic group (i), hydroxyl group (ii), and/or an ester-formable group therefrom (iii) with 100% by mol of a crystalline aromatic polyester (A).

The present invention No. 37 relates to a polyester block copolymer composition (R) as described in the present invention No. 36, in which the multifunctional compound (D) contains at least one of carboxylic group (i) or an ester-formable group therefrom.

The present invention No. 38 relates to a polyester block copolymer composition (R) as described in the present invention No. 36 or 37, in which the epoxy compound (C) contains at least one kind of a bifunctional epoxy compound.

The present invention No. 39 relates to a polyester block copolymer composition (R) as described in any one of the present invention Nos. 36–38, in which the polyester block copolymer composition (R) has an acid value of not more than 0.5 mgKOH/g and, moreover, a melting point Tm(R) is not more than a temperature of 5° C.-lower than a melting point Tm(P) of the polyester block copolymer (P) before adding the epoxy compound, that is, $Tm(R) \geq Tm(P)-5°$ C.

The present invention No. 40 relates to a polyester block copolymer composition as described in any one of the present invention Nos. 36–39, in which a melt viscosity stability (MI–B)/(MI–A) is 0.5–2.0 which is calculated from an MI value (MI–A) in the polyester block copolymer composition (R) and an MI value (MI–B) after heating for 10 minutes at a temperature selected so as to be a lower temperature in the temperature described in JIS K7210 which is a temperature of 5° C.-higher than Tm(R).

The present invention No. 41 relates to a polyester block copolymer composition as described in any one of the present invention Nos. 36–40, which is a composition for blow molding.

The present invention No. 42 relates to a method for the preparation of a polyester block copolymer composition (R) characterized in that in obtaining the polyester block copolymer composition by allowing to react the crystalline aromatic polyester (A) with the lactones (B), there is heated a polyester block copolymer composition (Q) in a solid phase, and the composition (Q) is obtained by formulating and melt-mixing 0.1–5.0 parts by weight of an epoxy compound (C) having one or more pieces of epoxy groups with 100 parts by weight of a polyester block copolymer (P) obtained by allowing to react 0.1–200% by mol of at least one of a multifunctional compound (D) having at least three pieces of carboxylic group (i), hydroxyl group (ii), and/or an ester-formable group therefrom (iii) with 100% by mol of a crystalline aromatic polyester (A).

The present invention No. 43 relates to a method for the preparation of a polyester block copolymer as described in the present invention No. 42, in which heating is conducted in a solid phase at conditions of from a temperature lower than a melting point in a solid phase of the polyester block copolymer composition (R) to a temperature higher than a glass transition temperature under an inert gas atmosphere and, moreover, heating is conducted at a temperature (Ta) higher than 120° C.

$Tg<Ta<Tm$ (R), and

120° C.$<Ta$

The present invention No. 44 relates to a method for the preparation of a polyester block copolymer as described in the present invention No. 42, in which the temperature heating in a solid phase is 100- to 5C.°-lower than a melting point in a solid phase of the polyester block copolymer composition (R) and, moreover, heating is conducted at a temperature (Ta) higher than 150° C.

$Tm(R)-100°$ C.$\leq Ta \leq Tm(R)-5°$ C., and

150° C.$\leq Ta$

The present invention No. 45 relates to a method for the preparation of a polyester block copolymer as described in any one of the present invention Nos. 42–44, in which heating is conducted in a solid phase at conditions of, (1) a temperature ranges from a temperature lower than a melting point of the polymer to a temperature higher than a glass transition temperature in a solid phase and, moreover, preheating is conducted at a lower temperature than 150° C. and a temperature (Tb) lower than Ta, and then, (2) a temperature ranges from a temperature lower than a melting point of the polymer to a temperature higher than a glass transition temperature in a solid phase and, moreover, heating is conducted at a temperature higher than 120° C., Preheating temperature Tb $Tg<Tb<Tm(R)$, $Tb<150°$ C., and $Tb<Ta$ Heating temperature Ta $Tg<Ta<Tm(R)$, and $120°$ C.$<Ta$

BRIEF DESCRIPTION OF DRAWINGS

FIG. 1 is an outlined drawing which shows an example of a structure in a heater cable.

BEST MODE FOR CARRYING OUT THE INVENTION

Hereinafter, the present invention No. I will be illustrated in detail.

The polyester block copolymer (P1) obtained in the present invention, if it is a copolymer having a hard segment primarily containing the crystalline aromatic polyester (A1) and at least partially having a polylactone segment formed by a reaction of the lactones (B), is not particularly limited and, further, in addition to an aliphatic polyether and an aliphatic polyester, it may even contain one or more kinds selected from a polyester composed of a combination of an aromatic dicarboxylic acid, an aliphatic dicarboxylic acid, or an oxycarboxylic acid with glycols having a carbon number of 2–12, and which has a lower melting point than that of the crystalline aromatic polyester (A1) as other copolymer segments.

<Crystalline Aromatic Polyester (A1)>

The crystalline aromatic polyester (A1) is a polyester of an aromatic dicarboxylic acid which is an essential component and, an aliphatic dicarboxylic acid and/or a cycloaliphatic dicarboxylic acid which are optionally added as an acid component (a) with an aliphatic diol, an aromatic diol, and/or a cycloaliphatic diol, and which is a polymer mainly having an ester bond, and which has hydroxyl group and/or carboxylic group, preferably, hydroxyl group at the molecular terminals.

<Acid Component (a)>

As the acid component (a) which constructs the crystalline aromatic polyester (A1), for example, there are specifically enumerated terephthalic acid, isophthalic acid, 2,6-naphthalene dicarboxylic acid, biphenyl dicarboxylic acid, etc., which are an aromatic dicarboxylic acid, and an ester thereof.

Further, as the aliphatic dicarboxylic acid which is optionally added, a dicarboxylic acid having a carbon number of 2–20 is appropriate and, for example, there are specifically enumerated succinic acid, glutaric acid, adipic acid, azelaic acid, sebasic acid, dodecanoic diacid, and a dimer acid, etc.

Further, as the cycloaliphatic dicarboxylic acid, for example, 1,4-cyclohexane dicarboxylic acid, etc. is enumerated.

The dicarboxylic acids, in the case of employing as a raw material, may be even an ester, a chloride of an acid, and an anhydride.

<Diol Component (b)>

As the diol component (b) for the crystalline aromatic polyester (A1), for example, there are specifically enumerated 1,4-butanediol, 1,3-butanediol, 1,2-butanediol, ethyleneglycol, propylene glycol, 1,2-propanediol, 1,3-propanediol, 1,5-pentanediol, 3-methyl-1,5-pentanediol, 1,9-nonanediol, 1,6-hexanediol, neopentyl glycol, and a polymethylene glycol, etc. which are an aliphatic diol.

Further, as the aromatic diol, for example, there are enumerated hydroquinone, resorcinol, naphthalene diol, 2,2-bis (4-hydroxyphenyl)propane, an adduct of ethylene oxide and propylene oxide, etc. to bisphenol A, for example, 2,2-bis(4-hydroxyethoxyphenyl)propane, 2,2-bis(4-hydroxydiethoxyphenyl) propane, 2,2-bis(4-hydroxytriethoxyphenyl)propane, and 2,2-bis(4-hydroxypolyethoxyphenyl) propane, etc.

Still further, as the cycloaliphatic diol, for example, there are enumerated 1,4-cyclohexane diol, 1,4-cyclohexane dimethanol, 2,2-bis(4-hydroxyethoxycyclohexyl)propane, and an adduct of ethylene oxide and propylene oxide, etc. to hydrogenated bisphenol A, etc.

As the crystalline aromatic polyester (A1), for example, there are specifically enumerated a polyethylene terephthalate, polybutylene terephthalate, poly-1,4-cyclohexylene dimethylene terephthalate, a polyethylene-2,6-naphthalate, and a polybutylene-2,6-naphthalate, etc. Further, there can be also enumerated a copolymerized polyester in which there are further copolymerized an aliphatic dicarboxylic acid unit such as isophthalic acid, adipic acid, sebasic acid, and dodecanoic diacid, and p-oxybenzoic acid unit with a mixture of the polyesters and the polyesters. Of those, polybutylene terephthalate is particularly preferred because of an excellent crystallinity.

As the crystalline aromatic polyester (A1), there may be employed ones produced in a melting state by publicly-known methods without any modifications, or there may be even employed ones melted again after having once molded into a solid such as pellets and, further, there may be even employed ones melted after having added the lactones (B) described below.

<Lactones (B)>

The lactones (B), if those are a cyclic ester which can be ring-opened, are not particularly limited, and there are enumerated a variety of 4 to 12-membered lactones, glycolide, lactide, and a mixture thereof, etc. Of those, there are preferred ε-caprolactone, δ-valerolactone, β-propiolactone, glycolide, and an alkylated product thereof, for example, β-methyl-δ-valerolactone, and lactide, etc. Particularly, ε-caprolactone is preferred from a viewpoint of a thermal stability, a reactivity with the crystalline aromatic polyester, and profitability.

As use proportion of both in a reaction of the crystalline aromatic polyester (A1) with the lactones (B), (crystalline aromatic polyester (A1))/(lactones (B)) ranges in preferably 95/5–20/80, and more preferably 90/10–30/70. In the case that the crystalline aromatic polyester (A1) exceeds the upper limit of the use proportion, physical properties as a noncrystallinity or low crystallinity resin are insufficient in a polyester block copolymer (P1) obtained and, contrarily, in the case that it is less than the lower limit of the use proportion, flexibility is unpreferably insufficient as an elastomer resin.

In the present invention No. I, (B+0.5)% by weight of lactones (B) are introduced into A% by weight of a crystalline aromatic polyester (A1) and, B% by weight of lactones (B) is allowed to react with A% by weight of a crystalline aromatic polyester (A1) to obtain 100% (herein, A+B=100) by weight of the polyester block copolymer (P1), whereby, not lass than 0.5% by weight of unreacted lactones (B) are remained in 100% by weight of the copolymer (P1) after having prepared the polyester block copolymer (P1).

The above value of not less than 0.5% by weight is an amount of the unreacted lactones (B) which still remain in a period at which there completely terminates a reaction of A% by weight of the crystalline aromatic polyester (A1) with B% by weight of the lactones (B) which are raw materials, and it is a value selected as a basic value of (A+B=100)% by weight. In a higher value exceeding 0.5% by weight, reaction rate becomes quick. In the case of less than 0.5% by weight, reaction rate becomes remarkably low, resulting in that practicability is lost.

It is to be noted that the above-described unreacted lactones are a portion of the lactones employed in the reaction, and those remain after the reaction and, those mean the lactones having a same chemical structure as that of the lactones employed.

Usually, although cyclic esters are thermally produced again after once having reacted, or form a dimer and a trimer having a reactivity, those have a same structure as that in the raw materials, and the unreacted lactones do not include the dimer and the trimer. Reaction mass including the polyester block copolymer (P1) obtained in the reaction is analyzed by a variety of methods (there is enumerated a gas chromatographic analysis described hereinafter), and residual components actually observed are the unreacted lactones.

In the present invention No. I, the polyester block copolymer (P1), as described hereinabove, contains the hard segment based on the crystalline aromatic polyester (A1) and the segment based on the lactones (B), and it may further contain even other copolymer segments. A more specific method for the preparation thereof includes a combination of the aliphatic polyether (A2); the polylactone (A3); and the aromatic dicarboxylic acid, the aliphatic dicarboxylic acid or aliphatic oxycarboxylic acid with glycols having a carbon number of 2–12, and there may be even employed a noncrystalline or low crystalline polyester (collectively referred to as a low crystalline polyester (A4)) which is prepared so as to not show an actual melting point in a state introduced into the block copolymer together with the crystalline aromatic polyester (A1) and the lactones (B) described hereinabove.

As the aliphatic polyether (A2), there are enumerated a polyethylene glycol, a polytetramethylene glycol, and a polypropylene glycol, etc. Of those, the polytetramethylene glycol is particularly preferred because of an excellent stability and flexibility.

The polylactone (A3) is a polymer prepared by a ring-opening polymerization of the lactones (B), there are specifically enumerated a polybutyrolactone, a polyvalerolactone, a polycaprolactone, a polyenantolactone, and a polycaprylolactone, etc. Of those, the polycaprolactone is preferred from a viewpoint of stability.

The low crystalline polyester (A4) is an aliphatic polyester composed of a combination of the aliphatic dicarboxylic acid or aliphatic oxycarboxylic acid with the glycols having a carbon number of 2–12 and, specifically, there are enumerated a polybutylene succinate, a poly-1,6-hexanediol succinate, and a poly-1,6-hexanediol adipate, etc. Of those, the poly-1,6-hexanediol adipate is preferred from a viewpoint of stability.

The low crystalline polyester (A4) is a low crystalline polyester which is prepared so as to not show an actual melting point in the block copolymer composed of a combination of the aromatic dicarboxylic acid, aliphatic dicarboxylic acid or aliphatic oxycarboxylic acid with the glycols having a carbon number of 2–12 and, specifically, it is a polyester synthesized by allowing to polycondense or ring-opening polymerize the aromatic dicarboxylic acid such as terephthalic acid, isophthalic acid, and phthalic acid and an ester-formable derivative thereof, the aliphatic dicarboxylic acid having a carbon number of 2–12 or an ester-formable derivative thereof, the diol having a carbon number of 2–12 or an ester-formable derivative thereof, and the aliphatic oxycarboxylic acid with the glycols having a carbon number of 2–12 with 4- to 7-membered lactones.

<Polyester Block Copolymer (P1)>

In the above-descriptions, it is essential that the amount of the lactones (B) to be introduce is not less than (B+0.5)% by weight with respect to A% by weight of the crystalline aromatic polyester (A1), and the amount of the unreacted lactones is not less than 0.5% by weight. Preferably, the amount of the lactones (B) to be introduce is not less than (B+1.0)% by weight, and the amount of the unreacted lactones is not less than 1.0% by weight and, more preferably, the amount of the lactones (B) to be introduce is not less than (B+2.5)% by weight, and the amount of the unreacted lactones is not less than 2.5% by weight. In the case of being less than 0.5% by weight, a melting point lowers in the polyester block copolymer (P1) obtained and, further, quantity of heat to fuse decreases, particularly, a fusing peak gets abroad to a side of a lower melting point. On the other hand, in the case that the unreacted lactones exceeds 0.5, the amount is particularly limited, volatile components increase in the case that the polyester block copolymer (P1) is molded into pellets, resulting in that a working circumstance becomes worse and it becomes difficult to remove the unreacted lactones. Accordingly, it is preferred in not more than 20% by weight, and particularly not more than 10% by weight.

In the reaction of the crystalline aromatic polyester (A1) with the lactones (B), although catalysts for a reaction may be employed, the reaction may be even conducted in the absence of the catalysts.

As the catalysts, there can be employed a catalyst for esterification reaction, a catalyst for a transesterification reaction and a catalyst for a ring-opening polymerization of lactones which are publicly-known and, specifically, there are enumerated metals such as lithium, potassium, sodium, magnesium, calcium, barium, zinc, aluminum, titanium, cobalt, germanium, tin, antimony, cadmium, manganese, and zirconium, and organic metal compounds thereof, oxides, organic acid salts, alcolates, and alkoxides, etc. Particularly, there are preferred the organic metal compounds of tin, aluminum, titanium, zirconium, germanium, antimony, and cobalt, the oxides, organic acid salts, alcolates, and alkoxides, etc. It is to be noted that the catalysts may be even employed in combination of two or more kinds.

Temperature in the case that the crystalline aromatic polyester (A1) is allowed to react with the lactones (B), if it is those can react in a uniformly mixed state under agitation, is not limited. In the case that the crystalline aromatic polyester (A1) can be dissolved in the lactones (B), those can be sufficiently agitated at a temperature being not more than a melting point of the crystalline aromatic polyester (A1). However, in the case that it does not dissolve in the lactones (B) at a temperature being less than the melting point, since a decomposition reaction, etc. of the crystalline aromatic polyester (A1) proceed by heating depending upon the temperature, resulting in that there become worse physical properties in the polyester block copolymer (P1) obtained.

Accordingly, the reaction temperature preferably ranges in 20° C.-lower temperature and 50° C.-higher temperature than a melting point of the crystalline aromatic polyester (A1) to be employed. If it is the temperature range, there can be manifested an effect in the present invention even in any temperature.

Reaction time of period in the reaction of the crystalline aromatic polyester (A1) with the lactones (B) is not particularly limited, if it is a range of a reaction time of period during which the polyester block copolymer (P1) can be prepared by allowing to react both compounds and there can be actualized a method for the preparation thereof in which the amount of the unreacted lactones remained in the polyester block copolymer (P1) after the reaction can be controlled in not less than 0.5% by weight.

The reaction time of period in order actualize a method for the preparation for satisfying conditions in relation to the present invention varies depending upon temperature, conditions of agitation, and catalysts, etc., and it is usually 2–300 minutes, more preferably 5–120 minutes because productivity becomes worse by a long time reaction of period.

As an atmosphere in the case of allowing to react the crystalline aromatic polyester (A1) with the lactones (B), an inert gas atmosphere is basically preferred, or a compressed atmosphere not substantially having a gas phase portion is preferred. Color hue, molecular weight, and hydrolysis resistance, etc. in a resin become worse by the presence of oxygen and moisture.

Pressure in the reaction of the crystalline aromatic polyester (A1) with the lactones (B) widely ranges from an ordinary pressure to 200 kg/cm$_2$ or so depending upon a shape of the reaction apparatus. In the case that a reaction system is under a compressed state, it is required to prevent a leak of oxygen and moisture from outside, and it is preferred to in advance remove gasses and moisture in the crystalline aromatic polyester (A1) with the lactones (B) by publicly-known methods. Specifically, the removal is conducted by combination of a treatment for reducing pressure, purging of an inert gas, and drying operation. In all cases, it is more preferred in the presence of a smaller amount of oxygen and moisture.

An apparatus for the reaction of the crystalline aromatic polyester (A1) with the lactones (B) is not particularly limited, if it is an apparatus in which there can be applied a variety of reaction conditions which include a feed of raw materials and an inert gas, etc., heating, compressing, mixing and agitation, and discharge, etc.

As a reaction apparatus for batchwise, there is employed a tank-type reaction vessel equipped with agitating blades. It is required that a most appropriate shape of the agitating blades is selected by reaction conditions to be conducted and, usually, a double-helical ribbon blade and a twisted lattice-shape blade, etc. are preferred. As a continuous reaction apparatus, there can be employed an apparatus, etc. which is excellent in mixing, formation of free surface, and a surface-renewal property in spite of an extruder having one or two agitating rods or a same shape. Further, a static mixer, etc. is appropriate, and these may be employed in combination of two or more kinds.

From the polyester block copolymer (P1) obtained by allowing to react in a variety of modes as described hereinabove, unreacted lactones can be removed. Even though an operation for removing is conducted, there sufficiently manifests an elevation of a thermal property in the polyester block copolymer (P1) as an effect by a method for the preparation in relation to the present invention.

Removal of the unreacted lactones remained in the polyester block copolymer (P1) can be actualized by reducing a pressure under heating or streaming an inert gas, etc.

In the removal of the unreacted lactones remained, heating temperature is not particularly limited because of being capable of conducting at a condition of agitating the polyester block copolymer (P1) in a melted state, or even in a state molded into pellets or powder. In the case of conducting in a melted state, there is preferred a temperature selected from a range of 5- to 50° C.-higher temperature than a melting point of the polyester block copolymer (P1). In the case of exceeding 50° C., a decomposition reaction thermally proceeds, and physical properties as a resin become worse in the polyester block copolymer (P1). On the other hand, in the case of conducting in a state molded into pellets or powder, there is preferred a temperature range of 5- to 100° C.-lower temperature than a melting point of the polyester block copolymer (P1) in consideration of avoidance of a blocking problem accompanied by heating between pellets or powder.

Specifically, it is preferably selected within a range of 100–280° C.

In the removal of the unreacted lactones remained, a pressure in the case of conducting under a reduced pressure is basically more preferred in a lower range, and it is preferably not more than 200 torr, and more preferably 0.1–50 torr in consideration of profitability.

On the other hand, in the case of conducting under an inert gas atmosphere which is not under a reduced pressure, including a case of conducting under streaming the gas, there is preferably employed a typical inert gas such as nitrogen, argon, and helium. However, in the case of capable of maintaining the polyester block copolymer (P1) at a sufficiently low temperature and in the case that a reaction thermally-deteriorated by oxygen does not become problematic, air can be also employed. Also in the case, it is more preferred to remove moisture in a state as low as possible.

As an apparatus for removing the unreacted lactones remained, if it is an apparatus by which the unreacted lactones can be taken out of a system in a volatile state, it is not particularly limited.

For example, a batchwise tank-type reaction vessel may be even maintain in a reduced pressure state, and there may be continuously or batchwise employed an apparatus having one or more agitating rods for agitation, surface renewal, and surface formation in a horizontal or vertical column-type reaction vessel. Further, two or more sets of the apparatuses may be employed in combination. In a solid state, there can be also employed either a column-type apparatus such as a hopper dryer, or an apparatus in which a tank-type reaction vessel can be vibrated or rotated.

Conditions such as the above-described reaction, temperature, pressure, agitation in relation to the removal of the unreacted lactones may be optionally appropriately modified without being maintained until termination of an actual synthesis of the polyester block copolymer (P1) or termination of the removal of the unreacted lactones.

In the case of a method for the preparation in which a batchwise apparatus is employed, since resins are gradually taken out, and the unreacted lactones are occasionally removed, although an amount of the unreacted lactones fluctuates in every taking out, the amount of the above-described unreacted lactones remained is a weighted mean value in an amount of unreacted lactones in every resins taken out. On the other hand, in the case that a removal operation of the unreacted lactones is conducted in an identical apparatus from a total reaction mass without gradually taking out resins after a reaction in which a batchwise apparatus is employed, the amount is shown by an amount of the unreacted lactones immediately before conducting a removal operation.

In the case that the crystalline aromatic polyester is allowed to react with the lactones in a continuous reaction apparatus, the amount shows an amount of the unreacted lactones in resins continuously taken out. After that, there is conducted a removal operation of the unreacted lactones.

An effect by the present invention becomes higher in the case that at least partial step, particularly, a polymerization step is continuously conducted. This depends upon that it is easy to constantly maintain the amount of the unreacted lactones in relation to the present invention in the continuous polymerization process.

In the present invention, the reaction of the crystalline aromatic polyester (A1) with the lactones (B) may be even conducted under the presence of an antioxidant and a thermal stabilizer, etc.

Such the compounds may be added at any one of an initial period of the reaction, during the reaction, and a final period of the reaction. Further, there may be simultaneously or separately added additives such as pigments, a weatherability agent, a metal-capping agent, fillers, and a modifier together with the above-described additives.

The polyester block copolymer (P1) obtained by the present invention No. I can be employed in every uses such as parts for cars, parts for electric equipments, and industrial goods which are molded by molding methods such as injection molding, extrusion molding, and blow molding, etc. and, particularly, it is preferably employed for uses such as a fusibly-cutting layer in a heater cable in which properties in melting are important.

Hereinafter, the present invention No. II will be illustrated in detail.

As described hereinabove, there may be highly-polymerized a reaction mass of the polyester copolymer (P1) obtained by the reaction of the crystalline aromatic polyester (A1) with the lactones (B) in the present invention No. I in which a fixed amount of the unreacted lactones are remained by a polycondensation of the the polyester block copolymer (P) in a solid phase while removing the unreacted lactones, or the reaction mass may be even highly-polymerized by a polycondensation while balancing the reaction of the polyester copolymer with the unreacted lactones in a solid phase without removing the unreacted lactones.

In the case of removing the unreacted lactones remained the reaction mass of the polyester block copolymer (P1), there can be applied the method for removing the unreacted lactones, apparatus, and conditions described in the present invention No. I.

In the second step, reaction in the solid phase is conducted at a temperature not more than a melting point of a polyester block copolymer having a high molecular weight (P'1) obtained, and it is preferably conducted at not more than 5° C.-lower temperature than a melting point of the polyester block copolymer (P'1) and not less than 130° C. for the purpose of allowing to proceed a polycondensation reaction while avoiding a problem such as blocking, and more preferably at not more than 20° C.-lower temperature than the melting point and not less than 150° C.

In the polycondensation in a solid phase, an atmosphere may be any one of under a reduced pressure or streaming a gas and, as the gas, there are preferred inert gases such as nitrogen, argon, and helium.

In the case that the gas pressure in the atmosphere is in a reduced pressure, it is more preferred in as lower pressure as possible, and it preferably ranges in not more than 200 torr, and more preferably 0.01–50 torr.

Since moisture and oxygen in the inert gases make physical properties of resins worse, a smaller amount is more preferred, and those can be removed by publicly-known means. Reaction time of period in a solid phase can be freely selected by physical properties of resins obtained, and it usually ranges in 1–50 hours, preferably 6–35 hours, and more preferably 10–24 hours.

As an apparatus for allowing to react in a solid phase, if it is an apparatus by which the above-described operation can be conducted, it is not particularly limited. For example, there can be also employed either a column-type apparatus such as a hopper dryer, or an apparatus in which a tank-type reaction vessel can be vibrated or rotated. A more preferred operation can be conducted by separately arranging an apparatus for removing moisture and alcoholic components such as glycols produced by heating and residual volatile components such as unreacted lactones contained in the resins.

In the case of continuously conducting partial steps, particularly, a step for obtaining the polyester block copolymer (P'1) and a succeeding solid-phase reaction step, an effect by the present invention No. II becomes higher. This depends upon that it becomes easy to constantly maintain the amount of the unreacted lactones contained in the polyester block copolymer (P'1) in the continuous steps.

In the present invention, from the polyester block copolymer having a high molecular weight obtained by allowing to react as described hereinabove, unreacted lactones can be also removed. Even though such an operation is conducted, there sufficiently manifests an effect for elevating a thermal property in the polyester block copolymer having a high molecular weight by a method for the preparation in relation to the present invention. It is to be noted that since the amount of the unreacted lactones remained in the polyester block copolymer before being moved to the solid-phase reaction step has influence upon physical properties of the polyester block copolymer having a high molecular weight obtained, a preferred polyester block copolymer is obtained by in advance adding a fixed amount of lactones with respect to the crystalline polyester (A), and there can be adjusted a proportion of units based on the crystalline polyester (A) with respect to units based on the lactones (B) in the copolymer.

As a method, etc. for removing the unreacted lactones from a reaction product of the polyester block copolymer having a high molecular weight (P'1), there can be applied a variety of methods, apparatuses, and conditions employed for removing the unreacted lactones from the polyester block copolymer (P1) prepared in the first step of the present invention No. I, and the method, etc. may be different from the methods employed for removing the unreacted lactones from the polyester block copolymer (P1).

The above reaction and conditions for removing the unreacted lactones can be adjusted by changing temperatures, pressures, and agitating conditions, etc. until the polyester block copolymer having a high molecular weight (P'1) is actually obtained and the removal of the unreacted lactones terminates.

The polyester block copolymer having a high molecular weight (P'1) obtained by the present invention No. II can be employed in every uses such as parts for cars, parts for electric equipments, and industrial goods which are molded by molding methods such as injection molding, extrusion molding, and blow molding, etc. and, particularly, it is preferably employed for uses such as a fusibly-cutting layer in a heater cable in which properties in melting are important.

Hereinafter, the present invention No. III will be illustrated in detail.

In the polyester block copolymer (P) to be employed in the present invention No. III, a method for the preparation thereof is not particularly limited, if it is a polyester block copolymer containing a hard segment which is a crystalline aromatic polyester and a soft segment which is a copolymer component composed of an aliphatic polyether; a polylactone; and an aliphatic polyester, or a copolymer component composed of a combination of an aromatic dicarboxylic acid, an aliphatic dicarboxylic acid, and an aliphatic oxy-carboxylic acid with glycols having a carbon number of 2–12, and the copolymer component is combined by at least one or more kinds selected from polyesters having a lower melting point than that of the crystalline aromatic polyester which constructs the hard segment.

One of the polyester block copolymer (P) is a polyester block copolymer (P1) which is obtained by a reaction of the crystalline aromatic polyester (A1) with the lactones (B). As the copolymer (P1), there can be also employed the polyester block copolymer (P1) or the polyester block copolymer having a high molecular weight (P'1) shown in the present inventions No. I and No. II.

Another one of the polyester block copolymer (P) may be a polyester block copolymer (P2) which is obtained by a condensation and/or ring-opening polymerization of monomer components which construct the crystalline aromatic polyester (A1), monomer components which construct a low crystalline polyester (A4); an aliphatic polyether (A2); and/or a polylactone (A3).

As a method for the preparation of the polyester block copolymer (P), for example, there may be a method by a polycondensation of a dicarxoxylic acid component or an ester-formable derivative with a diol component, or an ester-formable derivative under the presence of a polymer constructing the soft segment in advance prepared or, even a method by a polycondensation or a ring-opening polymerization of a dicarxoxylic acid and an ester-formable derivative which construct a soft segment, a diol, or an ester-formable derivative, and/or lactones under the presence of a polymer constructing the hard segment.

The above-described methods can be batchwise or continuously conducted and, moreover, the polyester block copolymer (P) can be obtained by a tank-type reaction vessel equipped with agitating blades, a column-type reaction vessel equipped with agitating blades, a column-type reaction vessel equipped with fixed agitating blades, and even by an extruder.

<Hard Segment>
<Crystalline Aromatic Polyester>

As the crystalline aromatic polyester (A1) which constructs a hard segment in the present invention, there can be employed the same ones as illustrated in the present invention No. I.

<Soft Segment>

In the present invention, an aliphatic polyether (A2), a polylactone (A3), and a low crystalline polyester (A4) construct a soft segment. There can be employed the same ones as illustrated in the present invention No. I.

The above-described respective components which construct the soft segment have a lower melting point than that of the crystalline aromatic polyester which constructs a hard segment and, in almost cases, it does not show crystallinity in the polyester block copolymer (P). In the case that the soft segment is an aliphatic polyester component, a treatment in a melting state ends to proceed a transesterification reaction in addition to a decomposition reaction by heating, and it unpreferably lowers a melting point in a block copolymer composition (R). In the present invention No. III, since a heating treatment is conducted at a lower temperature, there can be remarkably reduced decomposition, discoloration, and a decline of a melting point.

As a proportion of the hard segment component with respect to the soft segment ranges in preferably 99/1–20/80, and more preferably 98/2–30/70 by weight, the hard segment component is composed of the crystalline aromatic polyester in the polyester block copolymer (P) to be employed in the present invention No. III, and the soft segment is composed of a polyether or aliphatic polyester having a lower melting point than that, (crystalline aromatic polyester)/(constructing components of the soft segment)

It is to be noted that the hard segment and the soft segment are not always chemically bonded, and a portion of those may form also a mixture.

In the case that a polycondensation reaction or a ring-opening polymerization are conducted in order to obtain the polyester block copolymer (P), catalysts may be even added and, reactions may be even conducted under the absence of catalysts. As the catalysts, there can be employed same ones as described in the present invention No. I.

<Epoxy Compound (C)>

The epoxy compound (C), which is allowed to react with the polyester block copolymer (P) in the present invention No. III, has at least one epoxy group, and it is not particularly limited in a structure thereof.

As the epoxy compound (C), there can be employed an epoxy compound (C1) having one epoxy group and an epoxy compound (C2) having at least two epoxy groups, and both compounds can be employed in combination. For example, there are enumerated a bisphenol type epoxy compound obtained by a reaction of bisphenol A with epichlorohydrin, a novolak type epoxy compound obtained by a reaction of a novolak resin with epichlorohydrin, glycidyl esters obtained by a reaction of a carboxylic acid with epichlorohydrin, a cycloaliphatic compound-type epoxy compound obtained from a cycloaliphatic compound, glycidyl ethers obtained from an aromatic compound and epichlorohydrin, an epoxidized butadiene, and an epoxy compound obtained from a compound having a double bond and a peroxide.

Specifically, there are enumerated an epoxy compound (C1) having one epoxy group such as methyl glycidylether and phenyl glycidylether, and an epoxy compound (C2)

having at least two epoxy groups such as diethylene glycol diglycidylether, diglycidyl phthalate, diglycidyl terephthalate, diglycidyl hexahydrophthalate, 3,4-epoxycyclohexylmethyl-3,4-epoxycyclohexanecarboxylate, an epoxidized polybutadiene, and an epoxidized styrene-butadiene-styrene block copolymer (an epoxidized SBS).

In the present invention No. III, addition amount of the epoxy compound (C) depends upon the amount of hydroxyl groups or carboxylic groups which exist in terminals of the polyester block copolymer (P) or properties to be required in a composition to be finally obtained, and it is preferably 0.1–5 parts by weight, and more preferably 0.2–3 parts by weight based on 100 parts by weight of the polyester block copolymer (P). In the case that the addition amount of the epoxy compound (C) is less than 0.1 part by weight, an action and effect (particularly, an effect for elevating heat resistance and hydrolysis resistance) by the present invention is not significantly shown and, in a large amount such as exceeding 5 parts by weight, it adversely affects to surface flatness and mechanical properties in a molded article.

The polyester block copolymer (P) is mixed with the epoxy compound (C) in a melted state. A method for mixing thereof is not limited at all and, if it is a method which is capable of uniformly mixing, any methods can be applied. Temperature of the epoxy compound (C) in melt-mixing ranges in preferably 3° C.- to 60° C.-higher temperature, and more preferably 5° C.- to 40° C.-higher temperature than a melting point of the polyester block copolymer (P). In the case that the temperature in melt-mixing is higher, decomposition reaction is thermally accelerated, whereby, resulting in that heat resistance, hydrolysis resistance, and color hue become worse. In the case that the temperature in melt-mixing is lower, there become worse crystallization and dispersion conditions of the epoxy compound (C). Time of period in melt-mixing is 10 second to 10 minutes or so, preferably, it is set up in 30 second to 5 minutes.

The reaction of the polyester block copolymer (P) with the epoxy compound (C) can be conducted under the presence of catalysts. There can be employed all catalysts which can be usually employed in a reaction of epoxides and, as specific examples, there are enumerated amines, phosphorus compounds such as triphenyl phosphine (TPP), a carboxylic acid, an organic sulphonic acid, sulphuric acid, and an acidic compound thereof, for example, a metal salts such as alkali metals and alkali earth metals. Further, the catalysts may be employed in combination of two or more kinds.

The catalysts may be simultaneously added together with the epoxy compound (C) and, may be added after dispersing the epoxy compound (C) into the polyester block copolymer (P) in a melted state or, contrarily, the epoxy compound (C) may be even added after dispersing the catalysts into the polyester block copolymer (P).

In the present invention No. III, an effect by the present invention can be effectively actualized by mixing one or more kinds of compounds selected from the group consisting of a hindered phenol-based compound, a sulphur-based compound, a phosphorus-based compound, an amine-based compound, and a hindered amine-based compound as a stabilizer.

Since the stabilizers have an effect for preventing oxidation to the polyester block copolymer composition or giving a thermal stability thereto, those are usually added to the polyester block copolymer (P) which is employed a raw material.

As specific examples of the stabilizers, there are enumerated an alkylated monophenol, for example, 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexcylphenol, 2,6-di-tert-butyl-4-methoxymethylphenol, 2,6-dinonyl-4-methylphenol, 2,4-dimethyl-6-(1'-methyl-undec-1'-yl)phenol, 2,4-dimethyl-6-(1'-methylheptadecyl-1'-yl)phenol, 2,4-dimethyl-6-(1'-methyl-tridec-1'-yl)phenol, and a mixture thereof, alkylthiomethylphenol, for example, 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol, hydroquinone and an alkylated hydroquinone, for example, 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butyl-hydroquinone, 2,5-di-tert-butyl-4-hydroxyanisole, 3,5-di-tert-butyl-4-hydroxyanisole, 3,5-di-tert-butyl-4-hydroxyphenyl stearate, and bis-(3,5-di-tert-butyl-4-hydroxyphenyl)adipate; a cumarone derivative, for example, α-tocopherol. β-tocopherol, γ-tocopherol, δ-tocopherol, and a mixture thereof (vitamin E); a hydroxylated thiodiphenylether, for example, 2,2'-thiobis(6-tert-butyl-4-methylphenol), 2,2'-thiobis(4-octylphenol), 4,4'-thiobis(6-tert-butyl-3-methylphenol),4,4'-thiobis(6-tert-butyl-2-methylphenol), 4,4'-thio-bis(3,6-di-sec-amylphenol), 4,4'-bis-(2,6-dimethyl-4-hydroxyphenyl)disulphide; an alkylidene bisphenol, for example, 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-(α-methylcyclohexylphenol, 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylidenebis[6-(α-methylbenzyl)-4-nonylphenol], 2,2'-methylidenebis[6-(α,α-dimethylbenzyl)-4-nonylphenol], 4,4'-methylidenebis(2,6-di-tert-butylphenol), 4,4'-methylidenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethyleneglycol=bis[3,3-bis(3'-tert-butyl-4'-hydroxyphenyl) butylate], bis(3-tert-butyl-4-hydroxy-5-methylphenyl) dicyclopentadiene, bis[2-(3'-tert-butyl-2'-hydroxy-5'-methylbenzyl)-6-tert-butyl-4-methlyphenyl] terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)-pentane; O-, N- and S-benzyl compounds, for example, 3,5,3',5'-tetra-tert-butyl-4,4'-dihydroxybenzylether, octadecyl=4-hydroxy-3,5-dimethylbenzyl-mercaptoacetate, tridecyl=4-hydroxy-3,5-di-tert-butylbenzyl-mercaptoacetate, tris (3,5-di-tert-butyl-4-hydroxybenzyl)amine, bis(4-tert-butyl-3-hydroxy-2,6-dimethylbenzyl)dithiophthalate, bis(3,5-di-tert-butyl-4-hydroxybenzyl)sulphide, isooctyl=3,5-di-tert-butyl-4-hydroxybenzyl-mercaptoacetate; hydroxybenzylmaloate, for example, 2,2-bis(3,5-di-tert-butyl-4-hydroxy-5-methylbenzyl)dioctadecyl maloate, 2,2-bis (3,5-di-tert-butyl-4-hydroxybenzyl)di-dodecyl mercaptoethyl=maloate, 2,2-bis(3,5-di-tert-butyl-4-hydroxybenzyl)maloate=bis[4-(1,1,3,3-tetramethylbutyl)-phenyl]; a hydroxybenzyl aromatic compound, for example, 1,3, 5-tris(3, 5-di-tert-butyl-4-hydroxybenzyl)-2,4,6-trimethylbenzene, 1,4-bis (3,5-di-tert-butyl-4-hydroxybenzyl)-2,3,5, 6-tetramethylbenzene, 2,4,6-tris(3,5-di-tert-butyl-4-hydroxybenzyl)phenol; a triazine compound, for example, 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,3,5-triazine, 1,3,5-tris(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3, 5-di-tert-butyl-4-hydroxyphenylpropionyl) hexahydro-1,3,5-triazine, 1,3,5-tris(3,5-dicyclohexyl-4-hydroxybenzyl)isocyanurate; a benzylphosphonate, for example, 2,5-di-tert-butyl-4-hydroxybenzyldimethylphosphonate, 3,5-di-tert-butyl-4-hydroxybenzyldiethylphosphonate, 3,5-di-tert-butyl-4-hydroxybenzyldioctadecylphosphonate, 3,5-di-tert-butyl-4-hydroxy-3-methylbenzyldioctadecylphosphonate, calcium salt of 3,5-di-tert-butyl-4-hydroxybenzylmonoethylphosphonate; an acylaminophenol, for example, lauric 4-hydroxyanilide, stearic 4-hydroxyanilide, octyl=N-(3,5-di-tert-butyl-4-hydroxyphenyl)-carbamate; an ester of the following mono or polyvalent alcohol with β-(3,5-di-tert-butyl-4-hydroxyphenyl)propionate, an example of the alcohol: methanol, ethanol, n-octanol, isooctanol, octadecanol, 1,6-hexanediol, 1,9-nonanediol, ethyleneglycol, 1,2-propanediol, neopentylglycol, thiodiethyleneglycol, diethyleneglycol, triethyleneglycol, pentaerythritol, tris(hydroxyethyl) isocyanurate, N,N'-bis(hydroxyethyl)succinic diamide, 3-thiaundecanol, 3-thiapentadecanol, trimethylhexanediol, trimethylol propane, 4-hydroxymethyl-1-phospha-2,6,7-trioxabicyclo[2,2,2]octane; an ester of the following mono or polyvalent alcohol with β-(5-tert-butyl-4-hydroxy-3-methylphenyl)propionate, an example of the alcohol: methanol, ethanol, n-octanol, isooctanol, octadecanol, 1,6-hexanediol, 1,9-nonanediol, ethyleneglycol, 1,2-propanediol, neopentylglycol, thiodiethyleneglycol, diethyleneglycol, triethyleneglycol, pentaerythritol, tris (hydroxyethyl) isocyanurate, N,N'-bis(hydroxyethyl) succinic diamide, 3-thiaundecanol, 3-thiapentadecanol, trimethylhexanediol, trimethylol propane, 4-hydroxymethyl-1-phospha-2,6,7-trioxabicyclo[2,2,2]octane; an ester of the following mono or polyvalent alcohol with β-(3,5-dicyclohexyl-4-hydroxyphenyl)propionate, an example of the alcohol: methanol, ethanol, n-octanol, isooctanol, octadecanol, 1,6-hexanediol, 1,9-nonanediol, ethyleneglycol, 1,2-propanediol, neopentylglycol, thiodiethyleneglycol, diethyleneglycol, triethyleneglycol, pentaerythritol, tris(hydroxyethyl) isocyanurate, N,N'-bis(hydroxyethyl)succinic diamide, 3-thiaundecanol, 3-thiapentadecanol, trimethylhexanediol, trimethylol propane, 4-hydroxymethyl-1-phospha-2,6,7-trioxabicyclo[2,2,2]octane; an ester of the following mono or polyvalent alcohol with β-3,5-di-tert-butyl-4-hydroxyphenyl)acetate, an example of the alcohol: methanol, ethanol, n-octanol, isooctanol, octadecanol, 1,6-hexanediol, 1,9-nonanediol, ethyleneglycol, 1,2-propanediol, neopentylglycol, thiodiethyleneglycol, diethyleneglycol, triethyleneglycol, pentaerythritol, tris (hydroxyethyl) isocyanurate, N,N'-bis(hydroxyethyl) succinic diamide, 3-thiaundecanol, 3-thiapentadecanol, trimethylhexanediol, trimethylol propane, 4-hydroxymethyl-1-phospha-2,6,7-trioxabicyclo[2,2,2]octane; β-(3,5-di-tert-butyl-4-hydroxyphenyl)propionic amide, for example, N,N'-bis(3,5-di-tert-butyl-4-hydroxyphenylpropionyl)hexamethylene diamine, N,N'-bis(3,5-di-tert-butyl-4-hydroxyphenylpropionyl) trimethylene diamine, N,N'-bis (3,5-di-tert-butyl-4-hydroxyphenylpropionyl) hydrazine; an amine-based antioxidant, for example, N,N'-diisopropyl-p-phenylenediamine, N,N'-di-sec-butyl-p-phenylenediamine, N,N'-bis(1,4-dimethylpentyl)-p-phenylenediamine, N,N'-bis (1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(naphtyl)-p-phenylenediamine, N-isopropyl-N'-phenyl-p-phenylenediamine, N-(1,3-dimethylbutyl-N'-phenyl-p-phenylenediamine, N-(1-methylheptyl)-N'-phenyl-p-phenylenediamine, N-cyclohexyl-N'-phenyl-p-phenylenediamine, 4-(p-toluenesulphamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphtylamine, N-(4-tert-octylphenyl)-1-naphtylamine, N-phenyl-2-naphtylamine, octylated diphenylamine, for example, p,p'-di-tertiary-butyloctyl diphenylamine, 4-n-butylaminophenol, 4-butylylaminophenol, 4-nonanoyl aminophenol, 4-dodecanoylaminophenol, 4-octadodecanoylaminophenol, bis(4-methoxyphenyl) amine, 2,6-d-tertiarybutyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)aminoethane, 1,2-bis (phenylamino)propane, (o-tolyl)biguanide, bis[4-(1',3'-dimethylbutyl)phenyl]amine, tertiary-octylated N-phenyl-1-naphtylamine, a mixture of a mono- and dialkylated tert-butyl/tert-octyldiphenylamine, a mixture of a mono- and dialkylated tert-butyl/tert-nonyldiphenylamine, a mixture of a mono- and dialkylated tert-butyl/tert-dodecyldiphenylamine, a mixture of a mono- and dialkylated isopropyl/isohexcyldiphenylamine, a mixture of a mono- and dialkylated tert-butyldiphenylamine, 2,3-dihydro-3,3-dimethyl-4H-1,4-benzothiadine, phenothiadine, a mixture of a mono- and dialkylated tert-butyl/tert-octylphenothiadine, a mixture of a mono- and dialkylated tert-butyloctylphenothiadine, N-allylphenothiadine, N,N,N',N'-tetrapheyl-1,4-diaminobuto-2-en, N,N-bis(2,2,6,6-tetramethyl-pyperido-4yl) hexamethylenediamine, bis(2,2,6,6-tetramethylpyperido-4yl)sebacate, 2,2,6,6-tetramethyl-pyperidine-4-ol; 2-(2'-hydroxyphenyl)benzotriazole, for example, 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methyl-phenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis (α,α-dimethylbenzyl)-2'-hydroxyphenyl)benzotriazole, 2-(3'-tert-butyl-2'-hydroxy-5'-(2-octylcarbonylethyl)phenyl)-5-chloro-benzotriazole, and a mixture thereof, 2-(3'-tert-butyl-5'-[2-(2-ethylhexyloxy)carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl) benzotriazole, 2-(3'-tert-butyl-2'-hydroxy-5'-(2-octyloxycarbonylethyl)phenyl) benzotriazole, 2-(3'-tert-butyl-2'-hydroxy-5'-[2-(2-ethylhexyloxy)-carbonylethyl]-2'-hydroxyphenyl) benzotriazole, 2-(3'-dodecyl-2'-hydroxy-5'-methylphenyl) benzotriazole, and 2-(3'-tert-butyl-2'-hydroxy-5'-(2-isooctyloxycarbonylethyl)phenyl)benzotriazole, and 2,2'-methylene-bis[4-(1,1,3,3-tetramethylbutyl)-6-benzotriazole-2-yl-phenol]; an esterification product of 2-[3'-tert-butyl-5'-(2-methoxycarbonylethyl)-2'-hydroxyphenyl]-2H-benzotriazole with polyethyleneglycol 300;

[R—CH₂CH₂—COO(CH₂)₃—]₂ (in the formula, R=3'-tert-butyl-4'-hydroxy-5'-2H-benzotriazole-2-yl-phenyl); 2-hydroxybenzophenone, for example, 4-hydroxy-, 4-methoxy-, 4-octyloxy-, 4-decyloxy-, 4-dodecyloxy-, 4-benzyloxy-, 4,2,4-trihydroxy-, and 2'-hydroxy-4,4'-dimethoxy-derivatives; a substituted and nonsubstituted ester of benzoic acid, for example, 4-tert-butylphenyl salicylate, phenyl salicylate, octylphenyl salicylate, dibenzoyl resorcinol, bis(4-tert-butylbenzoyl) resorcinol, benzoyl resorcinol, 3,5-di-tert-butyl-4-hydroxy benzoicacid 2,4-di-tert-butylphenyl, 3,5-di-tert-butyl-4-hydroxy benzoic acid hexadecyl, 3,5-di-tert-butyl-4-hydroxy benzoic acid 2-methyl-4,6-di-tert-butylphenyl; a hindered amine-, for example, bis(2,2,6,6-tetramethyl-4-pyperidyl)sebacate, bis(2,2,6,6-tetramethyl-4-pyperidyl) succinate, bis(1,2,2,6,6-pentamethyl-4-pyperidyl)sebacate, n-butyl-3,5-di-tert-butyl-4-hydroxybenzyl maloate=bis(1,2,2,6,6-pentamethyl-4-pyperidyl), a condensation product of 1-(2-hydroxyethyl)-2,2,6,6-tetramethyl-4-hydroxypyperidine with succinic acid, a condensation product of 1-N,N'-bis(2,2,6,6-tetramethyl-4-pyperidyl)hexamethylenediamine with 4-tert-octyl-amino-2,6-dichloro-1,3,5-triazine, nitrylotriacetictris(2,2,6,6-tetramethyl-4-pyperidyl), 1,2,3,4-butanetetracarboxylic acid tetrakis(2,2,6,6-tetramethyl-4-pyperidyl), 1,1'-(1,2-ethanedyl)-bis(3,3,5,5-tetramethylpyperadinone)4-benzoyl-2,2,6,6-tetramethylpyperidine, 4-stearyloxy-2,2,6,6-tetramethylpyperidine, 2-n-butyl-2-(2-hydroxy-3,5-di-tert-butylbenzyl)malonic acid bis(1,2,2,6,6-pentamethylpyperidyl), 3-n-octyl-7,7,9,9-tetramethyl-1,3,8-triazaspyro[4,5]decane-2,4-dion, bis(1-octyoxy-2,2,6,6-tetramethylpyperidyl)sebacate, bis(1-octyoxy-2,2,6,6-tetramethylpyperidyl)succinate, a condensation product of N,N'-bis (2,2,6,6-tetramethyl-4-pyperidyl) hexamethylenediamine with 4-morpholino-2,6-dichloro-1,3,5-triazine, a condensation product of 2-chloro-4,6-bis(4-n-butylamino-2,2,6,6-tetramethyl-4-pyperidyl)-1,3,5-triazine with 1,2-bis(3-aminopropylamino)ethane, a condensation product of 2-chloro-4,6-bis(4-n-butylamino-1,2,2,6,6-pentmethyl-4-pyperidyl)-1,3,5-triazine with 1,2-bis(3-aminopropylamino) ethane, 8-acetyl-3-dodecyl-7,7,9,9-tetramethyl-1,3,8-triazaspyro[4,5]decane-2,4-dion, 3-dodecyl-1-(2,2,6,6-tetramethyl-4-pyperidyl)pyrodine-2,5-dion, 3-dodecyl-1-(1,2,2,6,6-pentamethyl-4-pyperidyl)pyrodine-2,5-dion, a mixture of 4-hexadecyloxy- and 4-stearyloxy-2,2,6,6-tetramethylpyperidines, a condensation product of N,N'-bis (2,2,6,6-tetramethyl-4-pyperidyl) hexamethylenediamine with 4-cyclohexylamino-2,6-di-chloro-1,3,5-triazine, a condensation product of 1,2-bis(3-aminopropylamino)ethane with 2,4,6-trichloro-1,3,5-triazine, and 4-butylamino-2,2,6,6-tetramethyl-4-pyperidine (CAS Reg. No. [136504-96-6]); N-(2,2,6,6-tetramethyl-4-pyperidyl)-n-dodecyl sucsineimide, N-(1,2,2,6,6-pentamethyl-4-pyperidyl)-n-dodecyl sucsineimide, 2-undecyl-7,7,9,9-tetramethyl-1-oxa-3,8-diaza-4-oxo-spyro[4,5]decane, a reaction product of 7,7,9,9-tetramethyl-2-cycloundecyl-1-oxa-3,8-diaza-4-oxo-spyro[4,5]decane with epichlorohydrin; 2-(2-hydroxyphenyl)-1,3,5-triazine, for example, 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propyloxy)phenyl]-4,6-bis(2,4-dimethylphenyl)-1,3,5-triazine, 2 [2-hydroxy-4-(2-hydroxy-4-(2-hydroxy-3-octloxy-propyloxy)phenyl]-4,6-bis(2,4-dimethylphenyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl)-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine; a phosphite or a phosphonite, for example, triphenyl phosphonite, diphenyl phosphonite=alkyl, phenylphosphonite=dialkyl, tris-nonylphenyl phosphonite, lauryl phosphonite, trioctadecyl phosphonite, distearyl=pentaerythritol=diphosphite, tris (2,4-di-tert-butyl-phenyl) phosphonite, diisodecyl=pentaerythritol=diphosphite, bis (2,4-di-tert-butyl-4-methylphenyl )=pentaerythritol=diphosphite, bis(2,6-di-tert-butyl-4-methylphenyl)=pentaerythritol=diphosphite, bis-isodecyl=pentaerythritol=diphosphite, bis (2,4-di-tert-butyl-6-methylphenyl)=pentaerythritol=diphosphite, bis (2,4,6-tri-tert-butyl-6-methylphenyl )=pentaerythritol=diphosphite, tetrakis (2,4-di-tert-butylphenyl) 4,4'-biphenylenephosphite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyl-dibenz[d,g]-1, 3,2-dioxaphosphocine, bis (2,4-di-tert-butyl-6-methylphenyl)methyl phosphite, and bis (2,4-di-tert-butyl-6-methylphenyl ) ethyl phosphite. Of those, tris(2,4-di-tert-butylphenyl)phosphite is preferred. Particularly, tris(2,4-di-tert-butylphenyl)phosphite is preferred.

Such the compounds may be in advance contained in the polyester block copolymer (P), and it may be even simultaneously added together with the epoxy compound (C) or, the epoxy compound (C) may be added after dispersing it in the polyester block copolymer (P) in a melting state or, contrarily, the compounds may be even dispersed in the epoxy compound (C).

Further, there may be simultaneously or separately added additives such as pigments, a weatherability agent and a metal-capping agent, fillers, and a modifier in the case of mixing.

The polyester block copolymer composition (Q) melt-mixed as described hereinabove becomes a polyester block copolymer composition (R) by further thermally-treating in a solid phase.

Temperature for thermally-treating the polyester block copolymer composition (Q) is not less than 120° C. and, moreover, a temperature less than a melting point of the polyester block copolymer composition (Q) obtained by thermally-treating.

In the case that the temperature for thermally-treating is not less than a melting point of the composition (R), a trouble by melting resins is caused in handling, and a thermal decomposition reaction is further accelerated. Further, in the case that the temperature for thermally-treating is less 120° C., there cannot be almost obtained an effect of heat resistance and hydrolysis resistance by the present invention. More preferably, it is thermally-treated at not less than 150° C. and, moreover, at 100- to 5° C.-lower temperature than the a melting point of the composition (R).

An atmosphere for thermally-treating is selected from inert gases such as nitrogen, helium, and argon.

A minor amount of impurities, particularly, oxygen and moisture are preferably decreased by methods which are usually employed. Such the inert gases may be even constantly streamed through an apparatus in which a thermal treatment is conducted and, if a gas atmosphere in the apparatus is nearly filled by the inert gases, a treatment may be even conducted in a sealed state of the apparatus. Further, an inside of the apparatus may be also maintained at a reduced pressure or a compressed state in same conditions and, the pressure may be fluctuated during the thermal treatment. In the case of reducing pressure, it is required that there is paid attention for volatilization of the various additives formulated in the polyester block copolymer (P) or the polyester block copolymer (R). Preferably, the thermal treatment is conducted while maintaining at from 1 torr to an ordinary pressure under a nitrogen atmosphere of not more than 1% by volume of oxygen concentration and not more than 1% by volume of moisture concentration. Time of period for the thermal treatment is decided according to resin properties required for the polyester block copolymer composition (R). Usually, it is preferably 1–3000 minutes. In the case of a shorter time than 1 minute, an effect by the present invention is very small and a lower time of period lowers productivity of the polyester block copolymer composition (R) of the present invention.

As an another embodiment for conducting the present invention, it is preferred to preheat the polyester block copolymer composition (Q) obtained by thermally-mixing the polyester block copolymer (P) with the epoxy compound (C) at a lower temperature than the melting point of the composition (R) and not more than 150° C. before maintaining at the above-described temperature for the thermal treatment. By preheating, there can be lowered a decomposition reaction of the polyester block copolymer composition (Q) at an initial period of the thermal treatment, resulting in that there can be remarkably shown an effect of an increase of melt viscosity, etc. in the present invention. In the case, as other conditions except the temperature, there are applied the same conditions as in the above-described thermal treatment, and it is preferred that the apparatus is not sealed. Further, it can be also conducted at an air atmosphere. In the case that the temperature in the preheating is higher than 150° C., the above-described effect by the preheating is small and, there is not shown a difference from the case of preheating alone. A more preferred temperature for the preheating is not more than 120° C.

The apparatus for conducting the heat treatment and preheating, if it is an apparatus by which the polyester block copolymer composition (Q) can be maintained at a desired time of period, a desired atmosphere, and pressure, is not particularly limited. Those can be conducted in combination of an apparatus which can be operated batchwise or continuously with an apparatus for supplying the inert gases, an apparatus for maintaining a reduced pressure, an apparatus for removing impurities from a discharged gas, and an apparatus for supplying again an inert gas from which the impurities are removed. A cone-blender and a hopper-blender, etc. can be preferably employed.

The polyester block copolymer composition (R) of the present invention can be obtained by thermally-treating the polyester block copolymer composition (Q) until being given a certain property.

<Acid Value>

An acid value is one of properties which are desired in the polyester block copolymer composition (R). The acid value is a numerical value which is measured by neutralizing acidic components contained in resins using a basic substance such as potassium hydroxide in a state dissolved in solvents, and it is represented by mg number (mgKOH/g) of potassium hydroxide to be required for neutralizing 1 g of the resin. In the composition (R) of the present invention, the acid value is preferred in not more than 0.5 mgKOH/g, more preferably not more than 0.2 mgKOH/g, and most preferably not more than 0.1 mgKOH/g. In the case that the acid value is more than 0.5 mgKOH/g, hydrolysis resistance becomes worse, resulting in that an effect is small in the present invention. According to the present invention, thermal decomposition and discoloration decrease by a lower temperature for thermally-treating, and such the physical properties can be actualized by a smaller addition amount of the epoxy compound (C).

Further, there can become suppressed a decline of crystallinity such as a decline of a melting point by the addition of the epoxy compound (C).

<Melt Viscosity Stability>

Further, another property desired in the polyester block copolymer composition (R) is a melt viscosity stability. In the case that the epoxy compound (C) employed remains in a large amount in an unreacted state, fluctuation of the viscosity is observed by remelting. The melt viscosity stability is represented by formula MI (T, P, and t+10)/MI (T, P, and t). In the formula, the melt index (MI (T, P, and t)) value is a value measured at heating temperature (T), loading (P), and heating time (t) based on a method described in JIS K7210. Herein, T is not less than 5° C.-higher temperature than the melting point of the composition (R), and it is a lowest temperature of experimental temperature described in Table 1 of the JIS K7210 and, P is a value selected so that the MI value becomes a range of 1–30 g/10 minutes. The MI (T, P, and t+10) value is a value in the case that the heating temperature is t+10 minutes at the conditions of the above T and P. In the composition (R) obtained in the present invention III, the melt viscosity stability is 0.5–2.0, more preferably 0.75–1.50, and most preferably nearly 1.

By the method of the present invention, since the thermal treating is conducted at a lower temperature, the remaining epoxy compound (C) can be allowed to sufficiently react while suppressing thermal decomposition and discoloration as low as possible, resulting in that the viscosity fluctuation can be reduced in a molding process.

In the polyester block copolymer composition (R) of the present invention No. III prepared as described hereinabove, color hue is clearly improved compared to a conventional resin composition obtained by melt-mixing alone. This depends upon that the treatment in a melting state for attaining any one of the two properties can be finished in a short time in the present invention III.

<Melting Point>

In the polyester block copolymer composition (R) prepared by the present invention No. III, decline of a melting point is smaller compared to that of a composition (R) prepared by a conventional method, that is, by melt-mixing alone. Melting point (Tm (R)) of the composition (R) is preferably not less than 10° C.-lower temperature than the melting point (Tm (P)) of the polyester block copolymer (P) which is a raw material.

$$Tm\ (P)-10°\ C.\leq Tm\ (R)$$

Further, it is preferably not less than 5° C.-lower temperature than the melting point (Tm (P)) of the copolymer (P), and more preferably not less than 3° C.-lower temperature.

Accordingly, the polyester block copolymer composition (R) obtained by the present invention No. III is more excellent in any one of heat resistance, hydrolysis resistance, color hue, an increase of melt-viscosity and melt-viscosity stability compared to a composition (R) obtained by a conventional method, that is, a composition (R) obtained by melt-mixing alone.

Hereinafter, the present invention No. IV will be illustrated in detail.

The present invention No. IV relates to a polyester block copolymer composition comprising heating and kneading after formulating 0.5–5 parts by weight of a one or more functional epoxy compound (C) and 0.01 part by weight to 3.0 parts by weight of a complex-formable agent for a metal (G) with respect to 100 parts by weight of the polyester block copolymer (P1) obtained by allowing to react a crystalline aromatic polyester (A1) with lactones (B).

First of all, there will be illustrated raw materials for employing the polyester block copolymer (P1) in relation to the present invention No. IV.

<Crystalline Aromatic Polyester (A1)>

As the crystalline aromatic polyester (A1) to be employed in the present invention No. IV, there can be employed a polyester containing the same components as the polyesters described in the present invention No. III.

As the crystalline aromatic polyester (A1) to be employed in the present invention, there is preferred a polyester having a high polymerization degree, a melting point of not less than 160° C., and a number average molecular weight of not less than 5,000.

Of constructing components in the crystalline aromatic polyester (A1), not less than 60% by weight of butylene terephthalate and/or ethylene terephthalate units are desirably contained in consideration of crystallinity, heat resistance, or costs of raw materials.

<Lactones (B)>

As the lactones (B) for lactone-modifying the crystalline aromatic polyester (A1), there can be employed the same lactones as in the present invention No. I.

Hereinafter, there is illustrated the polyester block copolymer (P1) in relation to the present invention No. IV.

<Polyester Block Copolymer (P1)>

The polyester block copolymer (P1) in relation to the present invention No. IV is obtained by allowing to react the lactones (B) with terminal groups in the above-described crystalline aromatic polyester (A1) by an addition-reaction. Copolymerization ratio (A/B) of the crystalline aromatic polyester (A1) with the lactones (B) is 97/3–50/50 by weight, particularly, preferably 90/10–55/45 by weight. In the case that the ratio of the lactones (B) is smaller than the range, flexibility of the polyester block copolymer does not manifest, resulting in that it is not appropriate for a heat-sensitive body and, in the case that it is larger than the range, heat resistance lowers in the polyester block copolymer.

Further, the crystalline aromatic polyester (A1) can be allowed to react with the lactones (B) through heating and kneading by optionally adding a catalyst.

Methods for allowing to react the crystalline aromatic polyester (A1) with the lactones (B), for example, are reported in detail in JP-B-73004115 and JP-B-77049037 Official Gazettes, US Patent 2,623,031, JP-B-85004518, JP-B-91077826, and JP-B-88031491 Official Gazettes, etc.

Hereinafter, there is illustrated the epoxy compound (C) which is allowed to react with the polyester block copolymer (P1).

<Epoxy Compound (C)>

The epoxy compound (C), if it is a compound having at least one epoxy groups in the molecule, is not particularly limited in the structure.

However, a cycloaliphatic or glycidyl ester type epoxy compound is more preferred than a glycidyl ether type epoxy compound in consideration of thermal history in formulating or molding a composition.

As the cycloaliphatic epoxy compound, although there can be specifically exemplified compounds shown in general formulae (I)–(V), it is not limited thereto.

[Chem. 1]

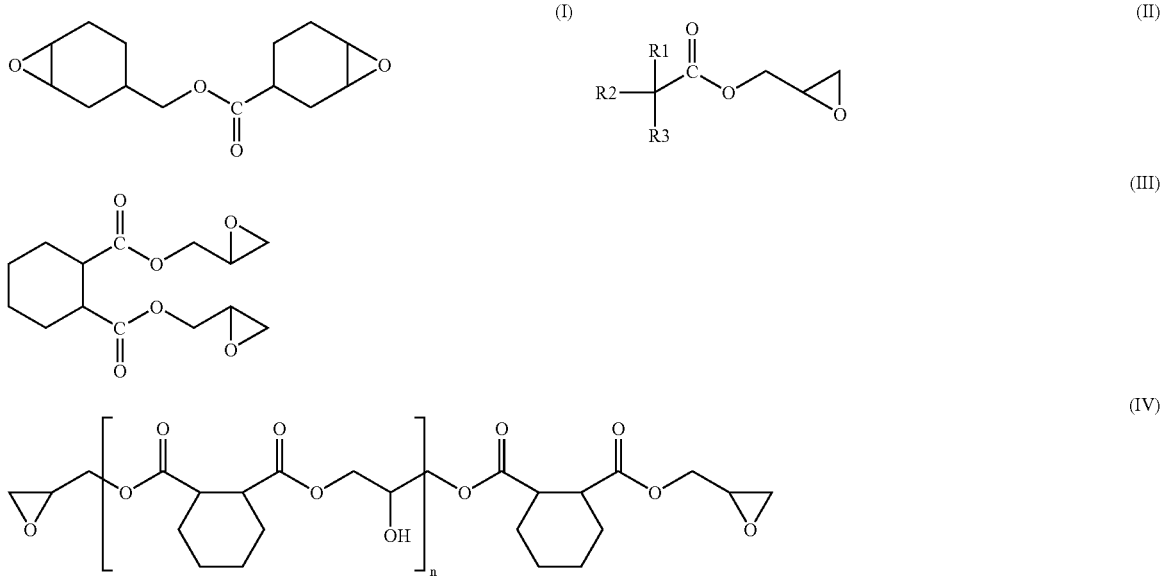

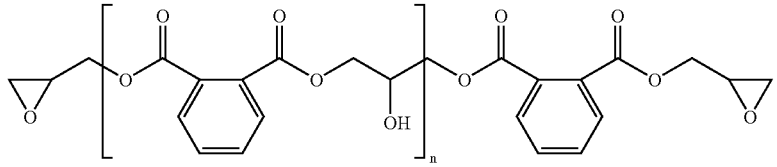

(V)

(in the formula, R1, R2, and R3 are an alkyl group, and at least one of those are a methyl group, and total of carbon numbers is 8 pieces. Further, "n" is 0–5.)

As the glycidyl ester type epoxy compound other than the above-described (II) and (III)–(V), there are enumerated a mono and diglycidyl ester of phthalic acid, a mono and diglycidyl ester of methyltetrahydro phthalic acid, a mono and diglycidyl ester of terephthalic acid, a mono, di, and triglycidyl ester of trimellitic acids, and a mono and diglycidyl ester of a dimer acid, etc.

Further, as the cycloaliphatic epoxy compound other than the above-described formula (I), there are enumerated Celloxide 2081 (an adduct of ε-caprolactone monomer to 3,4-epoxycyclohexylmethyl-3',4'-epoxycyclohexanecarboxylate), Celloxide 2083 (an adduct of ε-caprolactone trimer), Celloxide 2085 (an adduct of ε-caprolactone tetramer), Epolead GT300 and Epolead GT400 (both are trade names, and are obtained by epoxidation of a compound obtained by an esterification of tetrahydrophthalic anhydride with tetrahydrobenzyl alcohol or a lactone-modified product thereof) which are manufactured by Daicel Chemical Industries, Ltd., and bis(3,4-epoxycyclohexyl)adipate, etc.

As the glycidyl ether type ones, there are enumerated methylglycidyl ether, phenylglycidyl ether, a polyethylene glycol monophenylglycidyl ether, ethylene glycol diglycidyl ether, and ethylene glycol diglycidyl ether, etc.

In the present invention, there can be employed one or more kinds of the epoxy compounds.

<Complex-formable Agent for a Metal (G)>

As the complex-formable agent for a metal (G) to be formulated in the polyester block copolymer composition of the present invention IV, there are employed an oxalic acid derivative, a salicylic acid derivative, a hydrazide derivative, and a mixture thereof.

The complex-formable agent for a metal (G) is not particularly limited, if it is a compound which forms a metal complex compound with metal ions which are dissolved out of metals such as copper and a copper alloy which are contact with the polyester block copolymer composition, and it has a structure which is capable of preventing deterioration by oxidation.

As the oxalic acid derivative, there are enumerated oxalic bisbenzylidene hydrazide and N,N'-bis{2-[3-(3,5-di-t-butyl-4-hydroxyphenyl)propyonyloxy]ethyl}oxamide, etc., and as the salicylic acid derivative, there are enumerated 3-(N-salicyloyl)amino-1,2,4-triazole and decanedicarboxylic disalicyloyl hydrazide, etc. As the hydrazide derivative, there are enumerated N,N'-bis{2-[3-(3,5-di-t-butyl-4-hydroxyphenyl) propyonyloxy]ethyl}hydrazine and bis(2-phenoxypropyonyl) hydrazide isophthalate, etc.

<Polyester Block Copolymer Composition (Q)>

In the polyester block copolymer composition (Q) in relation to the present invention IV, formulating amount of the epoxy compound (C) is 0.5–5.0 parts by weight, and preferably 1.0–4.0 parts by weight based on 100 parts by weight of the polyester block copolymer (P1).

In the case that the formulating amount is less than 0.5 part by weight, there becomes small an effect for general heat resistance and water resistance in the composition (Q) obtained, and a thermally-aging resistance in the composition (Q) which comes into contact with PVC remarkably lowers by hydrochloric acid removed from the PVC. Further, in the case that the formulating amount exceeds 5.0 parts by weight, molding processability occasionally becomes worse by an influence of the unreacted epoxy compound in the composition (Q), and there is shown a tendency that surface conditions becomes coarse in a molded article prepared.

Formulating amount of the complex-formable agent for a metal (G) is 0.01–3.0 parts by weight, and preferably 0.1–0.5 parts by weight based on 100 parts by weight of the polyester block copolymer (P1).

In the case that the formulating amount is less than 0.01 part by weight, a satisfied heat resistance cannot be obtained in the composition (Q) which comes into contact with a metal. Further, in the case that the formulating amount exceeds 3.0 parts by weight, it is not economical and, in the composition (Q) which comes into contact with a metal, dispersion possibly becomes worse, unpreferably resulting in that heat resistance contrarily lowers.

In the polyester block copolymer composition (Q) in relation to the present invention IV, there can be also added the stabilizers described in the present invention III.

Since the stabilizers have an effect for preventing oxidation or thermal stability, those are generally added to the crystalline aromatic polyester (P1) which is usually employed as a raw material.

Further, there may be appropriately added additives such as pigments and weatherability stabilizer depending upon uses.

The composition (Q) is usually obtained by thermally kneading of the above formulated resins. Reaction by thermally kneading is usually conducted by melt-kneading of resins and, in the case, catalysts may be employed or not employed.

As the catalysts, there can be employed all catalysts which can be usually employed in a reaction of epoxy compounds. For example, there can be employed solely or in combination of amines, phosphorus compounds, salts of a monocarboxylic acid or a dicarboxylic acid having a carbon number of not less than 10 with metals in the Ia and IIa groups of elementary periodic table.

Further, temperature for thermally kneading is desirably from a temperature of 5° C.-higher than a melting point of a crystalline of the polyester block copolymer to 280° C.

Time of period for kneading is 30 seconds to 60 minutes or so, it can be appropriately selected according to a kneading style and the temperature.

The complex-formable agent for a metal (G), the above-stabilizer, and additives to be formulated in the present invention IV may be simultaneously mixed together with the epoxy compound (C) and, may be independently mixed.

The metal which comes into contact with the composition (Q) in the present invention is not particularly limited, if it is a metal which can form a metal complex compound with the complex-formable agent for a metal (G) such as a succinic acid derivative and a salicylic acid derivative, or a hydrazide derivative and can prevent a deteriorating action by oxidation, for example, there are enumerated chromium, manganese, iron, cobalt, nickel, copper, zinc, tin, lead, and an alloy which primarily contains thereof and, in the case of copper and a copper alloy, an effect is particularly remarkable.

The polyester block copolymer composition (Q) in relation to the present invention IV has an excellent heat resistance under a contact with a metal and PVC. Accordingly, it is preferred as a heat-sensitive body which comes into direct contact with a short wire composed of copper and a copper alloy in a heater cable for an electric blanket and an electric carpet or a heating wire with PVC which is a protecting layer.

Hereinafter, the present invention No. V will be illustrated in detail.

The polyester block copolymer composition (Q) of the present invention No. V, in the case of obtaining a polyester block copolymer composition by allowing to react a crystalline aromatic polyester (A1) with lactones (B), is comprised adding and thermally-kneading 0.5–5.0 parts by weight of an epoxy compound (C) having one or more pieces of epoxy groups and 0–2.0 parts by weight of a carbodiimide compound (E) to 100 parts by weight of a polyester block copolymer (P3) obtained by allowing to react 0.1–100% by mol of at least one of a multifunctional compound (D) having at least three pieces of at least one kind of carboxylic group (i), hydroxyl group (ii), and/or an ester-formable group therefrom (iii) with 100% by mol of a crystalline aromatic polyester (A1).

First of all, there are illustrated raw materials for preparing the polyester block copolymer (P3) in relation to the present invention No. V.

<Crystalline Aromatic Polyester (A1)>

As the crystalline aromatic polyester (A1) to be employed in the present invention, there can be employed the same crystalline aromatic polyester (A1) as in the present invention IV.

In components for constructing the crystalline aromatic polyester (A1), there are desirably contained not less than 50% by mol of total of butylene terephthalate and/or ethylene terephthalate unit in consideration of crystallinity, heat resistance, and raw material costs.

<Lactones (B)>

As the lactones (B) to be employed for lactone-modifying the crystalline aromatic polyester (A1), there can be employed the same the lactones as in the present invention IV.

Copolymerization proportion of the crystalline aromatic polyester (A1) with respect to the lactones (B) is preferably 97/3–50/50, and more preferably 90/10–55/45 in the weight ratio (A/B).

Further, the crystalline aromatic polyester (A1) can be allowed to react with the lactones (B) by heating and kneading after optionally adding a catalyst.

<Multifunctional Compound (D)>

The multifunctional compound (D) to be employed in the present invention V is not particularly limited, if it is an aliphatic and/or aromatic compound having at least three pieces of at least one kind of carboxylic group (i), hydroxyl group (ii), and/or an ester-formable group therefrom (iii) in the molecule. In the above description, the ester-formable group means a derivative of carboxylic group and hydroxyl group which can react by an esterification reaction, condensation reaction, and addition reaction with the crystalline aromatic polyester (A1) and/or the lactones (B) such as an ester compound from carboxylic group (i) and an ester compound from an acid chloride, an acid anhydride, and hydroxyl group (ii).

As preferred examples of the multifunctional compound (D), there can be enumerated an aliphatic polycarboxylic acid such as butane tetracarboxylic acid; an aliphatic polyol such as glycerine, trimethylol ethane, trimethylol propane (hereinafter, abbreviated as TMP), and pentaerythritol; an aromatic polycarboxylic acid such as trimesic acid, trimellitic acid, 1,2,3-benzene tricarboxylic acid, pyromellitic acid, and 1,4,5,8-naphthalene tetracarboxylic acid; an aromatic polyalcohol such as 1,3,5-trihydroxybenzene; an aromatic hydroxycarboxylic acid such as 4-hydroxy isophthalic acid, 3-hydroxy isophthalic acid, 2, 3-dihydroxy benzoic acid, 2,4-dihydroxy benzoic acid, 2,5-dihydroxy benzoic acid, 2,6-dihydroxy benzoic acid, protocatec acid, 2,4-dihydroxyphenyl acetic acid; and a compound having structural units derived from the ester-formable derivatives, etc.

Hereinafter, there is illustrated the polyester block copolymer (P3) in relation to the present invention No. V.

<Polyester Block Copolymer (P3)>

The polyester block copolymer (P3) in relation to the present invention No. V can be obtained by allowing to react the crystalline aromatic polyester (A1) and the multifunctional compound (D) with the lactones (B).

The ratio (A/B) of the crystalline aromatic polyester (A1) with respect to the lactones (B) is preferably 97/3–50/50, and more preferably 90/10–55/45 by weight.

In the case that the ratio of the lactones (B) is too smaller than the range, flexibility does not manifest in the polyester block copolymer composition Q and, in the case that it is too larger than the range, heat resistance lowers.

The multifunctional compound (D) is added in a range of 0.1–100% by mol, and preferably 2–20% by mol based on 100% by mol of the crystalline aromatic polyester (A1).

In the case that addition amount of the multifunctional compound (D) is less than 0.1% by mol, dependence of melt viscosity upon extension rate is insufficient, resulting in that there cannot be obtained a molded article having a uniform thickness in blow molding and, in the case that it is larger than 100% by mol, decline of melting point is remarkable in an esterification reaction, and only identical or lower heat resistance is obtained to or than inherent heat resistance in the polyester block copolymer (P3).

Reaction temperature is 180–270° C., and preferably 230–250° C.

Reaction pressure is not particularly limited, and it can be conducted at an ordinary pressure.

Reaction time of period is 0.5–180 minutes, and preferably 5–60 minutes.

Feeding order of raw materials and reaction order are not particularly limited.

As an example of a structure in the polyester block copolymer (P3) obtained in the above-described reaction, there is enumerated a structure described below.

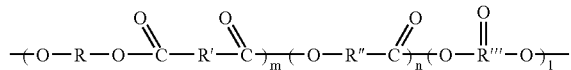

In the structural formula, R is a diol component, R' is a dicarboxylic acid component, R" is a lactone component, and R'" is a component of the multifunctional compound. "m" is a structural unit number of the aromatic polyester, and it is 50–95, "n" is a structural unit number of the lactones, and it is 5–50. "l" is a structural unit number of the multifunctional compound. "l" is 0.001–1 on an average, and it has a broader range in respective compounds.

In the polyester block copolymer (P3) in relation to the present invention, a number average molecular weight is 30,000–100,000, a melting point is 160–250° C., and MI is 0.1–20 g/10 minutes (at 230° C. and 2.16 kgf).

Hereinafter, the epoxy compound (C) is illustrated which is allowed to react with the polyester block copolymer (P3).

<Epoxy Compound (C)>

As the epoxy compound (C) to be employed in the present invention V, the same epoxy compound (C) can be employed as in the present invention IV.

In the polyester block copolymer composition (Q) in relation to the present invention No. V, formulating amount of the epoxy compound (C) is 0.5–5.0 parts by weight, and preferably 1.0–4.0 parts by weight based on 100 parts by weight of the polyester block copolymer (P3). In the case that the formulating amount is less than 0.5 part by weight, there becomes small an effect for a general heat resistance and water resistance in the polyester block copolymer, resulting in that a thermally-aging resistance remarkably lowers. In the case that the formulating amount exceeds 5.0 parts by weight, molding processability occasionally becomes worse by an influence of the unreacted epoxy compound, and there is shown a tendency that surface conditions become coarse in a molded article prepared.

From the same reason, two or more functional epoxy compounds must be formulated in at least 0.2 part by weight based on 100 parts by weight of the polyester block copolymer (P3).

<Carbodiimide Compound (E)>

In the present invention No. V, a carbodiimide compound (E) can be optionally formulated with the polyester block copolymer composition (Q).

As the carbodiimide compound, for example, there is enumerated Stabaxol 1 (2,6-diisopropylphenyl diisocyanate dimer) manufactured by Sumitomo Bayer Urethane, Ltd., etc.

Formulating amount of the carbodiimide compound is 0–2.0 parts by weight, and preferably 0.2–1.0 parts by weight based on 100 parts by weight of the polyester block copolymer (P3). If it is not formulated, there is occasionally observed a slight decline of melt viscosity during a reaction of the epoxy compound (C), and dependence of melt viscosity upon extension rate is insufficient by an influence of an TMP amount, resulting in that there is occasionally obtained a polyester block copolymer composition which is not appropriate for blow molding. On the other hand, in the case that it is formulated in exceeding 2.0 parts by weight, discoloration becomes remarkable, and crystallinity lowers in the polyester block copolymer, resulting in that heat resistance ends to lower.

<Polyester Block Copolymer Composition (Q)>

The polyester block copolymer composition (Q) of the present invention V is obtained by thermally kneading a formulated mixture in which there are formulated the polyester block copolymer (P3), the epoxy compound (C), and optionally the carbodiimide compound (E).

The above-described reaction by thermally kneading is usually conducted by melt-kneading of resins and, in the case, catalysts may be employed or not employed.

As the catalysts to be employed in a reaction of the epoxy compound (C), there can be employed the same catalysts as in the present invention No. IV.

Further, temperature for melt-kneading is preferably a temperature of from 5° C.-higher than a melting point of a crystalline in the polyester block copolymer (P3) to 280° C.

Kneading time of period is 30 seconds to 60 minutes or so, and it is appropriately selected depending upon a mixing style and the temperature.

As the catalysts to be optionally added in a reaction of the carbodiimide compound (E), all catalysts usually employed can be employed, and the catalysts are optionally employed.

In the polyester block copolymer composition (Q) in relation to the present invention No. V, there can be also added the same stabilizer as in the present invention No. III.

The stabilizers may be usually in advance contained in the crystalline aromatic polyester resin (P3) which is employed as a raw material because of an effect for preventing oxidation of the composition (Q) and thermal stability.

Further, there may be appropriately even added additives such as pigments and a weatherability stabilizer according to uses.

It is to be noted that the stabilizer and additives to be formulated in the present invention may be simultaneously mixed together with the epoxy compound (C) and the carbodiimide compound (E), or may be even independently mixed.

In the polyester block copolymer composition (Q) of the present invention No. V obtained by thermally kneading, a number average molecular weight is 50,000–250,000, a melting point is 160–250° C., MI is 0.1–20 g/10 minutes, and a strain-hardening curability is not less than 0.1.

Herein, the strain-hardening curability shows a slope of a straight line obtained by plotting $\epsilon$ and $\ln(\eta_E/3\eta^*)$ when $\eta_E$ is a value obtained by a measurement of extension viscosity, $\epsilon$ is strain herein, and $\eta^*$ is a value obtained by a measurement of shear viscosity.

It is to be noted that in a composition obtained, a portion of the epoxy compound may be remained within an extent at which viscosity does not increase in kneading. Likewise, an unreacted portion of the carbodiimide compound (E) may be also remained within an extent which can be detected by a gas chromatography.

Hereinafter, the present invention No. VI will be illustrated in detail.

The polyester block copolymer composition of the present invention IV, in obtaining the polyester block copolymer by allowing to react the crystalline aromatic polyester (A1) with the lactones (B), is comprised adding and thermally-kneading 0.1–5.0 parts by weight of an epoxy compound (C) having one or more pieces of epoxy groups and 0–2.0 parts by weight of a carbodiimide compound (E) to 100 parts by weight of a polyester block copolymer (P3) obtained by allowing to react 0.1–200% by mol of at least one of a multifunctional compound (D) having at least three pieces of at least one kind of carboxylic group (i), hydroxyl group (ii), and/or an ester-formable group therefrom (iii) with 100% by mol of a crystalline aromatic polyester (A1).

First of all, there are illustrated raw materials to be employed for the preparation of the polyester block copolymer (P3) in relation to the present invention No. VI.

<Crystalline Aromatic Polyester (A1)>

As the crystalline aromatic polyester (A1) to be employed in the present invention No. VI, there can be employed a polyester having the same structure as in the crystalline aromatic polyester (A1) in the present invention No. IV, and there is preferred a polyester having a melting point of not less than 160° C. in the case of formation of high polymerization degree.

Further, as a material for molding, there is preferably prepared a polyester having a number average molecular weight of not less than 5,000.

Of construction components for the crystalline aromatic polyester (A1) exemplified hereinabove, there is preferably employed a polyester containing not less than 60% by weight of butylene terephthalate and/or ethylene terephthalate units in consideration of crystallinity, heat resistance, or costs for the raw materials.

<Lactones (B)>

As the lactones (B) to be employed for lactone-modifying the crystalline aromatic polyester (A1), there can be employed the same lactones (B) as in the present invention No. IV.

Copolymerization ratio of the crystalline aromatic polyester (A1) with the lactones (B) is the same as in the copolymerization ratio in the present invention No. V.

<Multifunctional Compound (D)>

As the multifunctional compound (D) to be employed in the present invention No. VI, there can be employed the same multifunctional compound (D) as in the present invention No. V.

Addition amount of the multifunctional compound (D) is 0.1–200% by mol, preferably 0.1–150% by mol based on 100% by mol of the crystalline aromatic polyester (A1).

In the case that at least one kind of the multifunctional compound (D) has carboxylic group (i) or an ester-formable group thereof, it is added in a range of preferably 0.1–200% by mol, and more preferably 0.1–150% by mol based on 100% by mol of the crystalline aromatic polyester (A1). In the case, in the case that the addition amount of the multifunctional compound (D) is less than 0.1% by mol, modulus of strain hardening is insufficient, resulting in that there is not obtained a molded article having uniform thickness in blow molding and, in the case of exceeding 200% by mol, a decline of a melting point is remarkable in a transesterification reaction, resulting in that there is not occasionally obtained only a molded article having an identical or less heat resistance inherently possessed in a polyester block copolymer.

Further, in the case of the multifunctional compound (D) not having carboxylic group (i) or an ester-formable group thereof, the multifunctional compound (D) is added in a range of preferably 0.1–150% by mol, and more preferably 50–120% by mol based on 100% by mol of the crystalline aromatic polyester (A1). In the case, in the case that the addition amount of the multifunctional compound (D) is less than 0.1% by mol, modulus of strain hardening is insufficient, resulting in that there is not obtained a molded article having uniform thickness in blow molding and, in the case of exceeding 150% by mol, a decline of a melting point is remarkable in a transesterification reaction, resulting in that there is not occasionally obtained only a molded article having an identical or less heat resistance inherently possessed in a polyester block copolymer. Herein, the modulus of strain hardening means a characteristic that a melt viscosity increases when an extending rate increases. Accordingly, when the modulus of strain hardening is larger, since a portion extended in blow molding shows a larger melt viscosity, it is not excessively extended and, since a portion extended shows a lower melt viscosity, uniform thickness is obtained. Contrarily, in the case that the modulus of strain hardening is insufficient, the above-described effect does not manifest in blow molding, and it tends to become difficult to obtain a molded article having a uniform thickness.

Hereinafter, there is illustrated the polyester block copolymer (P3) in relation to the present invention No. VI.

<Polyester Block Copolymer (P3)>

The polyester block copolymer (P3) is obtained by allowing to react the crystalline aromatic polyester (A1) and the multifunctional compound (D) with the lactones (B).

Ratio of the crystalline aromatic polyester (A1) with the lactones (B) and reaction conditions are the same as in the present invention No. V.

Subsequently, the epoxy compound (C) is illustrated which is allowed to react with the polyester block copolymer (P3).

<Epoxy Compound (C)>

As the epoxy compound (C) to be employed in the present invention No. V, there can be employed the same epoxy compound (C) as in the present invention No. IV.

In the polyester block copolymer composition (Q) in relation to the present invention No. VI, formulation amount of the epoxy compound (C) is 0.1–5.0 parts by weight, and preferably 0.25–3.0 parts by weight based on 100 parts by weight of the polyester block copolymer (P3). In the case that the formulation amount is less than 0.1 part by weight, there becomes small an effect to general heat resistance and water resistance in the polyester block copolymer, and thermally-aging resistance remarkably lowers. In the case that the formulation amount exceeds 5 parts by weight, there is a tendency that molding processability occasionally becomes worse by an influence of the unreacted epoxy compound, or surface conditions becomes coarse in a molded article.

<Carbodiimide Compound (E)>

In the present invention VI, the same carbodiimide compound (E) as in the present invention V can be optionally formulated in the same weight ratio in the polyester block copolymer composition.

<Polyester Block Copolymer Composition (Q)>

The polyester block copolymer composition (Q) of the present invention VI is obtained by thermally kneading a blend composed of the polyester block copolymer (P3), the epoxy compound (C) and, optionally, the carbodiimide compound (E).

The reaction by thermally kneading is usually conducted by melt-mixing and, in the case, catalysts may be not employed, or may be even employed.

As the catalysts to be employed in the reaction of the epoxy compound (C), the same catalysts can be employed as in the present invention IV.

In the composition (Q) obtained in the present invention VI, the same stabilizers can be added as in the present invention III.

Further, additives such as pigments and weatherability agents may be appropriately added depending upon uses.

Mixing of the above-described stabilizer and additives may be simultaneously or separately conducted together with mixing of the above-described epoxy compound (C) or the carbodiimide compound (E).

In the polyester block copolymer composition (Q) of the present invention VI, a number average molecular weight is 40,000–110,000, a melting point is 180–230° C., and MI is 0.1–10 g/10 minutes, and it has a large modulus of strain hardening.

As a result, it has a characteristic of an exceedingly less generation of flashes in molding, in addition to capability of providing a molded article having uniform thickness in blow molding. Moreover, a molded product obtained using the composition is very excellent also in heat resistance in addition to inherent properties in a polyester block copolymer and, even though it is employed in a use exposed to high temperature for a long time of period, it can give a very excellent physical property to a molded article.

Hereinafter, the present invention No. VII will be illustrated in detail.

The polyester block copolymer composition (R) of the present invention VII, in the case of obtaining the polyester block copolymer by allowing to react the crystalline aromatic polyester (A1) with the lactones (B), is comprised heating in a solid condition a polyester block copolymer composition (Q) obtained by adding and thermally mixing 0.1–5.0 parts by weight at least one kind of an epoxy compound (C) having one or more pieces of epoxy groups to 100 parts by weight of a polyester block copolymer (P) obtained by allowing to react 0.1–200% by mol of at least one kind of a multifunctional compound (D) having at least three pieces of carboxylic group (i), hydroxyl group (ii), and/or an ester-formable group therefrom (iii) with respect to 100% by mol of a crystalline aromatic polyester (A).

The polyester block copolymer (P) in relation to the present invention is obtained by a reaction of the crystalline aromatic polyester (A1) with the lactones (B).

<Crystalline Aromatic Polyester (A1)>

The crystalline aromatic polyester (A1) to be employed in the present invention is a polymer primarily having ester bonds, and it has hydroxyl groups at a portion of molecular terminals, and the same ones are employed as in the present invention VI.

<Lactones (B)>

The lactones (B) to be employed in the present invention VII is the same ones as in the present invention VI.

Copolymerization proportion of the crystalline aromatic polyester (A1) with the lactones (B) is 97/3–50/50, and preferably 90/10–55/45 by weight ratio.

Further, the crystalline aromatic polyester (A) can be allowed to react with the lactones (B) by thermally mixing using optionally catalysts. In the case that the proportion of the lactones (B) is too smaller than the range, ductility does not manifest in the polyester block copolymer (P), and in the case of being too larger than the range, heat resistance lowers in the polyester block copolymer (P) and the polyester block copolymer composition (R) obtained.

<Multifunctional Compound (D)>

The multifunctional compound (D) to be employed in the present invention is the same as in the present invention No. VI.

Addition amount of the multifunctional compound (D) is 0.1–200% by mol, preferably 0.1–150% by mol based on 100% by mol of the crystalline aromatic polyester (A).

In the case that the multifunctional compound (D) does not have carboxylic group (i) or an ester-formable group thereof, it is added in a range of preferably 0.1–150% by mol, and more preferably 50–120% by mol based on 100% by mol of the crystalline aromatic polyester (A1). In the case that the addition amount of the multifunctional compound is less than 0.1% by mol, the modulus of strain hardening is insufficient, resulting in that there is not obtained a molded article having uniform thickness in blow molding and, in the case of exceeding 150% by mol, a decline of a melting point is remarkable in a transesterification reaction, resulting in that there is not occasionally obtained only a molded article having an identical or less heat resistance inherently possessed in a polyester block copolymer.

Further, in the case that the multifunctional compound (D) has at least one of carboxylic group (i) or an ester-formable group thereof, it is added in a range of preferably 0.1–200% by mol, and more preferably 50–150% by mol based on 100% by mol of the crystalline aromatic polyester (A1). In the case that the addition amount of the multifunctional compound is less than 0.1% by mol, the modulus of strain hardening is insufficient, resulting in that there is not obtained a molded article having uniform thickness in blow molding and, in the case of exceeding 200% by mol, a decline of a melting point is remarkable in a transesterification reaction, resulting in that there is not occasionally obtained only a molded article having an identical or less heat resistance inherently possessed in a polyester block copolymer.

Subsequently, there will be illustrated the polyester block copolymer (P) in relation to the present invention.

<Polyester Block Copolymer (P)>

The polyester block copolymer (P) in relation to the present invention is obtained by allowing to react the crystalline aromatic polyester (A1) having terminal hydroxyl groups, the multifunctional compound (D), and the lactones (B).

Reaction temperature is 180–270° C., and preferably 230–250° C.

Reaction pressure is not particularly limited, and reaction can be conducted at an ordinary pressure.

Reaction time of period is 0.5–600 minutes, and preferably 5–120 minutes.

Feeding order of raw materials and reaction order are not particularly limited.

In the polyester block copolymer composition (P) in relation to the present invention, a number average molecular weight is 20,000–100,000, a melting point is 160–250° C., and MFR is 0.1–50 g/10 minutes (230° C., 2.16 kgf).

The epoxy compound (C) to be allowed to react with the polyester block copolymer (P) is the same as in the present invention VI.

Formulation amount of the epoxy compound (C) is 0.1–5.0 parts by weight, and preferably 0.25–3.0 parts by weight based on 100 parts by weight of a polyester block copolymer (P). In the case that the formulation amount is less than 0.1 part by weight, there becomes small an effect to general heat resistance and water resistance in the polyester block copolymer, and thermally-aging resistance remarkably lowers. In the case that the formulation amount exceeds 5.0 parts by weight, there is a tendency that molding processability occasionally becomes worse by an influence of the unreacted epoxy compound, or surface conditions becomes coarse in a molded article.

<Polyester Block Copolymer Composition (Q)>

The polyester block copolymer composition (Q) of the present invention VI is obtained by thermally kneading a mixture composed of the polyester block copolymer (P) and the epoxy compound (C).

Mixing of the epoxy compound (C) with the polyester block copolymer (P) is usually conducted by melt-mixing and, a method for the mixing is not limited at all, if it is a method capable of uniformly mixing, any methods may be applied.

Temperature in melt-mixing of the epoxy compound ranges in preferably 3° C.- to 60° C.-higher temperature, and more preferably 5° C.- to 40° C.-higher temperature than a melting point of the polyester block copolymer. In the case that the temperature in melt-mixing is higher, decomposition reaction is thermally accelerated, whereby, resulting in that heat resistance, hydrolysis resistance, and color hue become worse. In the case that the temperature in melt-mixing is lower, dispersion conditions of the epoxy compound become worse. Time of period in melt-mixing is 10 second to 10 minutes or so, preferably, it is set up in 30 second to 5 minutes. Compared to a conventional method, that is, a method by melt-mixing alone, since a treatment at a lower temperature can be conducted and evaporation components can be decreased, a working circumstance can be improved.

<Polyester Block Copolymer Composition (R)>

Conditions are as follows at which the polyester block copolymer composition (Q) is thermally treated in a solid phase for obtaining the polyester block copolymer composition (R).

As the conditions for thermally treating in a solid phase, heating temperature (Ta) ranges in from a lower temperature than a melting point of the polyester block copolymer composition (R) to a higher temperature than a glass transition point of the polyester block copolymer composition (R) under an inert gas atmosphere and, moreover, it is a higher temperature than 120° C.

$Tg<Ta<Tm(R)$, and $120°$ C.$<Ta$

In the case that the epoxy compound (C) contains at least one kind of a bifunctional epoxy compound, heating temperature (Ta) in a solid phase is 10° C.- to 5° C.-lower than a melting point of a polymer in a solid phase and higher than 150° C.

$Tm(R)-100°$ C.$\leq Ta \leq Tm(R)-5°$ C., and $150°$ C.$\leq Ta$

Heating in a solid phase can be conducted by two stages described below.

(1) after having preheated at a temperature (Tb) lower than 150° C. and lower than Ta which is in a temperature range from a temperature lower than a melting point of a polymer in a solid phase to a temperature higher than a glass transition point of the polymer, (2) heated at a temperature (Ta) which is in a temperature range from a temperature lower than a melting point of a polymer in a solid phase to a temperature higher than a glass transition point of the polymer, and higher than 120° C.

Preheating temperature Tb $Tg<Tb<Tm(R)$, $Tb<150°$ C., and $Tb \leq Ta$

Heating temperature Ta $Tg<Ta<Tm(R)$, and $120°$ C.$<Ta$

In the case, catalysts may be not employed or even employed.

As the catalysts, there can be employed all catalysts which can be usually employed in a reaction of epoxy compounds. For example, there can be employed solely or in combination of amines, phosphorus compounds, salts of a monocarboxylic acid or a dicarboxylic acid having a carbon number of not less than 10 with metals in the Ia and IIa groups of elementary periodic table. Such the catalysts may simultaneously add together with the epoxy compound, or may even add after having in advance dispersed the epoxy compound into the polyester block copolymer in a melting state or, contrarily, the catalysts may be in advance even dispersed.

In the polyester block copolymer composition (R) of the present invention, an acid value is not more than 0.5 mgKOH/g, a melting point Tm (R) is a temperature of not more than 5° C.-lower temperature than a melting point Tm (P) in the polyester block copolymer composition (P) before adding the epoxy compound.

$Tm(R) \geq Tm(P)-5°$ C.

In the polyester block copolymer composition, a temperature for an MI value test is not less than 5° C.-higher than a melting point of the composition, and it is a lowest temperature of an experimental temperature described in Table 1 of JIS K7210 and, moreover, a melt viscosity stability {(MI–B)/(MI–A)} is 0.5–2.0, which is calculated from an MI value (MI–A) measured at experimental conditions selected so that an experimental loading becomes a range of an MI value of 1–30 g/10 minutes and an MI value (MI–B) at the same experimental temperature and the same experimental loading as in a measurement of the (MI–A) after heating for 10 minutes from an initiation of measurement of the MI–A value at the same experimental temperature as in a measurement of the MI–A value.

In the polyester block copolymer composition (R), a number average molecular weight is 40,000–200,000, a melting point is 150–280° C., MI is 0.01–5, and modulus of a strain-hardening is not less than 0.1–2.4. Herein, the modulus of a strain-hardening shows a slope of a straight line obtained by plotting $\epsilon$ and $\ln(\eta_E/3\eta^*)$ when $\eta_E$ is a value obtained by a measurement of extension viscosity, $\epsilon$ is strain herein, and $\eta^*$ is a value obtained by a measurement of shear viscosity.

In the polyester block copolymer composition (R), there can be added a stabilizer such as a hindered phenol-based compound, a phosphite-based compound or an organic composite phosphite, and a carbodiimide compound. Since the stabilizers have an effect for prevention of oxidation or thermal stability in the polyester block copolymer composition, those are usually added to polyester-based resins. Further, additives such as pigments and weatherability stabilizers may be appropriately even added depending upon uses.

Mixing of the stabilizers and additives to be formulated in the present invention may be simultaneously conducted when the epoxy compound is mixed, or may be even independently conducted.

In the polyester block copolymer composition (R) obtained in the present invention, the modulus of strain hardening is large, and there can be obtained a molded article having uniform thickness in blow molding and, further, a change ratio of melt viscosity by thermal history is small and a resin can be reused. Further, color hue is more improved than in a reaction proceeded in a melting state owing to a characteristic that a reaction with the epoxy compound (C) is conducted by heating in a solid phase and, furthermore, a large melt viscosity can be obtained, resulting in that a large-size molded article can be also obtained in blow molding. Also, it has a characteristic that production of flashes in molding is exceedingly slight. Moreover, a molded article obtained using the composition (R) is very excellent also in heat resistance in addition to properties shown in a polyester block copolymer and, even though it is employed for uses exposed to a high temperature for a long time of period, it does not cause heat deterioration, and it can provide a molded article having very excellent physical properties.

EXAMPLES

Hereinafter, although the present invention will be specifically illustrated by Examples, the present invention is not limited thereto. In the Examples, mere part means part by weight.

Hereinafter, there were measured as follows an acid value, an unreacted lactone amount, a polycaprolactone content in resins, an MI value, a melt viscosity stability, a tensile strength and extension, thermal properties (a melting point, a melting peak temperature, an initiating temperature of melting), color hue, hydrolizability, and heat resistance stability.

Unreacted Lactone Amount:

Using GC-14A manufactured by Shimadzu, there was employed a glass-made column having an internal diameter of 3.2 mm and length of 2.1 m, and in which there is filled [PEG20M (a liquid for a fixed bed) 10%]/[Uniport HPS (carrier)]. 1 g of a sample and 0.05 g of diphenylether which is an internal standard substance were precisely weighed, followed by dissolving into HFIP (hexafluoroisopropanol) . Measurement was conducted at the constant temperature of 180° C. using nitrogen as a carrier gas, unreacted lactone amount (% by weight) was calculated by an internal standard method based on results obtained.

Polycaprolactone Content in the Polyester Block Copolymer (P1):

The residual unreacted lactone was removed from the polyester block copolymer (P1), and a polymer obtained was dissolved in a solvent $HFIP/CDCl_3$ (heavy chloroform)=9/1 which contains a small amount of tetramethylsilane, and there was measured the component ratio of a polybutylene terephthalate with respect to a polycaprolactone by a proton NMR.

It was confirmed that the polycaprolactone content in the polyester block copolymer (P1) is in a range of 59.9/40.1 to 60.3/39.7 in all resins in the present invention I.

MI Value:

It was measured at a sample temperature of 230° C. in heating and a loading of 2,160 kgf according to JIS K7210.

The above value are employed even as a value of T:230° C. and P:2,160 kgf in the following MI value (T, p, t).

Melt Viscosity Stability:

The melt viscosity stability is shown by MI (T, p, t+10)/MI (T, p, t). In the equation, the Melt Index (MI (T, p, t)) value is a value at a heating temperature (T), loading (P), and heating time of period (t) which are described in the JIS K7210, and T is not less than 5° C.-higher temperature than a melting point of the composition (R), and it is a lowest temperature of experimental temperature described in Table 1 of the JIS K7210. P is a value selected so that MI value becomes a range of 1–30 g/10 minutes.

MI (T, P, t+10) is a value when heating time of period is set up at t+10 minutes in the above conditions T and P.

In the Examples described below, specifically, T is 230 C, P is 2.16 kgf, and "t" is a time of period regulated in JIS.

Tensile Strength and Extension:

Tips were molded into a plain plate having the thickness of 2 mm using a heating press, and Dumbbell No. 3 test piece was punched, and the test piece was extended at the speed of 200 m/minutes, and strength is shown by a value in which a load (kgf) at break is divided by an initial cross sectional area ($cm_2$), the extension ratio (%) is a proportion of extension in the original test piece with respect to length of an original test sample.

Melting Point:

Melting point is a peak temperature in melting measured by a differential scanning calorimeter (DSC) apparatus according to JIS K7121.

Color Hue:

Yellow Index (YI) value was measured by a color difference meter Σ-90 manufactured by Nihon Denshoku Kogyo.

Acid Value:

Sample was dried at 100° C. and a reduced pressure for 20 hours, followed by weighing 1.0 g and thermally dissolving in 50 g of benzyl alcohol at 160° C. After having cooled by water, 50 g of chloroform was added and mixed. Using phenol phthalein as an indicator, titration was conducted by a 1/10 normal KOH ethanol solution. There were decided values at 0 minute by an extrapolation method from appropriate three points in which dissolving time of period is 10–30 minutes and, a value in which an acid value in a mixture of benzyl alcohol with chloroform was taken off from the values employed as an acid value (mgKOH/g) of the samples. The acid value in the mixture was separately measured.

Hydrolysis Resistance:

The plain plate having the thickness of 2 mm prepared by molding the tips using a heating press was immersed in hot water of 95° C. for 7 days to hydrolyze, and Dumbbell No. 3 test pieces were punched from the plate. Test pieces were extended at speed of 200 mm/minute, a value in which load (kg) at break was divided by an initial cross sectional area ($cm_2$) is shown as a strength ($kg/cm_2$), and the extension ratio (%) is shown as a proportion of extension in the test piece until a break with respect to length of an original test sample. The extension ratio in the case of not conducting a hydrolysis treatment is shown as 100%, and it is compared to an extension ratio in the case of having broken.

Heat Resistance Stability:

The plain plate having the thickness of 2 mm prepared by molding the tips using a heating press was placed in a gear oven adjusted to 165° C. for 14 days to thermally-treat, and Dumbbell No. 3 test pieces were punched from the plate. Test pieces were extended at speed of 200 mm/minute, and a value in which load (kgf) when having broken was divided by an initial cross sectional area ($cm_2$) is shown as a strength ($kgf/cm_2$), and the extension ratio (%) is shown as a proportion of extension in the test piece until a break with respect to length of an original test sample. The extension ratio in the case of not being thermally treated is shown as 100%, and it is compared to an extension ratio in the case of having broken.

Modulus of Strain Hardening:

It is shown as a slope of a straight line obtained by plotting $\epsilon$ and $\ln(\eta_E/3\eta^*)$ when $\eta_E$ is a value obtained by a measurement of extension viscosity at a constant strain rate and 230° C., $\epsilon$ is strain herein, and $\eta^*$ is a value obtained by a measurement of shear viscosity. Results are shown as follows. In the case that the slope is not less than 1.0, a sample shows (⊚) the modulus of strain hardening, in the case that the slope is less than 1.0, a sample slightly shows (○) the modulus of strain hardening, and in the case that the slope is 0, a sample does not show (x) the modulus of strain hardening. It is to be noted that it is shown by a value in the case of the present invention VII.

Draw Down Property:

Capirograph manufactured by Toyo Seiki was equipped with a capillary having a diameter of 3 mm and length of 10 mm, and a resin was extruded at 240° C. and an extruding rate of 20 mm/min. A time of period when a strand is 300 mm-extended was compared to a time of period when a strand is 60 mm-extended to calculate the ratio. For blow molding, it is preferred that the ratio is not less than 3.

Feeding Molar Ratio (A:D):

Addition ratio % by mol of the multifunctional compound (D) was calculated from a number average molecular weight of the polyester (A) measured by GPC based on a standard polymethyl methacrylate (PMMA), and a formulating mol amount of the (A) was decided based thereon. Supposing that the formulating mol amount of the (A) is 100% by mol, the addition ratio % by mol of the multifunctional compound (D) is decided in a range of 0.01–5.0% by mol depending upon uses.

As a column in the GPC, there were employed Shodex GPC HFIP-800P, HFIP-805P, HFIP-804P, and HFIP-803P manufactured by Showa Denko, Ltd., and RID-6A manufactured by Shimadzu Seisakusyo was employed as a detector. As an elution liquid, hexafluoro isopropanol was employed, and a measurement was conducted at a column temperature of 50° C. and a flow rate of 1.0 ml/min.

<Raw Material>

Crystalline Aromatic Polyester:

As the crystalline aromatic polyester, there was employed a polybutylene terephthalate (PBT) described below having hydroxyl groups at terminals of a molecule.

PBT (A1) employed in the present invention I is a commercially supplied polybutylene phthalate having a melting point of approximately 230° C. which is composed of terephthalic acid and isophthalic acid which are an acid component and 1,4-butane diol which is a glycol component, and which has a number average molecular weight of 39,000.

PBT (A1) employed in the present invention II is a commercially supplied polybutylene phthalate having a melting point of approximately 230° C. which is composed of terephthalic acid and isophthalic acid which are an acid component and 1,4-butane diol-which is a glycol component, and which has a number average molecular weight of 35,000.

PBT (A1) employed in the present invention III is a commercially supplied polybutylene phthalate having a melting point of approximately 230° C. which is composed of terephthalic acid and isophthalic acid which are an acid component and 1,4-butane diol which is a glycol component, and which has a number average molecular weight of 31,000.

PBT (A1) employed in the present invention IV is a commercially supplied polybutylene phthalate having a melting point of approximately 205° C. which is composed of terephthalic acid and isophthalic acid which are an acid component and 1,4-butanediol which is a glycol component, and which has a number average molecular weight of 35,000.

Likewise, PBT ($A_2$) is a commercially supplied polybutylene phthalate having a melting point of approximately 185° C. which is composed of terephthalic acid and isophthalic acid which are an acid component and 1,4-butanediol which is a glycol component, and which has a number average molecular weight of 35,000.

PBT (A1) employed in the present invention V is a commercially supplied polybutylene phthalate having a melting point of approximately 230° C. which is composed of terephthalic acid and isophthalic acid which are an acid component and 1,4-butanediol which is a glycol component, and which has hydroxyl groups at terminals of a molecule and has a number average molecular weight of 39,000. However, PBT (A1) employed in Comparative Example V-I is a commercially supplied polybutylene phthalate having a melting point of approximately 230° C. which is composed of terephthalic acid and isophthalic acid which are an acid component and 1,4-butanediol which is a glycol component, and which has a number average molecular weight of 35,000.

PBT ($A_1$) employed in the present inventions VI and VII is a commercially supplied polybutylene phthalate having a melting point of approximately 230° C. which is composed of terephthalic acid and isophthalic acid which are an acid component and 1, 4-butanediol which is a glycol component, and which has a number average molecular weight of 39,000.

Abbreviations of Substances to be Formulated:
Phenylglycidyl ether (GPE)
Kardular E-10 (a glycidyl type monoepoxy compound)
Bisphenol F diglycidyl ether (BFDGE)
Cyclohexane dicarboxylic acid diglycidyl ester (CHDDG)
3,4-epoxycy clohexylmethyl-3,4-epoxycyclohexanecarboxylate (Clloxide 2021P manufactured by Daicel Chemical Industries, Ltd.)
Triphenylphosphine (TPP)
Tetraxis[methylene-3-(3,5-di-t-butyl-4-hydroxyphenyl) propionate]methane (a trade name: Irganox 1010)

Reaction Vessel for Synthesis of a Polyester Block Copolymer:

As the reaction vessel for synthesis of a polyester block copolymer, there was employed a vessel equipped with an agitator, a thermometer, a condenser, and a line for distilling out.

Extruder for Kneading:

There was employed a 32 mm ø twin-screw extruder (merely abbreviated as an extruder).

Conditioned Test Piece:

From a polyester block copolymer composition, a sheet having thickness of 1 mm was prepared by compression molding, and a tensile test piece having thickness of 1 mm was prepared by punching, which is shown in JIS K7113 No. 2.

The test piece was placed in an oven set up at a temperature of 140° C., and sampling was conducted with a time lapse, and it was employed as a conditioned test sample after having placed in a room conditioned at 25° C. and 50 RH% for 24 hours.

Hereinafter, Examples are illustrated in relation to the present invention I.

Examples I-1 to I-3

60 kg of a sufficiently dried polybutylene terephthalate chips were heated to 140° C. in a batch type tank type reaction vessel, and there were supplied 42.6, 41.2, and 40.8 kg of ε-caprolactone heated to 200° C., respectively, into the vessel. While agitating at 230° C. under a nitrogen gas atmosphere, a reaction was conducted, respectively. At a period at which average concentration of unreacted lactone intends to become 2.53, 1.19, and 0.79% by weight, respectively, pellet like resins were taken out to measure an amount of the unreacted lactone and an acid value. The resins obtained were further placed under a reduced pressure at 120° C. in a pellet like to remove the unreacted lactone and to measure a melting point and an MI value. Results are collectively shown in Table I-1.

Comparative Example I-1

The same procedures were followed as in the Example I-1 except that ε-caprolactone to be employed was changed to 40.4 kg and average concentration of unreacted lactone becomes 0.40% by weight to take out a resin and to analyze. Results are collectively shown in Table I-1.

Examples I-4 to I-6

A twin-screw extruder was equipped with a hopper and a screw style feeder at an upper portion. Likewise as in the Example I-1, a sufficiently dried polybutylene terephthalate chips were filled in the hopper, and maintained under a nitrogen atmosphere. An equipment for charging ε-caprolactone was equipped at a portion of the twin-screw extruder, and a tank which is maintained under a nitrogen atmosphere was connected through a pump. Operating conditions of apparatuses were adjusted so that a temperature of a mixed liquid discharged from the extruder is maintained at 230° C.

Resins continuously discharged from the twin-screw extruder were continuously fed to a twin-screw continuous kneader having kneading discs (KRC manufactured by Kurimoto Tekkosyo), and operating conditions of apparatuses were adjusted so that a resin temperature is maintained at 230° C.

Weight ratio of the polybutylene terephthalate resin with respect to ε-caprolactone was fixed at 42.6, 41.2, and 40.8, respectively, with respect to 60 of the polybutylene terephthalate and, at a period at which average concentration of unreacted lactone becomes 2.53, 1.19, and 0.79% by weight, respectively, pellet like resins were taken out to measure the amount of the unreacted lactone and an acid value. The resins obtained were further placed at a reduced pressure and 120° C. to remove the unreacted lactones and to measure a melting point and an MI value.

Results are collectively shown in Table I-2.

Comparative Example I-2

The same procedures were followed as in the Example I-4 except that the weight ratio of the polybutylene terephthalate resin with respect to ε-caprolactone was fixed at 40.4 with respect to 60 of the polybutylene terephthalate and average concentration of the unreacted lactone in, resins discharged is maintained 0.40% by weight to likewise analyze. Results are collectively shown in Table I-2.

Examples I-7 to I-9 and Comparative Example I-3

The same procedures were followed as in the Examples I-4 to I-6 and Comparative Example I-2 except that temperature of respective resins to be discharged is adjusted to 236° C. in a twin screw extrude and a continuous kneader. Results are collectively shown in Table I-3.

TABLE I-1

|  |  | Example I-1 | Example I-2 | Example I-3 | Comparative Example I-1 |
|---|---|---|---|---|---|
| Reaction time of period | min | 54 | 77 | 94 | 132 |
| Concentration of Unreacted lactone | Weight % | 2.61 | 1.22 | 0.80 | 0.45 |
| Acid value | mgKOH/g | 1.80 | 1.80 | 2.05 | 2.45 |
| Peak Temperature in Melting (Tm) | ° C. | 204.4 | 203.7 | 202.3 | 198.3 |
| Initiating temperature Of melting (Tim) | ° C. | 189.0 | 187.9 | 185.8 | 180.7 |
| MI value | g/10 min | 2.5 | 2.8 | 3.2 | 4.5 |

TABLE I-2

|  |  | Example I-4 | Example I-5 | Example I-6 | Comparative Example I-2 |
|---|---|---|---|---|---|
| Reaction time of Period | min | 49 | 67 | 81 | 112 |
| Concentration of Unreacted lactone | Weight % | 2.60 | 1.21 | 0.81 | 0.43 |

TABLE I-2-continued

|  |  | Example I-4 | Example I-5 | Example I-6 | Comparative Example I-2 |
|---|---|---|---|---|---|
| Acid value | mgKOH/g | 1.75 | 1.75 | 1.85 | 2.25 |
| Peak Temperature in Melting (Tm) | ° C. | 207.4 | 206.4 | 205.2 | 203.1 |
| Initiation temperature Of melting (Tim) | ° C. | 192.0 | 190.5 | 188.8 | 184.7 |
| MI value | g/10 min | 2.4 | 2.5 | 2.8 | 3.4 |

TABLE I-3

|  |  | Example I-7 | Example I-8 | Example I-9 | Comparative Example I-3 |
|---|---|---|---|---|---|
| Reaction time of Period | min | 40 | 55 | 68 | 98 |
| Concentration of Unreacted lactone | Weight % | 2.60 | 1.21 | 0.81 | 0.43 |
| Acid value | mgKOH/g | 1.85 | 1.90 | 2.00 | 2.55 |
| Peak Temperature in Melting (Tm) | ° C. | 205.2 | 204.5 | 203.5 | 201.7 |
| Initiating temperature Of melting (Tim) | ° C. | 190.1 | 188.9 | 187.2 | 183.0 |
| MI value | g/10 min | 2.4 | 2.5 | 3.2 | 5.4 |

By the present invention I, in the case of obtaining a polyester block copolymer (P1) from a crystalline aromatic polyester and lactones, it was confirmed that there can be obtained the polyester block copolymer (P1) having a higher molecular weight which is excellent in-heat resistance and hydrolyzability by remaining a fixed amount of unreacted lactones in the polyester block copolymer (P1).

Further, there was able to be confirmed an effect for elevating a reaction rate of the crystalline aromatic polyester (A1) with lactones (B) by increasing an amount of the unreacted lactones.

Hereinafter, Examples are illustrated in relation to the present invention II.

Examples II-1 to II-3

60 kg of a sufficiently dried polybutylene terephthalate chips were heated to 140° C. in a batch type tank type reaction vessel, and there were supplied 42.6, 41.2, and 40.8 kg of ε-caprolactone heated to 200° C., respectively, into the vessel. While agitating at 230° C. under a nitrogen gas atmosphere, a reaction was conducted, respectively. At a period at which average concentration of unreacted lactone intends to become 2.53, 1.19, and 0.79% by weight, respectively, pellet like resins were taken out to measure an amount of the unreacted lactone and an acid value. The pellet like resins obtained were further allowed to react in a flask equipped with agitating blades at 165° C. in a solid phase and cooled after 20 hours to measure a melting point and an MI value. Results are collectively shown in Table II-1.

Comparative Example II-1

The same procedures were followed as in the Example II-1 except that ε-caprolactone to be employed was changed to 40.4 kg and average concentration of unreacted lactone becomes 0.40% by weight to take out a resin in a pellet state and to analyze. Results are collectively shown in Table II-1.

Examples II-4 to II-6

A twin-screw extruder was equipped with a hopper and a screw style feeder at an upper portion. Likewise as in the Example 1, a sufficiently dried polybutylene terephthalate chips were filled in the hopper, and maintained under a nitrogen atmosphere. An equipment for charging ε-caprolactone was equipped at a portion of the twin-screw extruder, and a tank which is maintained under a nitrogen atmosphere in which ε-caprolactone was filled was connected through a pump. Operating conditions of apparatuses were adjusted so that a temperature of a mixed liquid discharged from the extruder is maintained at 230° C. Resins continuously discharged from the twin-screw extruder were continuously fed to a twin-screw continuous kneader having kneading discs (KRC manufactured by Kurimoto Tekkosyo), and operating conditions of apparatuses were adjusted so that a resin temperature is also maintained at 230° C.

Weight ratio of the polybutylene terephthalate resin with respect to ε-caprolactone was fixed at 42.6, 41.2, and 40.8, respectively, with respect to 60 of the polybutylene terephthalate and, at a period at which average concentration of unreacted lactone becomes 2.53, 1.19, and 0.79% by weight, respectively, pellet like resins were taken out to measure the amount of the unreacted lactone and an acid value. The pellet state resins obtained were further allowed to react in a solid phase at reduced pressure of 0.5 torr and 165° C. in a flask equipped with agitating blades and cooled after 20 hours to remove the unreacted lactones and to measure a melting point and an MI value. Results are collectively shown in Table II-2.

Comparative Example II-2

The same procedures were followed as in the Example II-4 except that the weight ratio of the polybutylene terephthalate resin with respect to ε-caprolactone was fixed at 40.4 with respect to 60 of the polybutylene terephthalate and average concentration of the unreacted lactone in resins discharged is maintained 0.40% by weight to likewise analyze. Results are collectively shown in Table II-2.

Examples II-7 to II-9 and Comparative Example II-3

The same procedures were followed as in the Examples II-4 to II-6 and Comparative Example II-2 except that respective temperatures of resins to be discharged from the twin-screw extruder and the twin-screw continuous kneader were adjusted to 236° C. and the reaction temperatures in a solid phase was adjusted to 170° C., and reaction time of period in a solid phase was adjusted to 15 hours. Results are collectively shown in Table II-3.

The polyester block copolymer having a high molecular weight obtained by the present invention II has a higher melting point than that of a copolymer obtained by conventional methods and, particularly, in which broadening of a low melting point portion can be reduced in a melting peak and, whereby, there was able to be obtained a polyester block copolymer which is excellent in heat resistance and molding processability and has a higher viscosity and molecular weight.

Hereinafter, Examples are illustrated in relation to the present invention III.

Preparation Example III-1

Preparation of a Polyester Block Copolymer [TPEE (PA-1)]

60 kg of a commercially supplied PBT ( ) and 40 kg of ε-caprolactone were fed in a reaction vessel, followed by

TABLE II-1

|  |  | Example II-1 | Example II-2 | Example II-3 | Comparative Example II-1 |
|---|---|---|---|---|---|
| Reaction time of Period at first step | min | 42 | 58 | 72 | 118 |
| Concentration of Unreacted lactone | Weight % | 2.50 | 1.21 | 0.81 | 0.43 |
| Acid value | mgKOH/g | 2.75 | 2.80 | 3.00 | 3.45 |
| Peak Temperature in Melting (Tm) | ° C. | 203.3 | 202.8 | 201.2 | 197.4 |
| Initiation temperature Of melting (Tim) | ° C. | 187.7 | 186.6 | 184.4 | 179.2 |
| MI value | g/10 min | 7.0 | 8.2 | 10.2 | 14.8 |

TABLE II-2

|  |  | Example II-4 | Example II-5 | Example II-6 | Comparative Example II-2 |
|---|---|---|---|---|---|
| Reaction time of Period at first step | min | 34 | 45 | 55 | 85 |
| Concentration of Unreacted lactone | Weight % | 2.53 | 1.20 | 0.80 | 0.41 |
| Acid value | mgKOH/g | 2.55 | 2.60 | 2.85 | 3.30 |
| Peak Temperature in Melting (Tm) | ° C. | 206.5 | 205.3 | 204.4 | 202.3 |
| Initiation temperature Of melting (Tim) | ° C. | 190.7 | 189.2 | 187.3 | 183.2 |
| MI value | g/10 min | 5.4 | 7.0 | 9.3 | 12.1 |

TABLE II-3

|  |  | Example II-7 | Example II-8 | Example II-9 | Comparative Example II-3 |
|---|---|---|---|---|---|
| Reaction time of Period at first step | min | 26 | 34 | 41 | 66 |
| Concentration of Unreacted lactone | Weight % | 2.55 | 1.22 | 0.81 | 0.40 |
| Acid value | mgKOH/g | 2.55 | 2.65 | 2.90 | 3.50 |
| Peak Temperature in Melting (Tm) | ° C. | 204.1 | 203.5 | 202.3 | 200.9 |
| Initiation temperature Of melting (Tim) | ° C. | 188.9 | 187.3 | 185.8 | 181.5 |
| MI value | g/10 min | 5.2 | 6.8 | 8.9 | 12.9 | allowing to react in a melting state at 235° C. for 2 hours after purging nitrogen. After that, unreacted ε-caprolactone was removed at a reduced pressure, and a strand state resin was taken out of a valve set up at a bottom of the reaction vessel with a gear pump, followed by molding into pellets. In the resin obtained, an MI value was 15.2 g/10 minutes, tensile strength was 290 kg/cm², and extension at break was 680%. A melting point was 203.5° C., and an acid value was 1.5 mgKOH/g, and color hue was YI of 15.

Preparation Example III-2

Preparation of a Polyester Block Copolymer [TPEE (PA-2)]

There were heated 2390 parts of dimethylterephthalate, 1460 parts of a poly(tetramethylene)glycol having a number average molecular weight of 1400, and 1664 parts of 1,4-butanediol together with 0.04% (based on total of raw resin materials) of titanium tetrabutoxide which is a catalyst at 210° C. for 2 hours to distill off 95% of a theoretical amount of methanol to an outside of a system.

Subsequently, temperature was raised to 245° C., and internal pressure of a system was reduced to not more than 0.2 mm Hg over 50 minutes, and polymerization was conducted for 3 hours under the conditions. After that, a strand state resin was taken out of a valve set up at a bottom of the reaction vessel with a gear pump, followed by molding into pellets. In the resin obtained, an MI value was 16.1 g/10 minutes, tensile strength was 310 kg/cm², and extension at break was 620%. A melting point was 210.4° C., and an acid value was 1.2 mgKOH/g, and color hue was YI of 21.

Examples III-1 to III-6

Into 100 parts by weight of a polyester block copolymer (PA-1) or (PA-2) obtained hereinabove, there were added after weighing compounds selected from GPE, Kardula-E-10, TPP, sodium stearate, and Irganox 1010 in the weight part described in Table III-1, respectively, followed by mixing in a drum tumbler at a room temperature for 30 minutes. Mixture was melt-mixed using an extruder at 230° C. for a heating time of 1 minute, extruded, and cut after cooled in water to pelletize. Pellets obtained were fed into a tank type apparatus which can be heated and agitated, and can be pressure-reduced and purged by nitrogen, and preheated at conditions of 100° C. and 100 torr for 3 hours. Further, the apparatus was purged by nitrogen and returned to an ordinary pressure, and a thermal treatment was conducted at 180° C. for a time of period shown in Table III-1, respectively. After the treatment, the apparatus was cooled under nitrogen, and pellets were taken out to measure respective physical properties and analytical values.

Conditions and measurement results are shown in Table III-1.

In the Table, there are obtained resins, in which a decline of color hue and viscosity is low, and which has excellent physical properties, and in which an acid value can be reduced by a small amount of the epoxy compounds. Further, volatile components in melt-mixing were less in all Examples compared to the Comparative Examples.

Comparative Examples III-1 to III-8

Into 100 parts by weight of a polyester block copolymer (PA-1) or (PA-2), there were added after weighing compounds selected from GPE, Kardular E-10, TPP, sodium stearate, and Irganox 1010 in the weight part described in Table III-2, respectively, followed by mixing in a drum tumbler at a room temperature for 30 minutes.

Mixture was melt-mixed while controlling a feeding amount using an extruder at a temperature shown in Table III-2 extruded, and cut after cooled, respectively, in water to pelletize.

Respective physical properties and analytical values were measured in relation to the pellets obtained. Conditions and measurement results are shown in Table III-2. From the Table, it was confirmed that a large amount of the epoxy compounds are required in order to sufficiently lower an acid value, and it is supposed that there become worse physical properties such as color hue and viscosity.

Examples III-7 to III-10

Into 100 parts by weight of a polyester block copolymer (PA-1), there were added after weighing compounds selected from GPE, Kardular E-10, TPP, sodium stearate, and Irganox 1010 in the weight part described in Table III-3, respectively, followed by mixing in a drum tumbler at a room temperature for 30 minutes. Mixture was melt-mixed using an extruder at 230° C. for a heating time of 1 minute, extruded, and cut after cooled in water to pelletize.

Pellets obtained were fed into a tank type apparatus which can be heated and agitated, and can be pressure-reduced and purged by nitrogen, and preheated at conditions of 100° C. and 100 torr for 2 hours. Further, the apparatus was purged by nitrogen and returned to an ordinary pressure, and a thermal treatment was conducted at 180° C. for a time of period shown in Table III-3, respectively.

After the treatment, the apparatus was cooled under nitrogen, and pellets were taken out to measure respective physical properties and analytical values. Conditions and measurement results are shown in Table III-3. In the Table, there are obtained resins and, in which an acid value can be reduced by a small amount of the epoxy compounds and, in which viscosity is sufficiently elevated and an elevation of viscosity by remelting is less, and which has excellent color hue and physical properties.

Comparative Examples III-9 to III-13

Into 100 parts by weight of a polyester block copolymer (PA-1), there were weighed compounds selected from GPE, Kardular E-10, TPP, sodium stearate, and Irganox 1010 in the weight part described in Table III-4, respectively, followed by mixing in a drum tumbler at a room temperature for 30 minutes. Mixture was melt-mixed while controlling a feeding amount using an extruder at a temperature of 260° C. for 5 minute, extruded, and cut after cooled in water to pelletize. Respective physical properties and analytical values were measured in relation to the pellets obtained. Conditions and measurement results are shown in Table III-4. From the Table, it was confirmed that a large amount of the epoxy compounds are required in order to sufficiently lower an acid value, and an elevation of viscosity is not sufficiently caused, and an elevation of viscosity by reheating is large.

Example III-11

Into 100 parts by weight of a polyester block copolymer (PA-1), there were weighed compounds selected from GPE, BFDGE, TPP, and Irganox 1010 in the weight part described in Table III-3, respectively, followed by mixing in a drum tumbler at a room temperature for 30 minutes. Mixture was melt-mixed using an extruder at 230° C. for a heating time of 1 minute, extruded, and cut after cooled in water to pelletize. Pellets obtained were fed into a tank type apparatus which can be heated and agitated, and can be pressure-reduced and purged by nitrogen, and elevated to 180° C. at an ordinary pressure, and a thermal treatment was conducted for 10 hours. After cooled under nitrogen, and pellets were taken out to measure respective physical properties and analytical values.

Conditions and measurement results are shown in Table III-3.

TABLE III-1

|  |  | Example III-1 | Example III-2 | Example III-3 | Example III-4 | Example III-5 | Example III-6 |
|---|---|---|---|---|---|---|---|
| TPEE | Kind | PA-1 | PA-1 | PA-1 | PA-1 | PA-1 | PA-2 |
| GPE | PBW | 0.9 | 0.9 | 0.9 |  |  |  |
| CE-10*[1] | PBW |  |  |  | 1.5 | 1.5 | 1.5 |
| TPP | PBW | 0.1 | 0.1 |  |  |  |  |
| St-Na*[2] | PBW |  |  | 0.1 | 0.1 | 0.1 | 0.1 |
| IR*[3] | PBW |  |  |  |  | 0.5 | 0.5 |
| Preheating | Temperature | 100° C. | 100° C. | 100° C. | 100° C. | 100° C. | 100° C. |
|  | Torr | 100 Torr, | 100 Torr, | 100 Torr, | 100 Torr, | 100 Torr, | 100 Torr, |
|  | Time | 3 Hr | 3 Hr | 3 Hr | 3 Hr | 3 Hr | 3 Hr |
| Heating temperature | ° C. | 180 | 180 | 180 | 180 | 180 | 180 |
| Heating time | hour | 4 | 8 | 6 | 6 | 6 | 6 |
| Acid value | mgKOH/g | 0.15 | 0.05 | 0.08 | 0.05 | 0.07 | 0.08 |
| Color hue (YI) |  | 19 | 22 | 22 | 21 | 23 | 28 |
| MI value | g/10 min | 15.8 | 16.0 | 15.8 | 15.8 | 16.3 | 17.3 |
| Melting point | ° C. | 203.3 | 203.2 | 203.5 | 203.2 | 203.1 | 209.3 |
| Tensile strength at break | kg/cm$^2$ | 340 | 340 | 350 | 340 | 330 | 330 |
| Tensile extension at break | % | 680 | 690 | 700 | 690 | 700 | 700 |
| Hidrolysis resistance | % | 90 | 100 | 100 | 100 | 100 | 100 |
| Thermal decomposition | % | 80 | 90 | 90 | 90 | 100 | 100 |

CE-10*[1]: Kardula E-10,
St-Na*[2]: Sodium stearate,
IR*[3]: Irganox 1010. (being common to Tables III-1~III-4)

TABLE III-2

|  |  | Comparative Example III-1 | Comparative Example III-2 | Comparative Example III-3 | Comparative Example III-4 | Comparative Example III-5 | Comparative Example III-6 | Comparative Example III-7 | Comparative Example III-8 |
|---|---|---|---|---|---|---|---|---|---|
| TPEE | Kind | PA-1 | PA-1 | PA-1 | PA-1 | PA-1 | PA-1 | PA-1 | PA-2 |
| GPE | Part by weight | 0.9 | 0.9 | 1.8 | 1.8 |  |  |  |  |
| CE-10*[1] | Part by weight |  |  |  |  | 3.0 | 3.0 | 3.0 | 3.0 |
| TPP | Part by weight | 0.1 | 0.1 | 0.1 | 0.1 | 0.1 |  |  |  |
| St-Na*[2] | Part by weight |  |  |  |  |  | 0.1 | 0.1 | 0.1 |
| IR*[3] | Part by weight |  |  |  |  |  |  | 0.5 | 0.5 |
| Melt mixing temperature | ° C. | 240 | 260 | 260 | 260 | 260 | 260 | 260 | 260 |
| Melt mixing time of period | Minute | 1.0 | 2.5 | 2.5 | 5.0 | 5.0 | 5.0 | 5.0 | 5.0 |
| Thermal treatment | None | None | None | None | None | None | None | None | None |
| Acid value | mgKOH/g | 1.10 | 0.78 | 0.52 | 0.32 | 0.22 | 0.11 | 0.08 | 0.12 |
| Color hue (YI) |  | 20 | 26 | 25 | 29 | 28 | 30 | 35 | 41 |
| MI value | g/10 min | 15.4 | 16.0 | 16.8 | 17.2 | 17.1 | 16.7 | 16.3 | 17.1 |
| Melting point | ° C. | 203.4 | 203.1 | 202.0 | 199.2 | 198.0 | 197.5 | 197.2 | 200.1 |
| Tensile strength at break | kg/cm$^2$ | 340 | 350 | 330 | 300 | 320 | 330 | 320 | 350 |
| Tensile extension at break | % | 680 | 690 | 670 | 620 | 640 | 640 | 640 | 610 |
| Hydrolysis resistance | % | 0 | 0 | 20 | 40 | 50 | 100 | 90 | 90 |
| Heat decomposition resistance | % | 50 | 50 | 60 | 70 | 70 | 70 | 90 | 80 |

TABLE III-3

|  |  | Example III-7 | Example III-8 | Example III-9 | Example III-10 | Example III-11 |
|---|---|---|---|---|---|---|
| TPEE | Kind | PA-1 | PA-1 | PA-1 | PA-1 | PA-1 |
| GPE | Part by weight | 0.45 | 0.45 | 0.45 | 0.15 | 0.45 |
| BFDGE*4 | Part by weight | 0.47 | 0.47 | 0.62 | 0.47 |  |
| CHDDG*5 | Part by weight |  |  | 0.43 |  |  |
| TPP | Part by weight | 0.1 | 0.1 | 0.1 | 0.1 | 0.1 |
| St-Na*2 | Part by weight |  |  |  |  |  |
| IR*3 | Part by weight |  | 0.5 | 0.5 | 0.5 | 0.5 |
| Preheating | Temperature | 100° C. | 100° C. | 100° C. | 100° C. | No preheating |
|  | Torr | 100 Torr, | 100 Torr, | 100 Torr, | 100 Torr, |  |
|  | Time of period | 2 Hr | 2 Hr | 2 Hr | 2 Hr |  |
| Thermal treatment temperature | ° C. | 180 | 180 | 180 | 180 | 180 |
| Thermal treatment time of period | Time of period | 10 | 10 | 10 | 10 | 10 |
| Acid value | mgKOH/g | 0.15 | 0.10 | 0.05 | 0.06 | 0.10 |
| Color hue (YI) |  | 20 | 23 | 24 | 23 | 25 |
| MI value | g/10 min | 6.8 | 5.4 | 5.8 | 1.8 | 6.5 |
| Melting point | ° C. | 203.3 | 203.2 | 203.5 | 203.2 | 203.1 |
| Tensile strength at break | kg/cm$^2$ | 360 | 370 | 350 | 380 | 350 |
| Tensile extension at break | % | 720 | 710 | 700 | 680 | 720 |
| Hydrolysis resistance | % | 90 | 100 | 100 | 100 | 100 |
| Heat decomposition resistance | % | 90 | 100 | 100 | 100 | 100 |
| Melt viscosity stability |  | 0.95 | 0.92 | 0.98 | 1.03 | 1.05 |

BFDGE*4: bisphenol F diglycidyl ether,
CHDDG*5: diglycidyl cyclohexane dicarboxylate.

TABLE III-4

|  |  | Comparative Example III-9 | Comparative Example III-10 | Comparative Example III-11 | Comparative Example III-12 | Comparative Example III-12 |
|---|---|---|---|---|---|---|
| TPEE | Kind | PA-1 | PA-1 | PA-1 | PA-1 | PA-1 |
| GPE | Part by weight | 0.45 | 0.90 | 1.35 | 1.35 | 1.35 |
| BFDGE*4 | Part by weight | 0.47 | 0.94 | 0.47 | 0.47 | 0.47 |
| TPP | Part by weight | 0.1 | 0.1 | 0.1 | 0.1 | 0.1 |
| IR*3 | Part by weight |  |  |  |  | 0.5 |
| Melt mixing temperature | ° C. | 260 | 260 | 260 | 260 | 260 |
| Melt mixing time of period | Minute | 5.0 | 5.0 | 5.0 | 5.0 | 5.0 |
| Thermal treatment time of period | None | None | None | None | None | None |
| Acid value | mgKOH/g | 0.53 | 0.25 | 0.15 | 0.10 | 0.17 |
| Color hue (YI) |  | 27 | 26 | 29 | 28 | 32 |
| MI value | g/10 min | 14.9 | 10.1 | 14.6 | 13.3 | 15.2 |
| Melting point | ° C. | 197.6 | 195.2 | 198.2 | 198.4 | 198.2 |
| Tensile strength at break | kg/cm$^2$ | 310 | 280 | 300 | 340 | 330 |
| Tensile extension at break | % | 680 | 290 | 710 | 700 | 700 |
| Hydrolysis resistance | % | 20 | 60 | 90 | 100 | 90 |
| Heat decomposition resistance | % | 60 | 80 | 90 | 90 | 100 |
| Melt viscosity stability |  | 0.47 | Gelation | 0.65 | 0.69 | 0.73 |

In the present invention III, there can be controlled a reaction ratio of the epoxy compound (C) employed by thermally treating the polyester block copolymer composition (Q) in a solid phase, and an acid value can be particularly suppressed in a low level. Whereby, there can be improved heat resistance and hydrolysis resistance, and there can be provided the composition (R) having a melt viscosity stability by decreasing residual epoxy compounds, and which has a more excellent color hue compared to a product obtained by conventional methods for the preparation.

Hereinafter, Examples are illustrated in relation to the present invention IV.

Reference Example IV-1

Preparation of a Polyester Block copolymer ($P_1'$)

80 parts of a commercially supplied PBT ($A_1$) and 20 parts of ε-caprolactone ($B_1$) were fed into the reaction vessel, and a reaction was conducted at 235° C. for 1 hour while agitating.

Subsequently, pressure was reduced from an ordinary pressure to not more than 1 torr over 1 hour while maintaining the temperature, and residual ε-caprolactone in a system was removed while maintaining a reduced pressure state for further 1 hour.

In the polyester block copolymer ($P_1'$) obtained, a melting point was 185° C., and MI was 11 g/10 minutes.

Reference Example IV-2

Preparation of a Polyester Block Copolymer (P₂')

85 parts of a commercially supplied PBT (A₂) and 15 parts of ε-caprolactone (B₁) were fed into the vessel, and a reaction was conducted at 235° C. for 1 hour while agitating.

Subsequently, pressure was reduced from an ordinary pressure to not more than 1 torr over 1 hour while maintaining the temperature, and residual ε-caprolactone in a system was removed while maintaining a reduced pressure state for further 1 hour.

In the polyester block copolymer (P2') obtained, melting point was 174° C., and MI was 12 g/10 minutes.

Examples IV-1 to IV-24

Polyester block copolymer composition is a compound in which an epoxy compound ($C_1$ or $C_2$) having one or more functionalities, an oxalic acid derivative ($D_1$), salicylic acid derivatives ($D_2$ and $D_3$), a hydrazide derivative ($D_4$), and a variety of stabilizers ($E_1$ and $E_2$) are mixed with the polyester block copolymer ($P_1'$ or $P_2'$) prepared in the Reference Examples IV-1 and IV-2, and heated and kneaded by an extruder. Formulation amount is shown in Table IV-1.

Test pieces were prepared using the polyester block copolymer composition.

A copper foil having width of 5 mm was spirally wound at a pitch of 5 mm interval between marked lines in the test samples.

Subsequently, the test pieces around which the copper foil is wound were put between PVC sheets having 30 mm (length)×30 mm (width)×1 mm (thickness) and, further, the PVC sheets in which the test pieces are put between were put between SUS 304-made metal plates having 35 mm (length)×35 mm (width)×3 mm (thickness) to prepare a composite layer. The weight of 5 kgf was placed on the composite layer, followed by placing in an oven set up at 140° C.

Tensile extension at break was measured in relation to the test pieces placed in the oven.

Results are shown in Table IV-3. A higher change with a lapse of time in the tensile extension at break shows a more progressed deterioration.

Comparative Examples IV-1 to IV-7

Likewise as in the Examples IV-1 to IV-24, a polyester block copolymer composition is a compound in which a variety of additives are mixed with the polyester block copolymer ($P_1'$ or $P_2'$) prepared in the Reference Examples IV-1 and IV-2, and heated and kneaded by an extruder. Formulation amount is shown in Table IV-1.

In relation to the polyester block copolymer composition, tests according to the Example IV-1 were conducted. Results in measurement are shown in Table IV-3.

Comparative Examples IV-8 to IV-13

A polyamide resin having a relative viscosity of 1.80 and a melting point of 178° C. was obtained by adding dodecanoic diacid in polymerization of a Nylon 12 of Daicel Huels, Ltd. It is to be noted that the relative viscosity in the polyamide resin was obtained by measurement of a solution viscosity in which a 0.5%-metacresol solution according to DIN 53727.

A variety of additives were formulated in the polyamide resin as shown in Table IV-2, followed by compounding to prepare a polyamide resin composition by an extruder.

In relation to the polyamide resin composition, tests according to the Example IV-1 were conducted. Results in measurement are shown in Table IV-3.

It is to be noted that symbols in the Table IV-1 and the Table IV-2 are as follows.

$C_1$ Monoglycidylester (Trade name: Kardula E10 manufactured by Shell Japan)

$C_2$ Diglycidylester (Trade name: Epomic R540 manufactured by Mitsui Kagaklu)

$D_1$ Oxalic acid derivative: bisbenzylidenehydrazide oxalate $D_2$ Salicylic acid derivative 1:3-(salicyloyl)amino-1,2,4-triazole $D_3$ Salicylic acid derivative 2: decanedicarboxylic acid disalicyloyl hydrazide $D_4$ Hydrazide derivative: N,N'-bis[3-(3,5-di-t-butyl-4-hydroxyphenyl)propionyl]hydrazine $E_1$ Stabilizer 1: Tetrakis[methylene-3-(3',5'-di-t-butyl-4-hydroxyphenyl)propionate]methane $E_2$ Stabilizer 2: Organic composite phosphite (Trade name: Advastab (manufactured by Katsuta Kako))

TABLE IV-1

| | Polyester block copolymer $P_1'$ Parts by weight | Polyester block copolymer $P_2'$ Parts by weight | Epoxy compound $C_1$ Parts by weight | Epoxy compound $C_2$ Parts by weight | Oxalic acid derivative $D_1$ Parts by weight | Salicylic acid derivative $D_2$ Parts by weight | Salicylic acid derivative $D_3$ Parts by weight | Hydrazide derivative $D_4$ Parts by weight | Stabilizer $E_1$ Parts by weight | Stabilizer $E_2$ Parts by weight |
|---|---|---|---|---|---|---|---|---|---|---|
| Working example IV-1 | 100 | | 0.6 | 0.8 | 0.3 | | | | | |
| Working example IV-2 | 100 | | 1.0 | 1.0 | 0.5 | | | | | |
| Working example IV-3 | 100 | | 0.6 | 0.8 | 0.5 | | | | | 0.5 | 0.5 |
| Working example IV-4 | | 100 | 0.6 | 0.8 | 0.3 | | | | | |
| Working example IV-5 | | 100 | 1.0 | 1.0 | 0.5 | | | | | |
| Working example IV-6 | | 100 | 0.6 | 0.8 | 0.5 | | | | 0.5 | 0.5 |

TABLE IV-1-continued

| | Polyester block copolymer P$_1$' Parts by weight | Polyester block copolymer P$_2$' Parts by weight | Epoxy compound C$_1$ Parts by weight | Epoxy compound C$_2$ Parts by weight | Oxalic acid derivative D$_1$ Parts by weight | Salicylic acid derivative D$_2$ Parts by weight | Salicylic acid derivative D$_3$ Parts by weight | Hydrazide derivative D$_4$ Parts by weight | Stabilizer E$_1$ Parts by weight | Stabilizer E$_2$ Parts by weight |
|---|---|---|---|---|---|---|---|---|---|---|
| Working example IV-7 | 100 | | 0.6 | 0.8 | | 0.3 | | | | |
| Working example IV-8 | 100 | | 1.0 | 1.0 | | 0.5 | | | | |
| Working example IV-9 | 100 | | 0.6 | 0.8 | | 0.5 | | | 0.5 | 0.5 |
| Working example IV-10 | | 100 | 0.6 | 0.8 | | 0.3 | | | | |
| Working example IV-11 | | 100 | 1.0 | 1.0 | | 0.5 | | | | |
| Working example IV-12 | | 100 | 0.6 | 0.8 | | 0.5 | | | 0.5 | 0.5 |
| Working example IV-13 | 100 | | 0.6 | 0.8 | | | 0.3 | | | |
| Working example IV-14 | 100 | | 1.0 | 1.0 | | | 0.5 | | | |
| Working example IV-15 | 100 | | 0.6 | 0.8 | | | 0.5 | | 0.5 | 0.5 |
| Working example IV-16 | | 100 | 0.6 | 0.8 | | | 0.3 | | | |
| Working example IV-17 | | 100 | 1.0 | 1.0 | | | 0.5 | | | |
| Working example IV-18 | | 100 | 0.6 | 0.8 | | | 0.5 | | 0.5 | 0.5 |
| Working example IV-19 | 100 | | 0.6 | 0.8 | | | | 0.3 | | |
| Working example IV-20 | 100 | | 1.0 | 1.0 | | | | 0.5 | | |
| Working example IV-21 | 100 | | 0.6 | 0.8 | | | | 0.5 | 0.5 | 0.5 |
| Working example IV-22 | | 100 | 0.6 | 0.8 | | | | 0.3 | | |
| Working example IV-3 | | 100 | 1.0 | 1.0 | | | | 0.5 | | |
| Working example IV-4 | | 100 | 0.6 | 0.8 | | | | 0.5 | 0.5 | 0.5 |
| Comparative example IV-1 | 100 | | | | | | | | | |
| Comparative example IV-2 | 100 | | | | | | | | 0.5 | |
| Comparative example IV-3 | 100 | | | | | | | | 0.5 | 0.5 |
| Comparative example IV-4 | 100 | | 0.6 | 0.8 | | | | | | |
| Comparative example IV-5 | 100 | | 0.6 | 0.6 | | | | | 0.5 | |
| Comparative example IV-6 | 100 | | | | 0.5 | | | | | |
| Comparative example IV-7 | 100 | | | | | | 0.5 | | | |

TABLE IV-2

| | Polyamide resin Parts by weight | Oxalic acid derivative D$_1$ Parts by weight | Salicylic acid derivative D$_2$ Parts by weight | Salicylic acid derivative D$_3$ Parts by weight | Hydrazide derivative D$_4$ Parts by weight | Stabilizer E$_1$ Parts by weight | Stabilizer E$_2$ Parts by weight |
|---|---|---|---|---|---|---|---|
| Comparative example IV-8 | 100 | | | | | | |
| Comparative example IV-9 | 100 | | | | | 0.5 | 0.5 |
| Comparative example IV-10 | 100 | 0.5 | | | | 0.5 | 0.5 |
| Comparative example IV-11 | 100 | | 0.5 | | | 0.5 | 0.5 |
| Comparative example IV-12 | 100 | | | 0.5 | | 0.5 | 0.5 |
| Comparative example IV-13 | 100 | | | | 0.5 | 0.5 | 0.5 |

TABLE IV-3

| | Tensile strength at break (%) | | | | | | | | | |
|---|---|---|---|---|---|---|---|---|---|---|
| | Placed days | | | | | | | | | |
| | 0 | 5 | 7 | 10 | 14 | 17 | 20 | 23 | 27 | 30 |
| Example IV-1 | 485 | 480 | 485 | 460 | 435 | 410 | 390 | 325 | 190 | 50 |
| Example IV-2 | 470 | 480 | 480 | 470 | 450 | 390 | 385 | 310 | 160 | 45 |
| Example IV-3 | 465 | 475 | 470 | 470 | 465 | 440 | 415 | 370 | 305 | 240 |
| Example IV-4 | 420 | 435 | 420 | 410 | 400 | 360 | 290 | 210 | 80 | 25 |
| Example IV-5 | 415 | 420 | 420 | 395 | 400 | 350 | 265 | 240 | 110 | 25 |
| Example IV-6 | 420 | 425 | 425 | 420 | 405 | 390 | 325 | 270 | 200 | 60 |
| Example IV-7 | 480 | 475 | 470 | 450 | 435 | 400 | 375 | 305 | 175 | 45 |
| Example IV-8 | 465 | 460 | 465 | 440 | 435 | 410 | 390 | 290 | 215 | 90 |
| Example IV-9 | 460 | 475 | 460 | 445 | 450 | 435 | 405 | 385 | 325 | 215 |
| Example IV-10 | 420 | 420 | 420 | 390 | 380 | 360 | 300 | 240 | 120 | 40 |
| Example IV-11 | 410 | 430 | 400 | 400 | 365 | 370 | 320 | 245 | 135 | 0 |
| Example IV-12 | 420 | 425 | 420 | 420 | 405 | 390 | 370 | 345 | 290 | 175 |
| Example IV-13 | 490 | 470 | 475 | 470 | 465 | 410 | 355 | 280 | 245 | 80 |
| Example IV-14 | 480 | 480 | 470 | 455 | 465 | 430 | 400 | 265 | 205 | 110 |
| Example IV-15 | 470 | 485 | 480 | 460 | 455 | 450 | 425 | 410 | 385 | 310 |
| Example IV-16 | 430 | 415 | 410 | 405 | 400 | 375 | 340 | 295 | 200 | 95 |
| Example IV-17 | 440 | 430 | 420 | 400 | 395 | 375 | 350 | 305 | 190 | 100 |
| Example IV-18 | 435 | 430 | 420 | 420 | 420 | 405 | 395 | 345 | 300 | 190 |
| Example IV-19 | 490 | 450 | 440 | 420 | 415 | 395 | 335 | 245 | 120 | 25 |
| Example IV-20 | 460 | 440 | 435 | 440 | 440 | 420 | 370 | 275 | 114.5 | 25 |
| Example IV-21 | 460 | 465 | 460 | 445 | 450 | 430 | 405 | 370 | 360 | 190 |
| Example IV-22 | 420 | 420 | 425 | 400 | 390 | 365 | 335 | 275 | 180 | 100 |
| Example IV-23 | 430 | 430 | 420 | 415 | 410 | 400 | 385 | 290 | 160 | 40 |
| Example IV-25 | 420 | 420 | 410 | 410 | 405 | 400 | 390 | 345 | 275 | 170 |
| C. Ex. IV-1 | 480 | 300 | 185 | 0 | 0 | 0 | 0 | 0 | 0 | 0 |
| C. Ex. IV-2 | 480 | 450 | 425 | 380 | 375 | 300 | 260 | 125 | 0 | 0 |
| C. Ex. IV-3 | 475 | 460 | 430 | 400 | 360 | 280 | 225 | 95 | 0 | 0 |
| C. Ex. IV-4 | 490 | 470 | 460 | 390 | 245 | 90 | 0 | 0 | 0 | 0 |
| C. Ex. IV-5 | 485 | 490 | 440 | 410 | 380 | 210 | 75 | 0 | 0 | 0 |
| C. Ex. IV-6 | 480 | 400 | 325 | 220 | 60 | 0 | 0 | 0 | 0 | 0 |
| C. Ex. IV-7 | 475 | 415 | 330 | 220 | 135 | 45 | 0 | 0 | 0 | 0 |
| C. Ex. IV-8 | 360 | 50 | 0 | 0 | 0 | 0 | 0 | 0 | 0 | 0 |
| C. Ex. IV-9 | 350 | 170 | 45 | 0 | 0 | 0 | 0 | 0 | 0 | 0 |
| C. Ex. IV-10 | 355 | 350 | 300 | 295 | 290 | 160 | 0 | 0 | 0 | 0 |
| C. Ex. IV-11 | 360 | 320 | 280 | 250 | 0 | 0 | 0 | 0 | 0 | 0 |
| C. Ex. IV-12 | 330 | 315 | 300 | 315 | 295 | 250 | 0 | 0 | 0 | 0 |
| C. Ex. IV-13 | 320 | 325 | 315 | 300 | 220 | 65 | 0 | 0 | 0 | 0 |

The polyester block copolymer composition of the present invention IV has an excellent heat resistance in contact with a metal and a PVC and, it is preferred as a heat sensitive body to be employed for a heater code in an electric blanket and electric carpet, and it can be also employed for a long time of period as a heat sensitive body even in direct contact with a metal-made short code or a heating wire and a PVC which is an outer cover.

Hereinafter, Examples are illustrated in relation to the present invention V.

Comparative Example V-1

60 parts of a PBT (A1) and 40 parts of ε-caprolactone were fed into a reaction vessel, and a reaction was conducted at 235° C. for 1 hour while agitating. Subsequently, pressure was reduced from an ordinary pressure to not more than 1 torr over 1 hour while maintaining the temperature, and residual ε-caprolactone in a system was removed while maintaining a reduced pressure state for further 1 hour.

In the polyester block copolymer obtained, a melting point was 205° C., and MI was 11 g/10 minutes. It is to be noted that the modulus of strain hardening was not observed.

Comparative Example V-2

30 parts by weight of Celloxide 2021P and 1 part by weight of 2-ethyl-4-methylimidazole were formulated with 100 parts of a polyester block copolymer obtained in the Comparative Example V-1, followed by compounding to prepare a composition by a twin screw extruder.

In the composition obtained, an MI was 2 g/10 minutes, and the modulus of strain hardening was not observed.

Reference Example V-1

60 parts of a PBT (A1), 40 parts of ε-caprolactone, and 5% by mol (0.0103 part by weight) of trimethylolpropane were fed into the reaction vessel, and a reaction was conducted at 235° C. for 1 hour while agitating. Subsequently, pressure was decreased from an ordinary pressure to not more than 1 torr over 1 hour while maintaining the temperature, and residual ε-caprolactone in a system was removed while maintaining a reduced pressure state for further 1 hour to obtain a polyester block copolymer (PA).

In the polyester block copolymer (PA) obtained, a melting point was 194° C., and MI was 2 g/10 minutes, and the modulus of strain hardening was observed.

Reference Example V-2

60 parts of a PBT ($A_1$), 40 parts of ε-caprolactone, and 2.5% by mol (0.0052 part by weight) of trimethylolpropane were fed into the reaction vessel, and a reaction was conducted at 235° C. for 1 hour while agitating. Subsequently, pressure was decreased from an ordinary pressure to not more than 1 torr over 1 hour while maintaining the temperature, and residual ε-caprolactone in a system was removed while maintaining a reduced pressure state for further 1 hour to obtain a polyester block copolymer (PB).

In the polyester block copolymer (PB) obtained, a melting point was 196° C., and MI was 1 g110 minutes, and the modulus of strain hardening was slightly observed.

Reference Example V-3

60 parts of a PBT (A1), 40 parts of ε-caprolactone, and 0.1% by mol ($0.206 \times 10_{-3}$ part by weight) of trimethylolpropane were fed into a reaction vessel, and a reaction was conducted at 235° C. for 1 hour while agitating. Subsequently, pressure was reduced from an ordinary pressure to not more than 1 torr over 1 hour while maintaining the temperature, and residual ε-caprolactone in a system was removed while maintaining a reduced pressure state for further 1 hour to obtain a polyester block copolymer (PC).

In the polyester block copolymer (PC) obtained, a melting point was 194° C., and MI was 5 g/10 minutes, and the modulus of strain hardening was slightly observed.

Examples V-1 to V-11

A polyester block copolymer composition was prepared by formulating and compounding through heating and kneading an epoxy compound having one or more functionalities and a carbodiimide compound by an extruder with the polyester block copolymers prepared in the Reference Examples V-1 to V-3 at a ratio shown in Table V-1 to measure the modulus of strain hardening. Results are shown in Table V-1.

Further, test pieces and conditioned test pieces were prepared using the polyester block copolymer compositions, and tensile extension at break was measured in relation to the conditioned test pieces. Results are shown in Table V-2.

A higher change ratio of the tensile extension at break with a lapse of time shows a more progressed deterioration.

Comparative Example V-3

60 parts of a PBT ($A_1$), 40 parts of ε-caprolactone, and 150% by mol (0.309 parts by weight) of trimethylolpropane were fed into a reaction vessel, and a reaction was conducted at 235° C. for 1 hour while agitating. Subsequently, pressure was reduced from an ordinary pressure to not more than 1 torr over 1 hour while maintaining the temperature, and residual ε-caprolactone in a system was removed while maintaining a reduced pressure state for further 1 hour to obtain a polyester block copolymer.

In the polyester block copolymer obtained, a melting point was 179° C. which was fairly lowered, and MI was 2 g/10 minutes, and the modulus of strain hardening was observed.

Comparative Examples V-4 to V-6

Likewise as in the Examples V-1 to V-11, a polyester block copolymer composition was prepared by formulating and compounding through heating and kneading a variety of additives by a twin-screw extruder with the polyester block copolymer prepared in the Reference Examples V-1 to V-3. Formulation amount is shown in Table V-1. In relation to the polyester block copolymer composition, tests were conducted according to the Examples V-1 to V-11. Results in measurement are shown in Table V-2.

TABLE V-1

| | Polyester block copolymer (PA) PBW | Polyester block copolymer (PB) PBW | Polyester block copolymer (PC) PBW | Epoxy compound C1 PBW | Epoxy compound C2 PBW | Carbodiimide compound E1 PBW | Stabilizer F1 PBW | Stabilizer F2 PBW | Modulus of Strain-hardening |
|---|---|---|---|---|---|---|---|---|---|
| Exam. V-1 | 100 | | | 0.6 | 0.8 | | | | ⊚ |
| Exam. V-2 | 100 | | | 1.0 | 1.0 | | | | ⊚ |
| Exam. V-3 | 100 | | | 0.6 | 0.8 | 0.5 | | | ⊚ |
| Exam. V-5 | | 100 | | 0.6 | 0.8 | | | | ⊚ |
| Exam. V-6 | | 100 | | 1.0 | 1.0 | | | | ⊚ |
| Exam. V-7 | | 100 | | 0.6 | 0.8 | 0.5 | | | ⊚ |
| Exam. V-8 | | 100 | | 0.6 | 0.8 | | 0.5 | 0.5 | ⊚ |
| Exam. V-9 | | | 100 | 0.6 | 0.8 | 0.5 | | | ○ |
| Exam. V-10 | | | 100 | 1.0 | 1.0 | 0.5 | | | ○ |
| Exam. V-11 | | | 100 | 0.6 | 0.8 | 0.5 | 0.5 | 0.5 | ○ |
| C. Ex. V-4 | 100 | | | 5.0 | 5.0 | | | | Gel |
| C. Ex. V-5 | | 100 | | 5.0 | 5.0 | | | | Gel |
| C. Ex. V-6 | | | 100 | 0.5 | 0.1 | | 0.5 | 0.5 | X |

C1: monoglycidylester of versatic acid (trade name: Kardula E10 manufactured by Shell Japan)
C2: diglycidylester of cyclohexane dicarboxylic acid (trade name: Epomic R540 manufactured by Mitsui Kagaku)
E1: carbodiimide compound: Stabaxol (manufactured by Sumitomo Bayer Urethane)
F1: stabilizer 1: tetraxis[methylene-3-(3',5'-di-t-butyl-4-hydroxyphenyl)propionate]methane
F2: stabilizer 2: organic complexed phosphite (trade name: Advastab manufactured by Katsuta Kako)
*⊚ the presence of modulus of strain hardening (slope is not less than 1.0 in the above-described definition)
○ minor modulus of strain hardening (slope is less than 1.0 in the above-described definition)
X the absence of modulus of strain hardening (slope is 0 in the above-described definition)
Gel: many gels

TABLE V-2

| | Tensile extension at break (%) | | | | | | | | | |
|---|---|---|---|---|---|---|---|---|---|---|
| | Placed days | | | | | | | | | |
| | 0 | 5 | 7 | 10 | 14 | 17 | 20 | 23 | 27 | 30 |
| Example V-1 | 420 | 435 | 420 | 410 | 400 | 360 | 290 | 210 | 80 | 25 |
| Example V-2 | 415 | 420 | 420 | 395 | 400 | 350 | 265 | 240 | 110 | 25 |
| Example V-3 | 480 | 475 | 470 | 450 | 435 | 400 | 375 | 305 | 175 | 45 |
| Example V-4 | 420 | 425 | 425 | 420 | 405 | 390 | 325 | 270 | 200 | 60 |
| Example V-5 | 470 | 480 | 480 | 470 | 450 | 390 | 385 | 310 | 160 | 45 |
| Example V-6 | 485 | 480 | 485 | 460 | 435 | 410 | 390 | 325 | 190 | 50 |
| Example V-7 | 460 | 475 | 460 | 445 | 450 | 435 | 405 | 385 | 325 | 215 |
| Example V-8 | 465 | 460 | 465 | 440 | 435 | 410 | 390 | 360 | 330 | 260 |
| Example V-9 | 490 | 495 | 490 | 490 | 485 | 460 | 370 | 220 | 160 | 55 |
| Example V-10 | 495 | 510 | 515 | 515 | 510 | 480 | 440 | 400 | 350 | 250 |
| Example V-11 | 480 | 485 | 480 | 480 | 475 | 460 | 420 | 400 | 370 | 340 |
| C. Example V-1 | 480 | 300 | 185 | 0 | 0 | 0 | 0 | 0 | 0 | 0 |
| C. Example V-2 | 480 | 475 | 475 | 460 | 435 | 400 | 360 | 305 | 190 | 60 |
| C. Example V-3 | 475 | 350 | 200 | 0 | 0 | 0 | 0 | 0 | 0 | 0 |
| C. Example V-6 | 460 | 470 | 460 | 440 | 430 | 400 | 370 | 330 | 290 | 200 |

It is large in dependence upon extension rate, and provides a molded article having uniform thickness in blow molding and, further, it has a characteristic of exceedingly less flashes in molding. Moreover, a molded article obtained from a composition is very excellent in heat resistance in addition to properties inherently possessed by a polyester block copolymer. It does not cause a thermal deterioration even being employed for a use exposed to a high temperature for a long time of period, and it provides a molded article having very excellent physical properties.

Hereinafter, Examples are illustrated in relation to the present invention VI.

Reference Example VI-1

Preparation of a Polyester Block Copolymer (P-A)

60 parts of a PBT ($A_1$), 40 parts of ε-caprolactone, and 150% by mol of 2,4-dihydroxy benzoate based on 100% by mol of polybutylene phthalate were fed into a reaction vessel, and a reaction was conducted at 235° C. for 1 hour while agitating.

Subsequently, pressure was reduced from an ordinary pressure to not more than 1 torr over 1 hour while maintaining the temperature, and residual ε-caprolactone in a system was removed while maintaining a reduced pressure state for further 1 hour. In the polyester block copolymer obtained, a melting point was 190° C., and MI was 2 g/10 minutes. Further, the modulus of strain hardening was observed. The polyester block copolymer was designated as Copolymer (P-A).

Reference Example VI-2

Preparation of a Polyester Block Copolymer (P-B)

60 parts of a PBT (A1), 40 parts of ε-caprolactone, and 50% by mol of 2,4-dihydroxy benzoate based on 100% by mol of a polybutylene phthalate were fed into a reaction vessel, and a reaction was conducted at 235° C. for 1 hour while agitating.

Subsequently, pressure was reduced from an ordinary pressure to not more than 1 torr over 1 hour while maintaining the temperature, and residual ε-caprolactone in a system was removed while maintaining a reduced pressure state for further 1 hour. In the polyester block copolymer obtained, a melting point was 199° C., and MI was 4 g/10 minutes. Further, the modulus of strain hardening was observed. The polyester block copolymer was designated as Copolymer (P-B).

Reference Example VI-3

Preparation of a Polyester Block Copolymer (P-C)

60 parts of a PBT (A1), 40 parts of ε-caprolactone, and 0.1% by mol of 2,4-dihydroxy benzoate based on 100% by mol of polybutylene phthalate were fed into a reaction vessel, and a reaction was conducted at 235° C. for 1 hour while agitating.

Subsequently, pressure was decreased from an ordinary pressure to not more than 1 torr over 1 hour while maintaining the temperature, and residual ε-caprolactone in a system was removed while maintaining a reduced pressure state for further 1 hour. In the polyester block copolymer obtained, a melting point was 205° C., and MI was 5 g/10 minutes. Further, the modulus of strain hardening was observed. The polyester block copolymer was designated as Copolymer (P-C).

Examples VI-1 to VI-11

Polyester block copolymer composition was prepared by formulating and compounding through heating and kneading an epoxy compound having one or more functionalities and a carbodiimide compound by an extruder with the polyester block copolymers (P-A), (P-B), and (P-C) prepared in the Reference Examples VI-1 to VI-3.

Formulating amount and the presence or absence of the modulus of strain hardening are shown in Table VI-1.

Further, test pieces and conditioned test pieces were prepared using the polyester block copolymer compositions, and tensile extension at break was measured in relation to the conditioned test pieces. Results are shown in Table VI-2. A higher change ratio of the tensile extension at break with a lapse of time shows a more progressed deterioration.

Comparative Example VI-1

60 parts of a PBT (A1) and 40 parts of ε-caprolactone were fed into a reaction vessel, and a reaction was conducted at 235° C. for 1 hour while agitating. Subsequently, pressure was decreased from an ordinary pressure to not more than 1 torr over 1 hour while maintaining the temperature, and residual ε-caprolactone in a system was removed while maintaining a reduced pressure state for further 1 hour. In the polyester block copolymer obtained, a melting point was 205° C., and MI was 11 g/10 minutes. The modulus of strain hardening was not observed.

Comparative Example VI-2

30 parts by weight of Celloxide 2021P and 1 part by weight of 2-ethyl-4-methylimidazole were formulated with 100 parts of a polyester block copolymer obtained in the Comparative Example VI-1, followed by compounding to prepare a composition by an extruder. In the composition obtained, an MI was 2 g/10 minutes, and the modulus of strain hardening was not observed.

Comparative Example VI-3

60 parts of a PBT (A$_1$), 40 parts of ε-caprolactone, and 300% by mol of 2,4-dihydroxy benzoate based on 100% by mol of a polybutylene phthalate were fed into a reaction vessel, and a reaction was conducted at 235° C. for 1 hour while agitating.

Subsequently, pressure was decreased from an ordinary pressure to not more than 1 torr over 1 hour while maintaining the temperature, and residual ε-caprolactone in a system was removed while maintaining a reduced pressure state for further 1 hour. In the polyester block copolymer obtained, a melting point was 179° C. which is fairly lowered, and MI was 1 g/10 minutes. The modulus of strain hardening was observed.

Comparative Examples VI-4 to VI-6

Likewise as in the Examples VI-1 to VI-11, polyester block copolymer composition was prepared by formulating and compounding through heating and kneading a variety of additives by an extruder with the polyester block copolymers (P-A), (P-B), and (P-C) prepared in the Reference Examples VI-1 to VI-3. Formulating amount is shown in Table VI-1. In relation to the polyester block copolymer compositions, tests were conducted according to the Examples VI-1 to VI-11. Results in measurement are shown in Table V-2.

TABLE VI-1

| | Polyester block copolymer (P-A) PBW | Polyester block copolymer (P-B) PBW | Polyester block copolymer (P-C) PBW | Epoxy Compound 1[1] PBW | Epoxy Compound 2[2] PBW | Carbodi-imide Compound[3] PBW | Stabilizer 1[4] PBW | Stabilizer 2[5] PBW | Modulus of Strain-hardening[6] |
|---|---|---|---|---|---|---|---|---|---|
| Exam. VI-1 | 100 | | | 0.6 | 0.8 | | | | ⊚ |
| Exam. VI-2 | 100 | | | 1.0 | 1.0 | | | | ⊚ |
| Exam. VI-3 | 100 | | | 0.6 | 0.8 | 0.5 | | | ⊚ |
| Exam. VI-4 | 100 | | | 0.6 | 0.8 | | 0.5 | 0.5 | ⊚ |
| Exam. VI-5 | | 100 | | 0.6 | 0.8 | | | | ⊚ |
| Exam. VI-6 | | 100 | | 1.0 | 1.0 | | | | ⊚ |
| Exam. VI-7 | | 100 | | 0.6 | 0.8 | 0.5 | | | ⊚ |
| Exam. VI-8 | | 100 | | 0.6 | 0.8 | | 0.5 | 0.5 | ⊚ |
| Exam. VI-9 | | | 100 | 0.6 | 0.8 | 0.5 | | | ○ |
| Exam. VI-10 | | | 100 | 1.0 | 1.0 | 0.5 | | | ○ |
| Exam. VI-11 | | | 100 | 0.6 | 0.8 | 0.5 | 0.5 | 0.5 | ○ |
| C. Ex. VI-4 | 100 | | | 5.0 | 5.0 | | | | Gel |
| C. Ex. VI-5 | | 100 | | 5.0 | 5.0 | | | | Gel |
| C. Ex. VI-6 | | | 100 | 0 | 0 | 0.5 | 0.5 | 0.5 | X |

[1] monoglycidyl ester (Trade name: Kardula E10 (manufactured by Shell Japan))
[2] diglycidyl ester (Trade name: Epomik R540 (manufactured by Mitsui Kagaku))
[3] carbodiimide compoud: Stabaxol 1 (manufactured by Sumitomo Baier Urethane)
[4] Stabilizer 1: tetrakis [methylene-3-(3',5'-di-t-butyl-4-hydroxyphenyl) propionate] methane
[5] Stabilizer 2: organic complexed phosphoric salt (Trade name: Advastab (manufactured by Katsuta Kako))
[6] ⊚: the presnce of strain-hardening property, ○: the presnce of slight strain-hardening property, X: the abesnce strain-hardening property, Gel: a large amount of gel

TABLE VI-2

| | Tensile extention at break (%) | | | | | | | | | |
|---|---|---|---|---|---|---|---|---|---|---|
| | Placed days | | | | | | | | | |
| | 0 | 5 | 7 | 10 | 14 | 17 | 20 | 23 | 27 | 30 |
| Example VI-1 | 440 | 440 | 430 | 420 | 400 | 360 | 290 | 210 | 80 | 30 |
| Example VI-2 | 415 | 420 | 420 | 395 | 380 | 360 | 310 | 240 | 110 | 30 |
| Example VI-3 | 450 | 470 | 470 | 450 | 435 | 400 | 375 | 305 | 175 | 45 |
| Example VI-4 | 420 | 425 | 425 | 420 | 405 | 390 | 370 | 330 | 270 | 205 |
| Example VI-5 | 480 | 480 | 480 | 470 | 450 | 390 | 385 | 310 | 160 | 45 |

TABLE VI-2-continued

Tensile extention at break (%)

Placed days

|  | 0 | 5 | 7 | 10 | 14 | 17 | 20 | 23 | 27 | 30 |
|---|---|---|---|---|---|---|---|---|---|---|
| Example VI-6 | 460 | 470 | 470 | 460 | 435 | 410 | 390 | 325 | 190 | 50 |
| Example VI-7 | 460 | 475 | 460 | 450 | 450 | 435 | 405 | 385 | 310 | 205 |
| Example VI-8 | 430 | 445 | 450 | 440 | 435 | 410 | 380 | 350 | 310 | 260 |
| Example VI-9 | 490 | 495 | 490 | 490 | 485 | 460 | 370 | 220 | 160 | 60 |
| Exam. VI-10 | 495 | 510 | 515 | 515 | 510 | 470 | 430 | 370 | 300 | 220 |
| Exam. VI-11 | 480 | 485 | 480 | 480 | 475 | 450 | 410 | 365 | 310 | 250 |
| C. Exam. VI-1 | 480 | 300 | 185 | 0 | 0 | 0 | 0 | 0 | 0 | 0 |
| C. Exam. VI-2 | 480 | 475 | 475 | 460 | 435 | 400 | 360 | 305 | 190 | 60 |
| C. Exam. VI-3 | 475 | 350 | 200 | 0 | 0 | 0 | 0 | 0 | 0 | 0 |
| C. Exam. VI-6 | 460 | 470 | 460 | 440 | 430 | 400 | 370 | 330 | 290 | 200 |

Since the composition by the present invention VI has the modulus of strain hardening, it is supposed that there can be obtained a molded article having uniform thickness in blow molding and, moreover, since the molded article has a low change ratio of the tensile extension at break with a lapse of time, there can be obtained a polyester block copolymer composition having a lower deterioration with a lapse of time. A molded article obtained using the composition is very excellent in heat resistance in addition to properties inherently possessed by a polyester block copolymer, and the molded article does not cause a thermal deterioration even being employed for a use exposed to a high temperature for a long time of period.

Hereinafter, Examples are illustrated in relation to the present invention VII.

Preparation Example VII-1

60 parts of a polybutylene terephthalate (A1), 40 parts of ε-caprolactone, and 150% by mol of trimethylolpropane were fed into a reaction vessel, and a reaction was conducted at 235° C. for 1 hour while agitating. Subsequently, pressure was reduced from an ordinary pressure to not more than 1 torr over 1 hour while maintaining the temperature, and residual ε-caprolactone in a system was removed while maintaining a reduced pressure state for further 1 hour. In the polyester block copolymer obtained, a melting point was 190° C., and a number average molecular weight was 56000.

The copolymer is designated as Polyester block copolymer (P-A).

Preparation Example VII-2

60 parts of a polybutylene terephthalate (A1), 40 parts of ε-caprolactone, and 50% by mol of trimethylolpropane were fed into a reaction vessel, and a reaction was conducted at 235° C. for 1 hour while agitating. Subsequently, pressure was decreased from an ordinary pressure to not more than 1 torr over 1 hour while maintaining the temperature, and residual ε-caprolactone in a system was removed while maintaining a reduced pressure state for further 1 hour. In the polyester block copolymer obtained, a melting point was 199° C., and a number average molecular weight was 61000. The copolymer is designated as Polyester block copolymer (P-B).

Preparation Example VII-3

60 parts of a polybutylene terephthalate ($A_1$), 40 parts of ε-caprolactone, and 0.1% by mol of trimethylolpropane were fed into a reaction vessel, and a reaction was conducted at 235° C. for 1 hour while agitating. Subsequently, pressure was reduced from an ordinary pressure to not more than 1 torr over 1 hour while maintaining the temperature, and residual ε-caprolactone in a system was removed while maintaining a reduced pressure state for further 1 hour. In the polyester block copolymer obtained, a melting point was 205° C., and a number average molecular weight was 71200. The copolymer is designated as Polyester block copolymer (P-C).

Preparation Example VII-4

60 parts of a polybutylene terephthalate ($A_1$), 40 parts of ε-caprolactone, and 150% by mol of 2,4-dihydroxy benzoate were fed into a reaction vessel, and a reaction was conducted at 235° C. for 1 hour while agitating. Subsequently, pressure was decreased from an ordinary pressure to not more than 1 torr over 1 hour while maintaining the temperature, and residual ε-caprolactone in a system was removed while maintaining a reduced pressure state for further 1 hour. In the polyester block copolymer obtained, a melting point was 190° C., and a number average molecular weight was 51000. The copolymer is designated as Polyester block copolymer (P-D).

Preparation Example VII-5

60 parts of a polybutylene terephthalate ($A_1$), 40 parts of ε-caprolactone, and 80% by mol of 2,4-dihydroxy benzoate were fed into a reaction vessel, and a reaction was conducted at 235° C. for 1 hour while agitating. Subsequently, pressure was decreased from an ordinary pressure to not more than 1 torr over 1 hour while maintaining the temperature, and residual ε-caprolactone in a system was removed while maintaining a reduced pressure state for further 1 hour. In the polyester block copolymer obtained, a melting point was 200° C., and a number average molecular weight was 63800. The copolymer is designated as Polyester block copolymer (P-E).

Preparation Example VII-6

60 parts of a polybutylene terephthalate ($A_1$) having a melting point of 230° C., 40 parts of ε-caprolactone, and 0.5% by mol of 2,4-dihydroxy benzoate were fed into a reaction vessel, and a reaction was conducted at 235° C. for 1 hour while agitating.

Subsequently, pressure was decreased from an ordinary pressure to not more than 1 torr over 1 hour while maintaining the temperature, and residual ϵ-caprolactone in a system was removed while maintaining a reduced pressure state for further 1 hour. In the polyester block copolymer obtained, a melting point was 204° C., and a number average molecular weight was 69100. The copolymer is designated as Polyester block copolymer (P-F).

Preparation Example VII-7

60 parts of a polybutylene terephthalate ($A_1$) and 40 parts of ϵ-caprolactone were fed into a reaction vessel, and a reaction was conducted at 235° C. for 1 hour while agitating. Subsequently, pressure was decreased from an ordinary pressure to not more than 1 torr over 1 hour while maintaining the temperature, and residual ϵ-caprolactone in a system was removed while maintaining a reduced pressure state for further 1 hour. In the polyester block copolymer obtained, a melting point was 204° C., and a number average molecular weight was 76500.

The copolymer is designated as Polyester block copolymer (P-G).

Preparation Example VII-8

60 parts of a polybutylene terephthalate ($A_1$) having a melting point of 230° C., 40 parts of ϵ-caprolactone, and 300% by mol of 2,4-dihydroxy benzoate were fed into a reaction vessel, and a reaction was conducted at 235° C. for 1 hour while agitating. Subsequently, pressure was reduced from an ordinary pressure to not more than 1 torr over 1 hour while maintaining the temperature, and residual ϵ-caprolactone in a system was removed while maintaining a reduced pressure state for further 1 hour. In the polyester block copolymer obtained, a melting point was 179° C. which is fairly lowered. As described hereinabove, when a multifunctional compound is added in a large amount, a melting point is largely lowered.

Examples VII-1 to VII-10

Polyester block copolymer composition is a mixture in which compounds selected from cyclohexane diglycidylester (CHDGE), Kardular E10, sodium stearate, and Irganox 1010 are mixed with 100 parts by weight of the polyester block copolymers prepared in the Preparation Examples VII-1 to VII-6 in the weight part described in Table VII-1, respectively, and which is prepared by agitating at room temperature for 30 minutes in a drum tumbler. The mixture was extruded using a 32 mmø twin screw extruder at 230° C. for a heating time of period of 2.5 minutes, and cut and pelletized after cooled in water.

Pellets obtained were fed into a tank type apparatus which can be heated and agitated, and can be pressure-reduced and purged by nitrogen, and preheated under conditions of 100° C. and 100 torr for 3 hours. Further, the apparatus was purged by nitrogen and returned to an ordinary pressure, and a thermal treatment was conducted by elevating to 180° C. After the treatment, it was cooled under a nitrogen atmosphere to take out pellets, and there were measured an MI value, a tensile strength and extension, a melting point, color hue, an acid value, a number average molecular weight, the modulus of strain hardening, and a draw-down property. Conditions for measurement and results are shown in Table VII-2.

As sown in the Tables VII-1 and VII-2, by the method of the present invention, there can be obtained resins having an excellent draw-down property and color hue and, in which an acid value can be reduced by a small amount of the epoxy compounds, in which decline of viscosity is less, and which have excellent physical properties.

Further, the mount of volatile components was less in melt-mixing compared to the Comparative Examples as described hereinafter.

Comparative Examples VII-1 to VII-7

Polyester block copolymer composition is a mixture in which compounds selected from the CHDGE, Kardular E10, sodium stearate, and Irganox 1010 are mixed with the polyester block copolymers prepared in the Preparation Examples VII-1 to VII-7 in the weight part described in Table VII-1, respectively, and which is prepared by agitating at room temperature for 30 minutes in a drum tumbler.

The mixture was extruded using a 32 mmϕ twin screw extruder at a temperature and time of period adjusted as shown in Table VII-1 and while controlling an feeding amount, and cut and pelletized after cooled in water.

In relation to the pellets obtained, there were measured an MI value, a tensile strength and extension, a melting point, color hue, an acid value, a number average molecular weight, the modulus of strain hardening, and a draw-down property. Conditions for measurement and results are shown in Table VII-2.

As shown in the Tables VII-1 and VII-2, it is confirmed that although the draw-down property is partially observed, a level is small, and draw-down resistance is also small which is required in blow molding. Further, it is confirmed that a large amount of epoxy compounds are required in order to sufficiently lower an acid value, and there become worse physical properties such as color hue and viscosity.

Comparative Example VII-8

A composition was prepared by compounding using a twin screw extruder after formulating 30 parts by weight of Celloxide 2021 and 1 part by weight of 2-phenylimidazole with the polyester block copolymer obtained in the Preparation Example VII-7. In relation to the composition obtained, there were measured an MI value, a tensile strength and extension, a melting point, color hue, an acid value, a number average molecular weight, the modulus of strain hardening, and a draw-down property. Conditions for measurement and results are shown in Table VII-2. The modulus of strain hardening was not observed.

Comparative Examples VII-9 to VII-11

Likewise as in the Examples VII-1 to VII-10, a polyester block copolymer composition is a mixture in which compounds selected from the CHDGE, Kardular E-10, sodium stearate, and Irganox 1010 are mixed with 100 parts by weight of the polyester block copolymer prepared in the Preparation Example VII-7 in the weight part described in Table, respectively, which is prepared by agitating at room temperature for 30 minutes in a drum tumbler. The mixture was extruded using a 32 mmϕ twin screw extruder at 230° C. and a heating time of period of 1 minute, and cut and pelletized after cooled in water.

Pellets obtained were fed into a tank type apparatus which can be heated and agitated and can be pressure-reduced and purged by nitrogen, and a thermal pretreatment was conducted at conditions of 100° C. and 100 torr for 3 hours. Further, a thermal treatment was conducted at 180° C. after having returned to an ordinary pressure by purging nitrogen. After cooled under nitrogen, and pellets were taken out to measure an MI value, a tensile strength and extension, a melting point, color hue, an acid value, a number average molecular weight, a modulus of strain hardening, and a draw-down property. Conditions for measurement and results are shown in Table VII-2. The modulus of strain hardening was not observed in all samples.

TABLE VII-1

|  | Polyester block Copolymer Kind | CHDGE PBW | Kardula E10 PBW | Sodium Stearate PBW | Irganox 1010 PBW | Melt Mixing Temperature ° C. | Melt Mixing Time minute | Heating Temperature ° C. | Heating Time Hour |
|---|---|---|---|---|---|---|---|---|---|
| C. Ex. VII-1 | (A) | 1.8 | 0.7 | 0.1 | 0.5 | 260 | 2.5 | — | — |
| C. Ex. VII-2 | (B) | 1.8 | 0.7 | 0.1 | 0.5 | 260 | 2.5 | — | — |
| C. Ex. VII-3 | (C) | 1.8 | 0.7 | 0.1 | 0.5 | 260 | 2.5 | — | — |
| C. Ex. VII-4 | (D) | 1.8 | 0.7 | 0.1 | 0.5 | 260 | 2.5 | — | — |
| C. Ex. VII-5 | (E) | 1.8 | 0.7 | 0.1 | 0.5 | 260 | 2.5 | — | — |
| C. Ex. VII-6 | (F) | 1.8 | 0.7 | 0.1 | 0.5 | 260 | 2.5 | — | — |
| C. Ex. VII-7 | (G) | 1.8 | 0.7 | 0.1 | 0.5 | 260 | 2.5 | — | — |
| C. Ex. VII-8 | (G) | — | — | 0.1 | 0.5 | 260 | 2.5 | — | — |
| C. Ex. VII-9 | (G) | 0.3 | 1.5 | 0.1 | 0.5 | 240 | 2.5 | 180 | 8 |
| C. Ex. VII-10 | (G) | 0.5 | 1.5 | 0.1 | 0.5 | 240 | 2.5 | 180 | 8 |
| C. Ex. VII-11 | (G) | 0.7 | 1.5 | 0.1 | 0.5 | 240 | 2.5 | 180 | 8 |
| Exam. VII-1 | (A) | 0.7 | 1.5 | 0.1 | 0.5 | 240 | 2.5 | 180 | 8 |
| Exam. VII-2 | (B) | 0.3 | 1.5 | 0.1 | 0.5 | 240 | 2.5 | 180 | 8 |
| Exam. VII-3 | (B) | 0.5 | 1.5 | 0.1 | 0.5 | 240 | 2.5 | 180 | 8 |
| Exam. VII-4 | (B) | 0.7 | 1.5 | 0.1 | 0.5 | 240 | 2.5 | 180 | 8 |
| Exam. VII-5 | (C) | 0.7 | 1.5 | 0.1 | 0.5 | 240 | 2.5 | 180 | 8 |
| Exam. VII-6 | (D) | 0.7 | 1.5 | 0.1 | 0.5 | 240 | 2.5 | 180 | 8 |
| Exam. VII-7 | (E) | 0.3 | 1.5 | 0.1 | 0.5 | 240 | 2.5 | 180 | 8 |
| Exam. VII-8 | (E) | 0.5 | 1.5 | 0.1 | 0.5 | 240 | 2.5 | 180 | 8 |
| Exam. VII-9 | (E) | 0.7 | 1.5 | 0.1 | 0.5 | 240 | 2.5 | 180 | 8 |
| Exam. VII-10 | (F) | 0.7 | 1.5 | 0.1 | 0.5 | 240 | 2.5 | 180 | 8 |

In the Table VII-1, the abbreviation "PBW" means "part by weight".

TABLE VII-2

|  | AV mgKOH/g | CH (YI) | MIV g/10 min | MP ° C. | TSAB kg/cm² | TEAB % | HR % | HTR % | MVS | MSH | DDP | NAMW Mn |
|---|---|---|---|---|---|---|---|---|---|---|---|---|
| C. Ex. VII-1 | 0.1 | 22 | 4.1 | 178 | 490 | 700 | 100 | 100 | 1.2 | 0.6 | 2.0 | 65000 |
| C. Ex. VII-2 | 0.1 | 22 | 4.8 | 188 | 450 | 710 | 100 | 100 | 1.1 | 0.4 | 1.8 | 69500 |
| C. Ex. VII-3 | 0.1 | 23 | 6.7 | 190 | 490 | 680 | 100 | 100 | 1.1 | 0.2 | 1.6 | 73300 |
| C. Ex. VII-4 | 0.1 | 20 | 5.0 | 182 | 450 | 650 | 100 | 100 | 0.7 | 0.7 | 2.2 | 64000 |
| C. Ex. VII-5 | 0.1 | 18 | 7.1 | 192 | 470 | 650 | 100 | 100 | 0.9 | 0.5 | 2.1 | 67800 |
| C. Ex. VII-6 | 0.1 | 23 | 8.5 | 196 | 470 | 660 | 100 | 100 | 1.0 | 0.2 | 1.8 | 70100 |
| C. Ex. VII-7 | 0.1 | 19 | 5.2 | 197 | 490 | 690 | 100 | 100 | 1.1 | 0 | 1.5 | 79000 |
| C. Ex. VII-8 | 0.3 | 32 | 2.1 | 188 | 480 | 700 | 70 | 80 | 0.7 | 0 | 3.5 | 73200 |
| C. Ex. VII-9 | 0.1 | 16 | 1.7 | 203 | 440 | 680 | 100 | 100 | 1.0 | 0 | 3.8 | 78500 |
| C. Ex. VII-10 | 0.1 | 15 | 1.4 | 203 | 470 | 670 | 100 | 100 | 1.0 | 0 | 4.0 | 81000 |
| C. Ex. VII-11 | 0.1 | 15 | 0.9 | 202 | 450 | 680 | 100 | 100 | 1.0 | 0 | 4.5 | 84400 |
| Exam. VII-1 | 0.1 | 16 | 0.8 | 189 | 490 | 700 | 100 | 100 | 1.0 | 1.4 | 4.6 | 69900 |
| Exam. VII-2 | 0.1 | 16 | 1.9 | 198 | 490 | 660 | 100 | 100 | 1.0 | 0.5 | 3.5 | 67700 |
| Exam. VII-3 | 0.1 | 14 | 1.6 | 198 | 420 | 700 | 100 | 100 | 1.0 | 0.7 | 3.8 | 71000 |
| Exam. VII-4 | 0.1 | 15 | 1.1 | 199 | 470 | 690 | 100 | 100 | 1.0 | 0.9 | 4.2 | 74200 |
| Exam. VII-5 | 0.1 | 15 | 0.9 | 204 | 460 | 710 | 100 | 100 | 1.0 | 0.5 | 4.3 | 76100 |
| Exam. VII-6 | 0.1 | 17 | 0.8 | 190 | 480 | 640 | 100 | 100 | 0.9 | 1.6 | 4.4 | 72300 |
| Exam. VII-7 | 0.1 | 18 | 2.2 | 200 | 450 | 690 | 100 | 100 | 0.9 | 0.6 | 3.2 | 65100 |
| Exam. VII-8 | 0.1 | 18 | 1.5 | 201 | 480 | 690 | 100 | 100 | 0.9 | 1.0 | 3.9 | 67000 |
| Exam. VII-9 | 0.1 | 19 | 0.8 | 201 | 480 | 700 | 100 | 100 | 0.9 | 1.2 | 4.4 | 77000 |
| Exam. VII-10 | 0.1 | 16 | 0.9 | 205 | 480 | 670 | 100 | 100 | 0.9 | 0.6 | 4.2 | 77100 |

In the Table VII-1, abbreviations are follows,
AV: acid value,
CH: color hue,
MIV: MI value,
MP: melting point,
TSAB: tensile strength at break
TEAB: tensile extension at break,
HR: hydrolysis resistance,
HTR: MVS: MSH: DDP: NAMW:

By the present invention, there can be obtained a polyester block copolymer composition having an excellent moldability by which it can be applied in blow molding and a variety of molding processes without any hindrance, and which has an excellent heat resistance and rubbery elasticity.

The invention claimed is:

1. A polyester block copolymer composition which comprises thermally-kneading 100 parts by weight of a polyester block copolymer (P1) obtained by a reaction of a crystalline aromatic polyester (A1) with lactones (B) with 0.5–5.0 parts by weight of a mono or more functional epoxy compound (C) and 0.01–3.0 parts by weight of an oxalic bisbenzylidene hydrazide (G), wherein the epoxy compound (C) comprises the combination of at least one compound (c1) selected from the group consisting of (c1-1) the compound represented by the following formula (I) and (c1-2) an adduct of ε-caprolactone monomer to 3,4-epoxycyclohexylmethyl-3',4'-epoxcyclohexanecarboxylate, and at least one compound selected from the group consisting of the compounds represented by the following formulae (III)–(V)

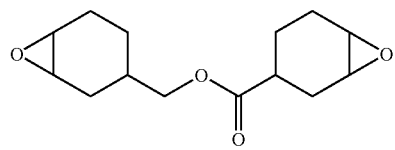
(I)

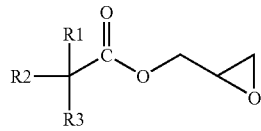
(II)

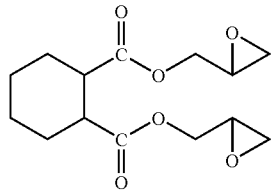
(III)

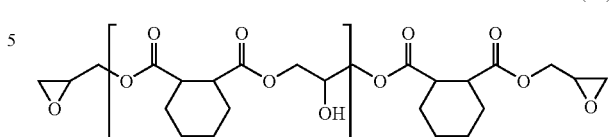
(IV)

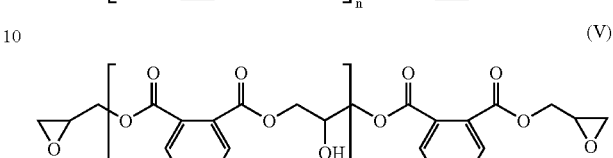
(V)

and wherein "n1" is 1–5 and "n2" is 0–5.

2. A polyester block copolymer composition as claimed in claim 1, wherein said crystalline aromatic polyester (A1) is a polyester of an aromatic dicarboxylic acid which is an acid component (a) and an aliphatic dicarboxylic acid and/or a cycloaliphatic dicarboxylic acid which are optionally added with an aliphatic diol, an aromatic diol, and/or a cycloaliphatic diol which are a diol component (b).

3. A polyester block copolymer composition as claimed in claim 1, wherein said crystalline aromatic polyester (A1) contains not less than 50% by weight of total of butylene terephthalate and ethylene terephthalate units.

4. A polyester block copolymer composition as claimed in any one of claims 1–3, wherein a copolymerization proportion (A1/B) of said crystalline aromatic polyester (A1) with said lactones (B) is 97/3–50/50 by weight.

5. A heat-sensitive body for a heater cable composed of a polyester block copolymer composition as claimed in any one of claims 1–3.

* * * * *

UNITED STATES PATENT AND TRADEMARK OFFICE
CERTIFICATE OF CORRECTION

| | | |
|---|---|---|
| PATENT NO. | : 7,196,123 B2 | |
| APPLICATION NO. | : 10/426771 | |
| DATED | : March 27, 2007 | |
| INVENTOR(S) | : Watanabe | |

It is certified that error appears in the above-identified patent and that said Letters Patent is hereby corrected as shown below:

Title page, please add the Assignee as follows:

--[73]   Assignee:  Daicel Chemical Industries, Ltd. (Sakai, JP)--

Title page, please remove "[22] Filed:   April 30, 2003" and add the PCT priority information as follows:

--[22]   PCT Filed: August 4, 2000

[86]   PCT No.: PCT/JP00/05230

§ 371 Date: April 30, 2003

§ 102(e) Date: April 30, 2003

[87]   PCT Pub. No.: WO01/10927

PCT Pub. Date: February 15, 2001--

UNITED STATES PATENT AND TRADEMARK OFFICE
CERTIFICATE OF CORRECTION

PATENT NO.       : 7,196,123 B2
APPLICATION NO.  : 10/426771
DATED            : March 27, 2007
INVENTOR(S)      : Watanabe It is certified that error appears in the above-identified patent and that said Letters Patent is hereby corrected as shown below:

In claim 1 (col. 79, line 22), please delete formulas (I)-(V) and replace with the following formulas (I)-(IV):

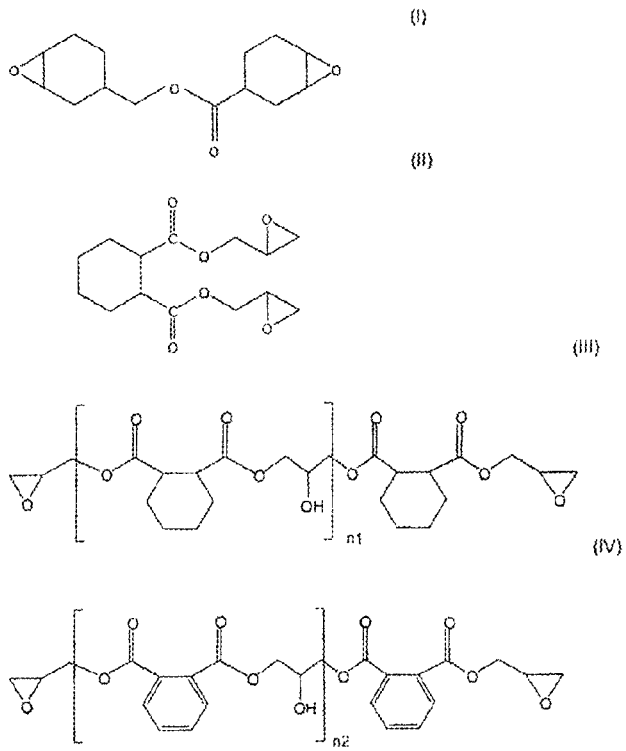

Signed and Sealed this

Second Day of September, 2008

JON W. DUDAS
*Director of the United States Patent and Trademark Office*